United States Patent [19]
Pitteloud et al.

[11] Patent Number: 5,611,033
[45] Date of Patent: Mar. 11, 1997

[54] APPARATUS AND METHOD FOR AUTOMERGING IMAGES BY MATCHING FEATURES AND ALIGNING IMAGES

[75] Inventors: Dominique Pitteloud; Peter Phillips, both of Palo Alto, Calif.; Jean-Paul H. Martin, Oakton, Va.

[73] Assignee: Logitech, Inc., Freemont, Calif.

[21] Appl. No.: 92,372

[22] Filed: Jul. 15, 1993

Related U.S. Application Data

[63] Continuation of Ser. No. 805,448, Dec. 10, 1991, abandoned.

[51] Int. Cl.$^6$ ..................................................... G06T 3/00
[52] U.S. Cl. .......................... 395/135; 395/133; 395/138; 358/450
[58] Field of Search ................................... 395/125–129, 395/133–139, 161; 382/44, 46, 61, 59, 63, 312–319; 358/449, 450, 451, 452, 453, 473, 474, 448, 88

[56] References Cited

U.S. PATENT DOCUMENTS

| | | | |
|---|---|---|---|
| 3,852,573 | 12/1974 | Dolch | 382/46 X |
| 4,272,756 | 6/1981 | Kakumoto et al. | 382/44 X |
| 4,819,083 | 4/1989 | Kawai et al. | |
| 5,054,097 | 10/1991 | Finois et al. | 382/44 |
| 5,103,490 | 4/1992 | McMillin | 382/62 |
| 5,113,267 | 5/1992 | Lee | 358/448 |
| 5,142,357 | 8/1992 | Lipton et al. | 358/88 |
| 5,164,997 | 11/1992 | Kumagai | 382/46 |
| 5,170,441 | 12/1992 | Mimura et al. | 382/45 |
| 5,220,619 | 6/1993 | Keokoek | 382/16 |
| 5,355,146 | 10/1994 | Chiu et al. | 358/473 X |

FOREIGN PATENT DOCUMENTS

0267456A2  5/1988  European Pat. Off. ......... H04N 1/04

*Primary Examiner*—Almis R. Jankus
*Attorney, Agent, or Firm*—Townsend and Townsend and Crew LLP

[57] ABSTRACT

An apparatus and method for automatically merging multiple image portions to produce a single image. Image portions are produced, such as by a hand-held scanner, with overlapping areas. The overlapping area of a first image portion is examined to determine a distinguishing feature. The overlapping area of the second image portion is then searched to locate the corresponding feature. The differences in alignment of the two features, such as rotation, expansion or compression, are then determined. One of the image portions is then rotated, compressed or expanded in the amount necessary to align the two images. The two images are then merged by eliminating the overlapping portion of one of the images.

22 Claims, 23 Drawing Sheets

LEFT STRIP               RIGHT STRIP

FIG. 9C                  FIG. 9D

| PAIRS | DIST (L) | DIST (R) | ROTATE | STRETCH |
|-------|----------|----------|--------|---------|
| L1, L2 | D(L1, L2) | D(R1, R2) | $\theta_1$ | $\%S_1$ |
| L1, L3 | D(L1, L2) | D(R1, R2) | $\theta_2$ | $\%S_2$ |
| L2, L3 | D(L1, L2) | D(R1, R2) | $\theta_3$ | $\%S_3$ |

APPARATUS AND METHOD FOR AUTOMERGING IMAGES BY MATCHING FEATURES AND ALIGNING IMAGES

This is a Continuation of application Ser. No. 07/805,448 filed Dec. 10, 1991, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office, patent file or records, but otherwise reserves all copyrights whatsoever.

BACKGROUND OF THE INVENTION

The present invention relates generally to the field of computer graphics and, more particularly, to methods and apparatus for merging graphic images.

Computers have become a powerful tool for the rapid and economic creation of pictures, and are particularly well suited for drafting and publishing tasks. For drafting, computer-aided design or "CAD" has found wide application. Instead of pen and paper, the CAD user employs a computer with a pointing device (typically a mouse, light pen, digitizer tablet, or the like) to create an electronic description of a drawing in the computer's memory.

For publishing, desktop publishing or "DTP" has become the standard. In DTP, both text and graphic images are manipulated on a computer screen, much as they are in CAD. In either system, when the user is satisfied with the drawing, he or she obtains a "hard copy" by sending the stored image to an output device, such as a laser printer or plotter.

In working with graphic images, it is often desirable to "acquire" images and represent them in a computer. For example, a DTP user may wish to import a photograph into a newsletter. Before an image is available to the user, however, it must be converted to a format which the computer may interpret.

Thus, the process of entering images into a computer requires that an electronic description be generated. There are two basic approaches to describing images: vector objects and bitmaps. Vector objects are mathematical descriptions of an image. For example, a line may be described by its starting and ending points. A circle may be described by its center and radius. Of particular interest to the present invention, however, are bitmap images.

In bitmaps, an image is described as a two dimensional array of bits or pixels (picture elements). By arranging combinations of black and white pixels (0 and 1 bits), a monochromatic image may be reproduced. This technique is commonly employed to reproduce images for newspapers and magazines. Bitmaps are almost always rectangular, and if the image itself is not rectangular, then the image must be rendered with a "mask" bitmap that defines the shape of the image.

While the bulk of a bitmap comprises the bits themselves, header information is also necessary to define how the bits are interpreted. This includes the height and width of the bitmap (expressed in number of pixels) and color information. In a monochromatic bitmap, one bit in the bitmap corresponds to one pixel on the display. A color bitmap requires multiple bits per pixel. In this case, the header information describes how the multiple bits correspond to particular colors. There are multiple file formats for storing bitmaps. Examples include ZSoft's PC Paintbrush (PCX), CompuServe's Graphics Interchange Format (GIF), and Microsoft's Tagged-Image File Format (TIFF).

Because bitmaps are used to store real-world images, they usually enter a computer through a scanner or a video frame grabber. A scanner converts a photographic image into a bitmapped data file; similarly, a frame grabber converts a video signal (from a video camera or VCR) to a bitmapped data file. Bitmaps can also be created by hand using computer "paint" programs, such as Microsoft's Windows™ Paintbrush program. Once converted into a bitmap, an image may be transferred to other computers in the same manner as other binary files (e.g., via magnetic media or modem).

Scanners, which are probably by far the most popular means for importing images, employ a light source and photodetectors to "read" or "scan" images into a computer. Two basic types are available: flatbed and handheld. The general construction and operation of each will now be briefly described.

Flatbed scanners look and operate very much like an ordinary photocopier. First, the user places an image to be scanned upon the flatbed (flat glass). Next, the scanner is activated, e.g., by pressing a button. The image is then scanned by a light source. Instead of generating a photocopy, however, the scanner focuses the image onto photodetectors which produce binary data representative of the image. Upon completion of the scan, the data are stored on a computer disk as a binary file, typically in one of the aforementioned bitmap file formats. The data file is now available to the user for use in application software, such as desktop publishing packages, paint programs, and the like.

In "handheld" scanners, on the other hand, substantially all of the scanning system is housed within a single handheld unit. Instead of placing an image to be scanned on a glass surface, as one would do with a photocopier or flatbed scanner, the image is laid face up on a flat surface, typically a desktop. The scanner, which includes a roller or wheels, is dragged across the surface of the image. The image is then recorded in a manner similar to that for flatbed systems.

While scanners allow for the easy importation of a variety of images, they have a significant limitation. Scanners, particularly handheld models, have a limited scanning area or "window" for accommodated materials to be scanned. If the image to be scanned is larger than the viewing window of the scanner, then the image cannot be captured in a single operation. In this instance, the desired image must be scanned as a series of multiple strips, i.e., portions which are small enough to fit within the viewport of the scanner. After scanning all the strips, the image may be reconstructed within the computer by manually "stitching" the strips back together (as described hereinbelow).

Before a user may stitch strips back together, other problems must be overcome. In particular, the hand scanner's reliance upon the human hand as a means for moving the unit across a source image creates artifacts. For example, strips obtained from the same image will typically have different lengths. Moreover, the geometric orientation between strips often differ in horizontal alignment (X translation), vertical alignment (Y translation), rotation, and the like. In addition, one or more strips may undergo varying rates of uniform compression and/or expansion, depending on how fast or slow the user has moved the scanner across the image. To faithfully reproduce the source image, therefore, these artifacts must be eliminated or minimized.

Even if the difficulty of artifacts is overcome, the process of stitching strips together to form the original image is cumbersome. For example, a common technique for stitching strips together requires the user to "eyeball" (i.e., judge with one's eyes) the alignment between the bitmap strips. The technique is far from perfect, however, as this requires an elaborate trial and error technique to obtain an acceptable image. In addition, the current process does not correct for the difference in documents or images because of "stretching" (transformation) due to a fast scanning speed. Moreover, the user must often manually correct for vertical skewing (rotation) of each image strip. Routinely, the user obtains a bitmap where the intersections of the strips (i.e., the stitched areas) appear rough and misaligned.

Another technique requires the use of registration marks, i.e., marks that are added to the source image that allow the software to find the marks and merge the image. The marks are generally added to an image by scanning the image with a transparency having the marks overlaid on the image. The software then finds the marks and attempts to merge the images based upon the location of the marks. Another technique employs a plastic grid to aid the user in scanning images in strips in a more consistent manner. However, none of these techniques are transparent to the user, nor are they fully automated. Moreover, these techniques rely heavily on the dexterity of the individual user in aligning images or adding registration marks to the image that the software can find and use to merge the images. The results are almost always less than satisfactory.

Thus, it is desirable to provide a system and methods which automatically align bitmap images with minimum user effort. Moreover, the methods employed should achieve precise alignment between two or more images—precision that cannot be achieved by manual positioning techniques alone. The present invention fulfills this and other needs.

SUMMARY OF THE INVENTION

Computers have found wide application for the creation and editing of drawings or graphic images. A particularly easy technique for creating images is to scan a drawing into a computer using one of the commercially available scanners. Because scanning devices, particularly handheld scanners, have a limited viewport or viewing window for obtaining images, prior art systems had required the computer user to expend significant effort and time manually piecing or stitching scanned images together for those images which do not fit within the viewport.

According to the present invention, a method for automatically merging images on a computer system includes acquiring first and second image strips; locating at least one feature in the first image strip; locating this feature in the second image strip; and merging the two image strips into a single image, based on the matched features. Additional strips may be acquired and merged as desired. For better results, a plurality of features are matched between the image strips.

A system for automerging images, constructed in accordance with the principles of the present invention, includes a computer having a memory and a processor; a scanner for acquiring an image as a series of image strips; means for locating at least one feature in the first image strip; means for locating this feature in the second image strip; and means for merging the two image strips into a single image by aligning the two features.

BRIEF DESCRIPTION OF THE DRAWINGS

FIGS. 9C–E illustrate the pairing of features and matches within each image strip.

DESCRIPTION OF THE PREFERRED EMBODIMENT

Introduction

Figure 1A:
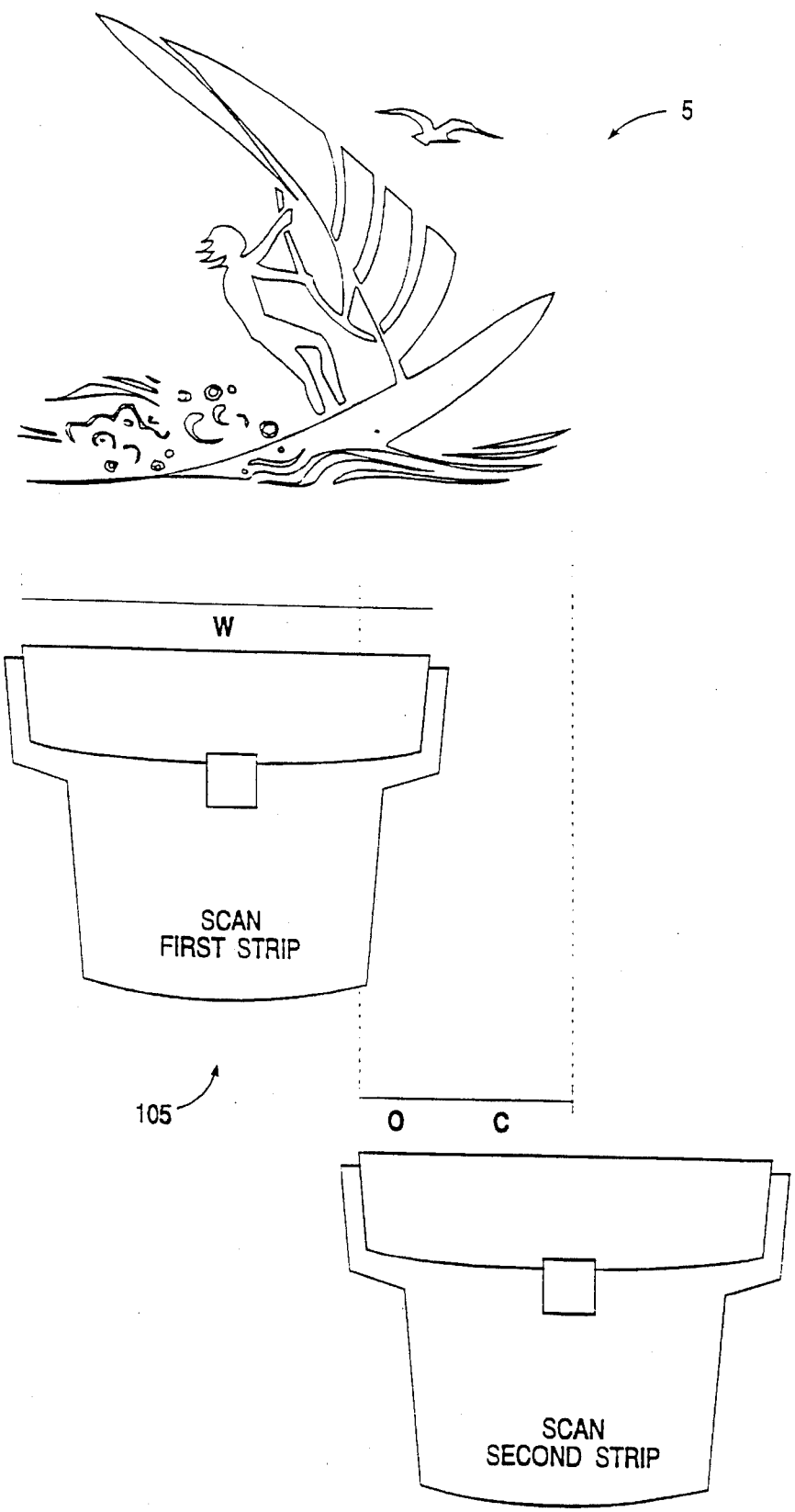
FIGS. 1A–C illustrate the process of acquiring and merging bitmaps using manual techniques.

Referring now to FIGS. 1A–F, a conventional technique for merging a plurality of image strips will be described. If the image strips are not already digitized as a bitmap, then the strips must first be acquired. As shown in FIG. 1A, for example, a source bitmap image 5 may be acquired by scanning with a handheld scanner 105. Since image 5 is wider than the maximum width W of scanner 105, however, it cannot be acquired in a single pass. In particular, an area C, which beyond the viewing window of the scanner 105, will be cropped. Thus, the image must be scanned as two separate strips. Typically, the first strip will occupy the entire width W of scanner 105; the second strip will include the area cropped C as well as a small overlap region O.

Figure 1B:
Figure 1B:
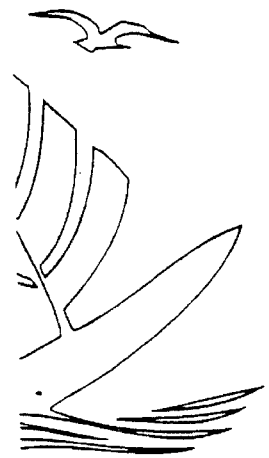

As shown in FIG. 1B, two image strips 10, 20 are obtained (in separate operations) from the single image 5. Image strip 10 has a width of W (the maximum width of the scanning window), with the portion of the image 10 which lies outside of this effective area being cropped. Thus, the user must obtain an additional strip, such as the strip 20, which includes the portion of the source image which was cropped C as well as an overlapping region O. For simplification, image strips 10, 20 are shown without skewing, compression, and/or expansion artifacts, which typically will be present in images obtained with a hand scanner.

Figure 1C:
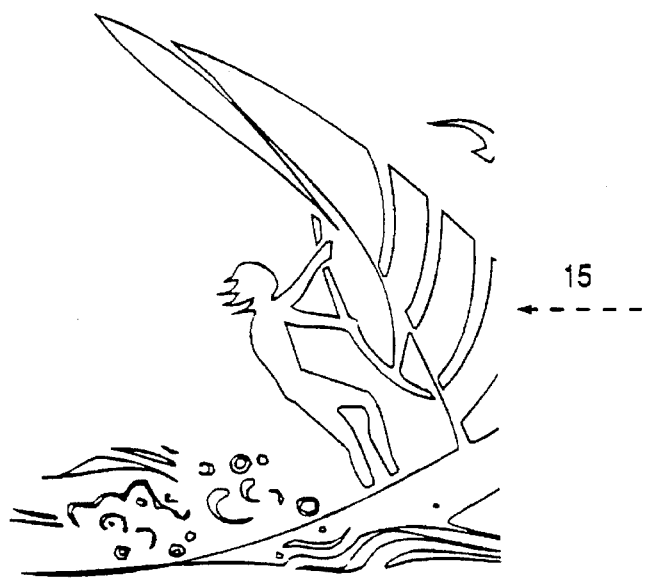
Figure 1C:
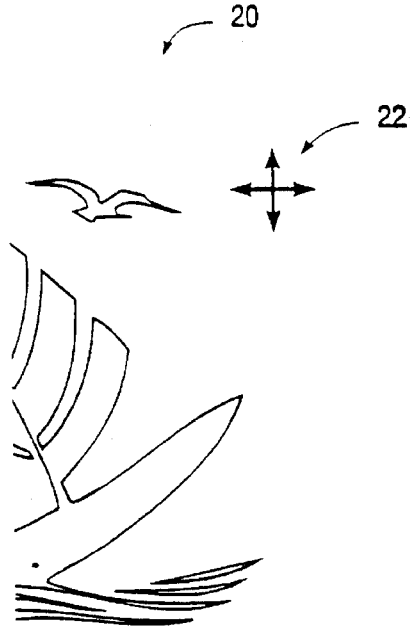

With particular reference to FIGS. 1C–F, the merging of image strips 10, 20 will be described. As shown in FIG. 1C, one image strip (e.g., strip 20) is moved towards the other. Typically, the user first selects a stitching (or similar) mode. Next, a special cursor, such as cursor 22, is displayed to assist the user in the operation. In response to user-generated signals, one image strip (e.g., strip 20) is moved or "dragged" in a direction 15 towards the other image strip (e.g., strip 10); the signals may be supplied by a pointing device (e.g., a mouse) moving the cursor 22 in a desired direction. In this manner, signals from the pointing device are used to move or translate the image strip 20 towards the image strip 10.

Figure 1D:
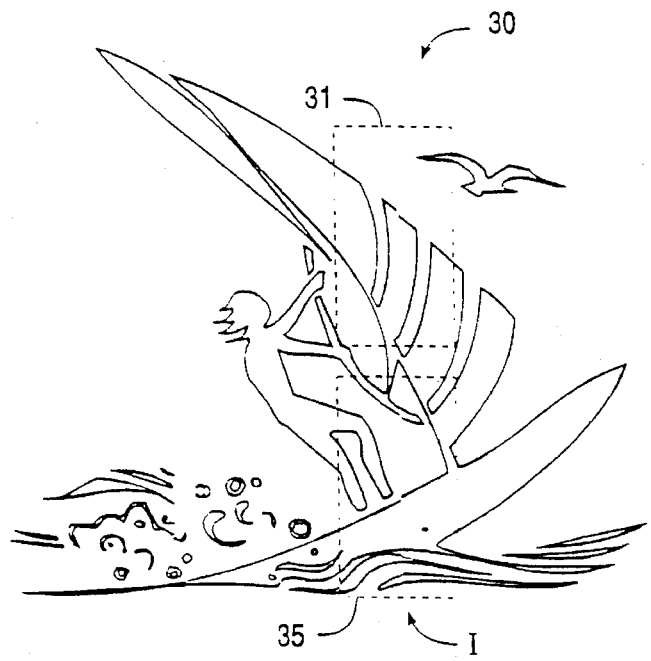
FIGS. 1D–F illustrate artifacts which are common in merged bitmaps.
Figures 1E, 1F:
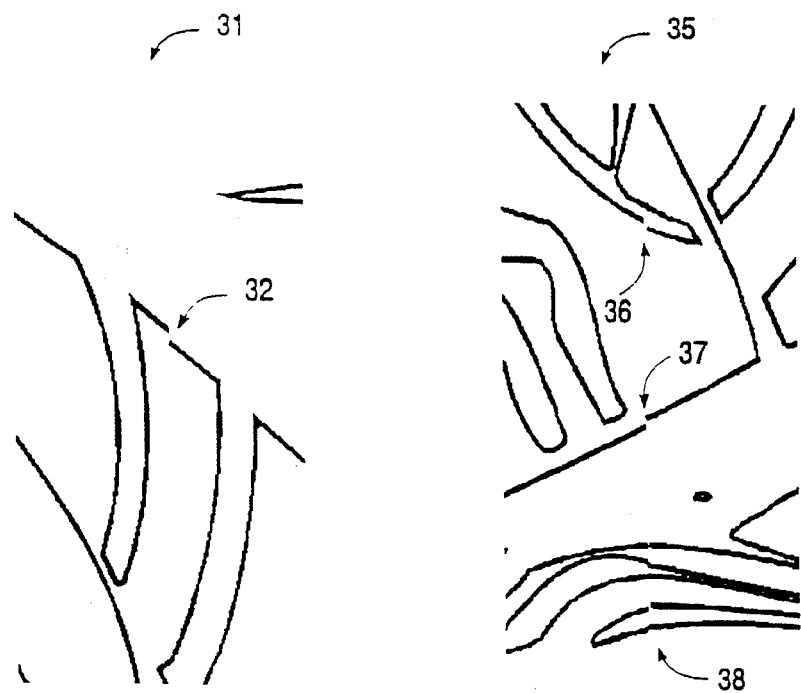

Referring now to FIG. 1D, the completed image 30 is shown. Image 30 is a single image, such as a bitmap, which results from the merging of strips 10, 20 (at intersection I). While the image is a fair reproduction of the original, it is misaligned at the intersection I of the two image strips. As shown in FIGS. 1E–F, the misalignment within the image can best be seen from enlarged sections 31, 35 (taken from FIG. 1D). In section 31, for example, the intersection I of the strips is misaligned at point 32. Additional alignment artifacts are shown in section 35 where misalignment occurs at points 36, 37, 38.

For purposes of illustration, the foregoing example has been confined to simple translational artifacts—in this case, horizontal (X) translation of one strip relative to another. In addition to translation artifacts, however, the strips used to reconstruct a single image will often have undergone a complex combination of other transformations, including skewing, compression, and/or expansion artifacts. Hence, merging images by conventional techniques routinely yields unsatisfactory results.

Preferred Embodiments

1. Acquisition of images

Figure 2:
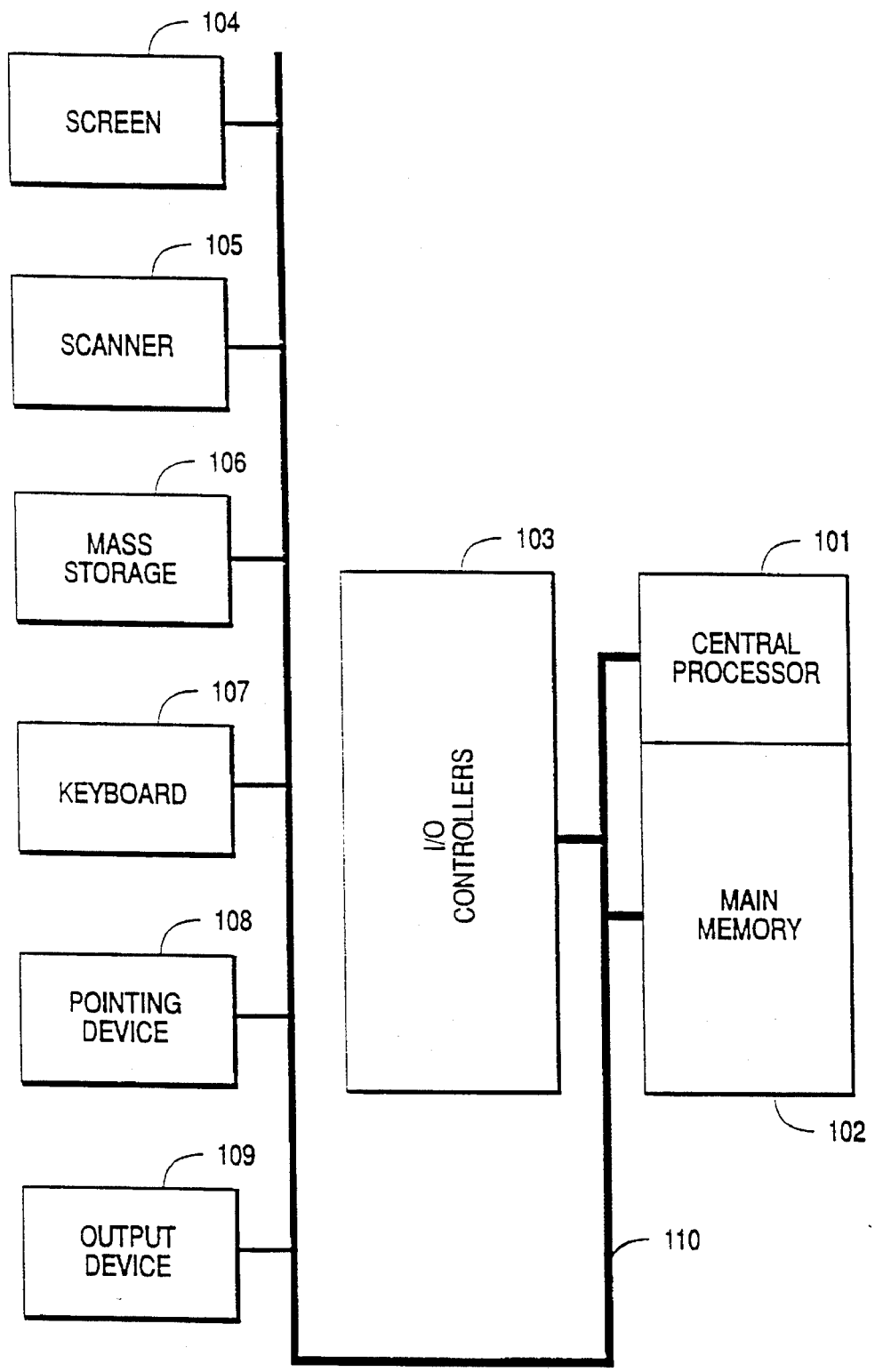
FIG. 2 is a block diagram of a computer system in which the present invention may be embodied.

The invention may be embodied on a computer system such as the system 100 of FIG. 2, which comprises a central processor 101, a main memory 102, an I/O controller 103, a screen or display 104, a scanner 105, a mass storage device 106, a keyboard 107, a pointing device 108, and an output device 109. The various components of the system 100 communicate through a system bus 110 or similar architecture.

In operation, the user enters commands through keyboard 107 and/or pointing device 108, which may be a mouse, a track ball, a digitizing tablet, or the like. The computer displays text, graphic images, and other data through screen 104, such as a cathode ray tube. A hard copy of the image may be obtained from output device 109, which is typically a printer or a plotter. In a preferred embodiment, an appropriately programmed IBM PC-compatible personal computer (available from International Business Machines, Corp. of Armonk, N.Y.) is used running under MS-DOS and Microsoft Windowsυ (both available from Microsoft, Corp. of Redmond, Wash.).

In this interactive computer system, the user acquires graphic images from a variety of sources. Common sources includes input devices (e.g., scanner), software (e.g., paint programs), disk files (e.g., TIFF, PCX, and GIF formats), and the like. In typical operation, images are acquired with the scanner 105, which may be either a flatbed or handheld scanner. Scanners suitable for use as the scanner 105 are available from a variety of vendors; in a preferred embodiment, scanner 105 is a ScanMan™ 256, available from Logitech Corp. of Fremont, Calif. Once entered into the computer 100, an image is stored as a bitmapped graphic and, thus, may be represented in the computer's memory 102.

Figure 3A:
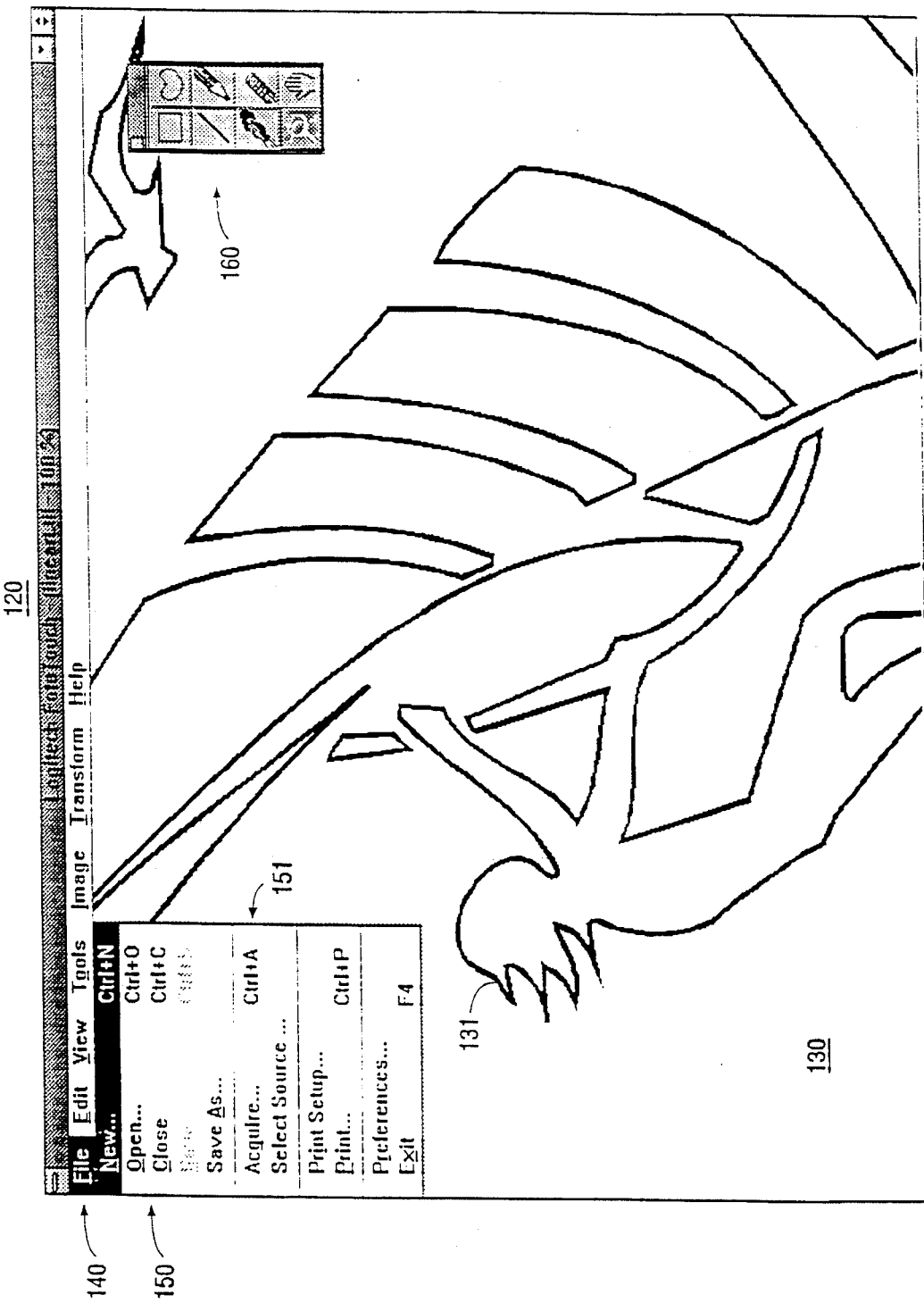
FIGS. 3A–B illustrate a window interface or work surface of the present invention for manipulating images.

Referring now to FIG. 3A, the system 100 provides a window or workspace 120 for display on screen 104. Window 120 is a rectangular, graphical user interface, running in Microsoft Windows™, for viewing and manipulating graphic images. Window 120 contains a plurality of menus 140, 150, 160, each having submenus and software tools for use on graphic images. Of particular interest to the present invention is an Acquire tool 151, which is available from menu 150. Window 120 also includes a client area 130 for displaying images, such as the bitmapped graphic image 131.

Figure 3B:
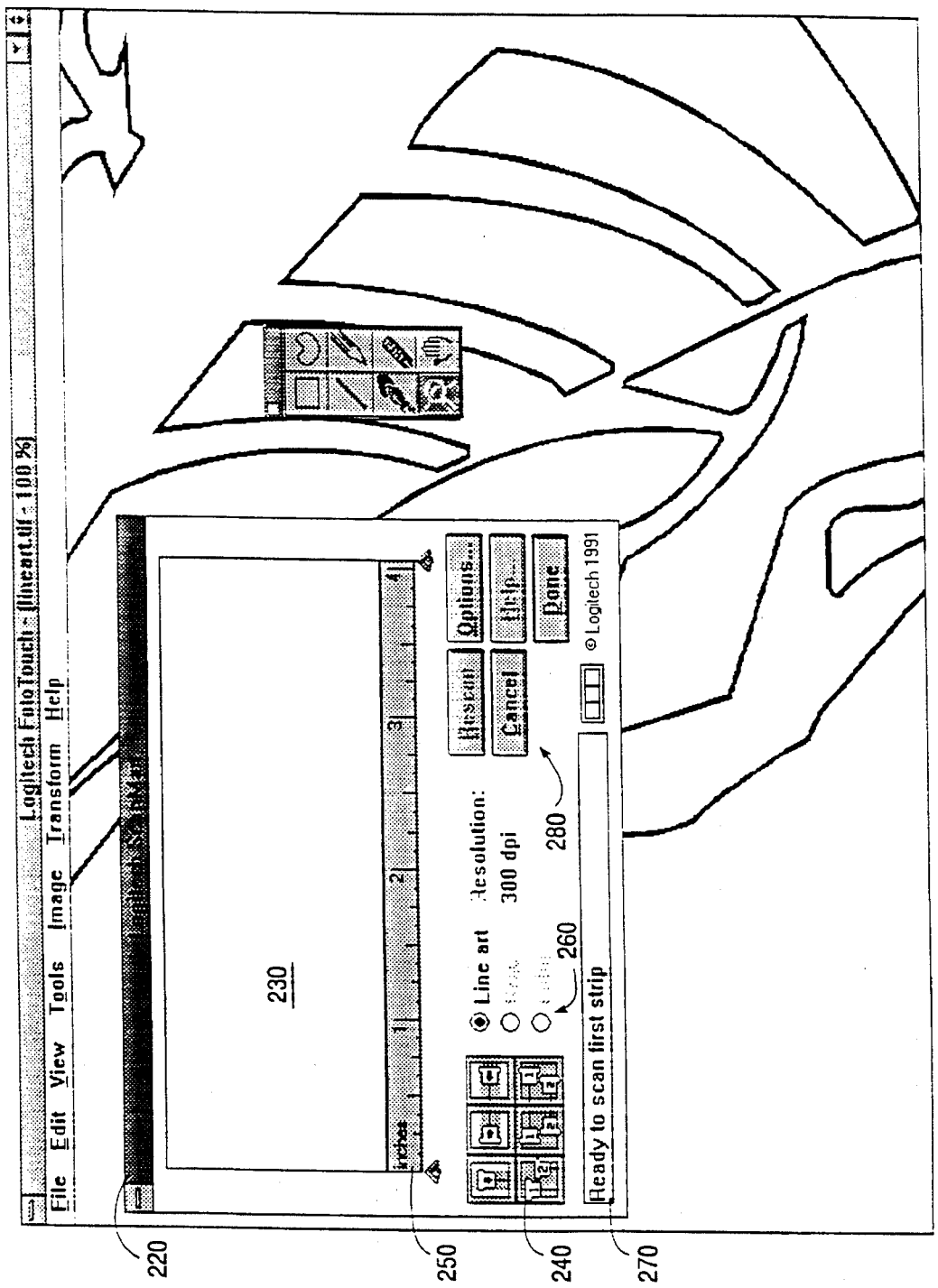

Referring to FIG. 3B, the operation of window 120 for acquiring a graphic image will now be illustrated. The user initiates the image acquisition, for example, by selecting the Acquire option 151 from the menu 150 of FIG. 3A. In response, the system 100 displays a scanning window 220. Window 220 includes interface components or resources, such as a scanning preview window 230, a ruler bar 250, a scan mode panel 240, radio buttons 260, dialogue buttons 280, and a status line 270.

Figure 3C:
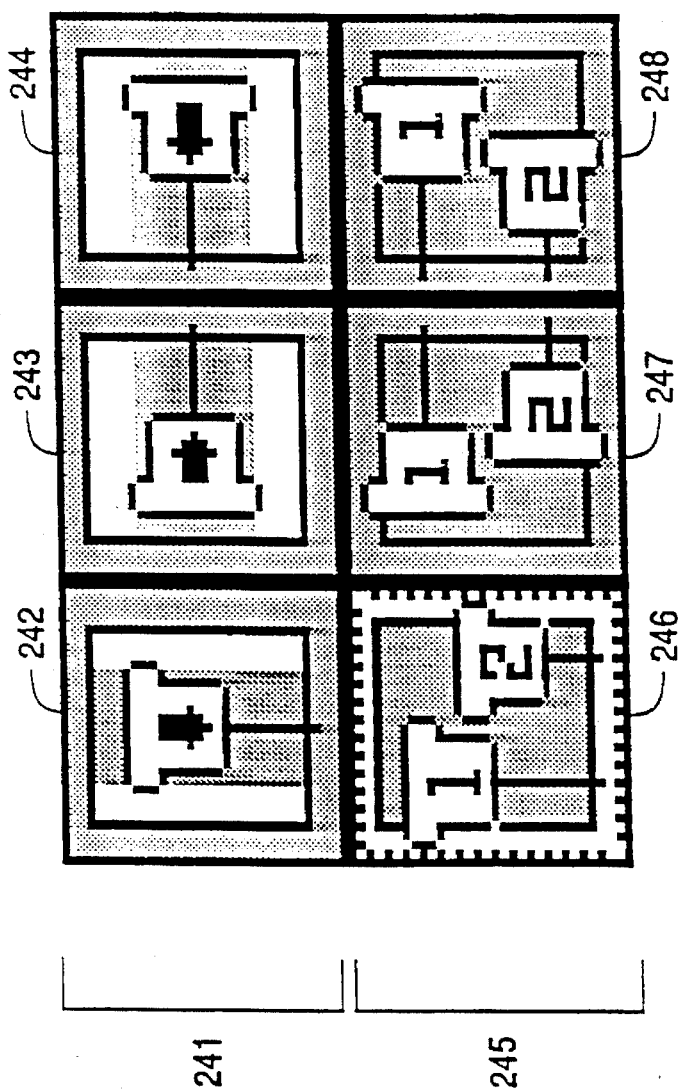
FIG. 3C illustrates a scan mode panel of the present invention.

Next, the user selects a "scan mode" from panel 240 which indicates the type (i.e., single or multiple strips) and orientation (i.e., portrait or landscape) of the image to be scanned. As shown in detail in FIG. 3C, panel 240 includes a plurality of icons arranged into two rows: single-strip scan 241 and multiple-strip scan 245. From single-strip scan 241, the user may select from a variety of single-strip modes, including 1) single-strip portrait 242 (top-to-bottom), 2) single-strip landscape 243 (left-to-right), and 3) single-strip landscape 244 (right-to-left). Similarly, from multiple-strip scan 245, the user may select from 1) multiple-strip portrait 246 (top-to-bottom), 2) multiple-strip landscape 247 (left-to-right), and 3) multiple-strip landscape 248 (right-to-left).

A particular advantage of the user interface provided by the scan mode panel 240 is efficiency of user input. Specifically, a variety of different images (e.g., single or multiple, portrait or landscape, and the like) may be acquired as a single operation. For example, to acquire an image as two vertical strips the user need only select multiple-strip portrait 246, scan the first strip, select stop (not shown), scan the second strip, and select Done (from buttons 280).

Other scanning parameters may also be set at this point. The viewing width W of the scanner may be shortened, for example, by selecting positions on the ruler bar 250. Additional scanning parameters (e.g., grey scale or line art) may be entered by activating the "Options" button of buttons 280. If no parameters are specified by the user, however, system 100 will assume default values (e.g., single scan of line art).

Next, the user actually scans the source image by activating the scanner 105, typically by pressing a button or switch device located on the scanner. Upon activation, the scanner 105 is ready to capture or acquire the source image; thus at this point, the user drags the scanner 105 across the source image in a smooth and continuous motion. Immediate user feedback is provided by preview window 230 which displays the acquired image in real-time.

On completion of the scan, the user selects "Done" from the buttons 280, typically by pressing the "D" key or selecting the button with the pointing device. At this point, the acquired image is stored in memory 102. If the user is not satisfied with the acquired image shown in window 230, the user may select "Rescan" from the buttons 280 and repeat the scanning process. Otherwise, the image will typically be saved to non-volatile storage 106 as a bitmap (e.g., TIFF) file. After two or more image strips have been acquired, the source image may be reconstructed by automerging techniques of the present invention.

2. Automerge: Automatic merging of images

The following description will focus on the automerging of two bitmap image strips obtained by a handheld scanning device. However, the present invention is not limited to such image formats or devices. Instead, a plurality of image strips having any one of a number of image formats (including both bitmap and vector formats) may be automatically merged in accordance with the present invention. Additionally, the image strips may be entered into the system 100 in a variety of formats (e.g., vector formats) and by a variety of means (e.g., file transfers, paint programs, and the like).

a. General operation

The automerging of images in accordance with the present invention will now be described. In an exemplary embodiment, system 100 operates under the control of an Automerge routine to combine two or more image strips together to recreate the source image. The routine, which is typically loaded into memory 102 from storage 106, instructs or directs processor 101 in the automatic merging of the image strips.

In a preferred embodiment, the Automerge routine is implemented in a message-passing environment (e.g., Microsoft Windows™); thus, the routine is invoked in response to events received from an event handler. The dispatching of messages in an event-based system such as Microsoft Windowsυ, is known in the arts; see, e.g., Petzold, C., *Programming Windows,* second edition, Microsoft Press, 1990, the disclosure of which is hereby incorporated by reference. Upon invocation, the Automerge routine will invoke or call (directly or indirectly) additional routines, including M_MergeFind, Autocorrelate, M_MergeMatch, Coarse/Fine Correlation, Rank_Features, Calculate Dimensions, and M_MergeImage routines.

Figure 4:
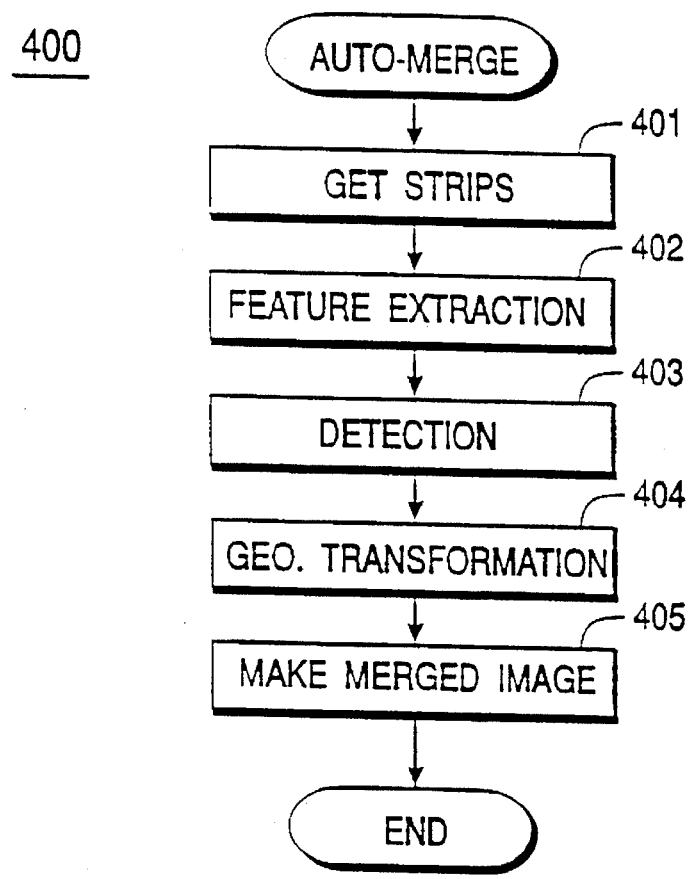
FIG. 4 is a flow chart of the Automerge method of the present invention.

Referring now to FIG. 4, the general operation of the Automerge routine 400 is illustrated by a flow chart. In step 401, the image strips (usually two at a time) are obtained. Typically, the image strips are obtained as bitmaps by hand scanning a source image (as previously described).

In step 402, system 100 is initialized for merging images. In particular, data structures are initialized in memory 102 for processing the images. For purposes of illustration, each image may be defined by the following record (struct), written in the C programming language:

```
Typedef struct {
    short Width, Height;
    IMAGECLASS Class;
    FPGETLINE Getline;
    short Handle;
} IMAGEINFO;
``` where Width and Height specify the dimensions of the image; Class, an enumerated variable of type IMAGECLASS, specifies whether the image is bilevel, grayscale, or color; GetLine is a pointer to a function which returns (via a pointer to a buffer) the pixel data for a single line in the image; and Handle serves as a handle or index of the image.

In step 403, a "feature extraction" is performed for the first strip by the M_MergeFind routine (described hereinbelow in FIG. 5), which extracts two or more distinct features of interest from an area of the first strip which overlaps with the second strip (e.g., overlap O from FIG. 1). The method finds distinct areas or "features," i.e. those areas which have the most amount (highest score) of "uncorrelation" in a given or surrounding neighborhood. To improve automerging, groups of features are sought in different areas of the first strip. Ideally, the features should be unique within the search area of the strip. The technique may be customized for a particular class of images (e.g., gray scale or bilevel line art). For example, the actual number of features, the area and number in the strip for the features to be searched, and the size of a feature are all parameters that can be customized to the image type.

In step 403, features found in the extraction step (i.e., from the overlapping area of the first strip) are located or detected in the second strip by the M_MergeMatch routine (described hereinbelow in FIG. 7). For detection, the routine employs a sequential similarity detection algorithm (SSDA)—an optimized variant of normalized correlation or pattern matching—which is known in the art. For each group of features found in the first strip, M_MergeMatch seeks a matching group in the second strip. Each feature/match pair is given a score describing how well it matches, how unique the match is, and how far apart a match has occurred (between first set and second set of pairs). The pairs with the best scores will be used in step 404 to perform the actual merging of image strips.

In step 404, the geometry of the second strip is normalized to the geometry of the first strip. Specifically, using the best features extracted from the first strip and the corresponding best matches in the second strip, the second strip is transformed into the geometry of the first strip. Exemplary transformations of the second strip include rotation, compression or expansion, shearing, and the like.

Finally, in step 405, the two image strips are merged together by the M_MergeImage routine. The basic process includes mapping the second strip (now normalized) into the first strip. The actual mapping is accomplished by matrix transformations (set forth in further detail hereinbelow). At the conclusion of step 405, the merged image is displayed in client area 130 (of FIG. 3A).

b. Specific operation

Referring now to FIGS. 5–11, the individual components of the Automerge method will now be described in further detail. In FIGS. 5A–B, the M_MergeFind method or routine 500 is represented by a flow chart. The routine is invoked with an image strip, a list of regions, and a number of features to find in each region N. The method returns a list of features (as Feature_List).

Figure 5A:
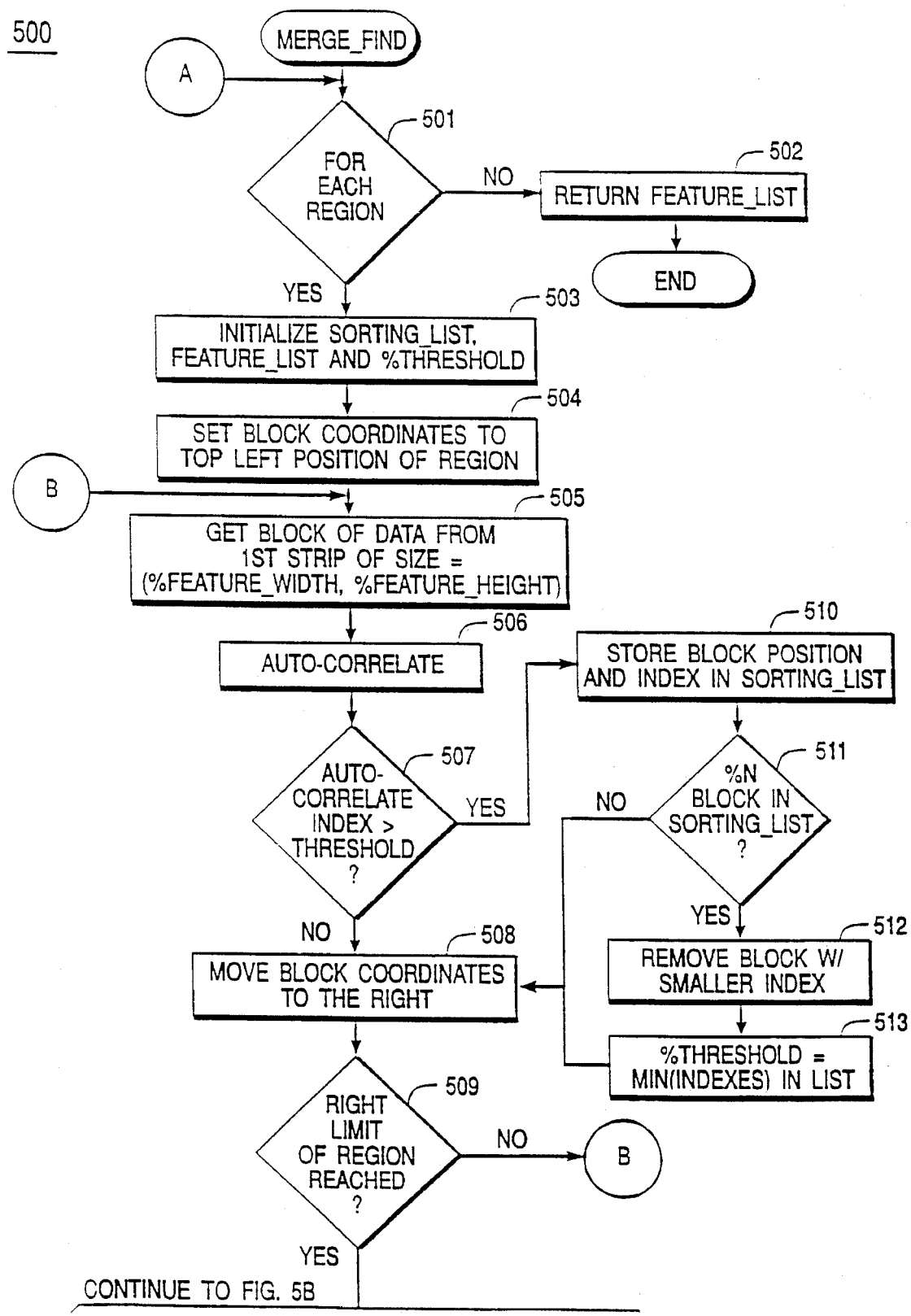
FIGS. 5A–B are a flow chart of the M_MergeFind method of the present invention.
Figure 5B:
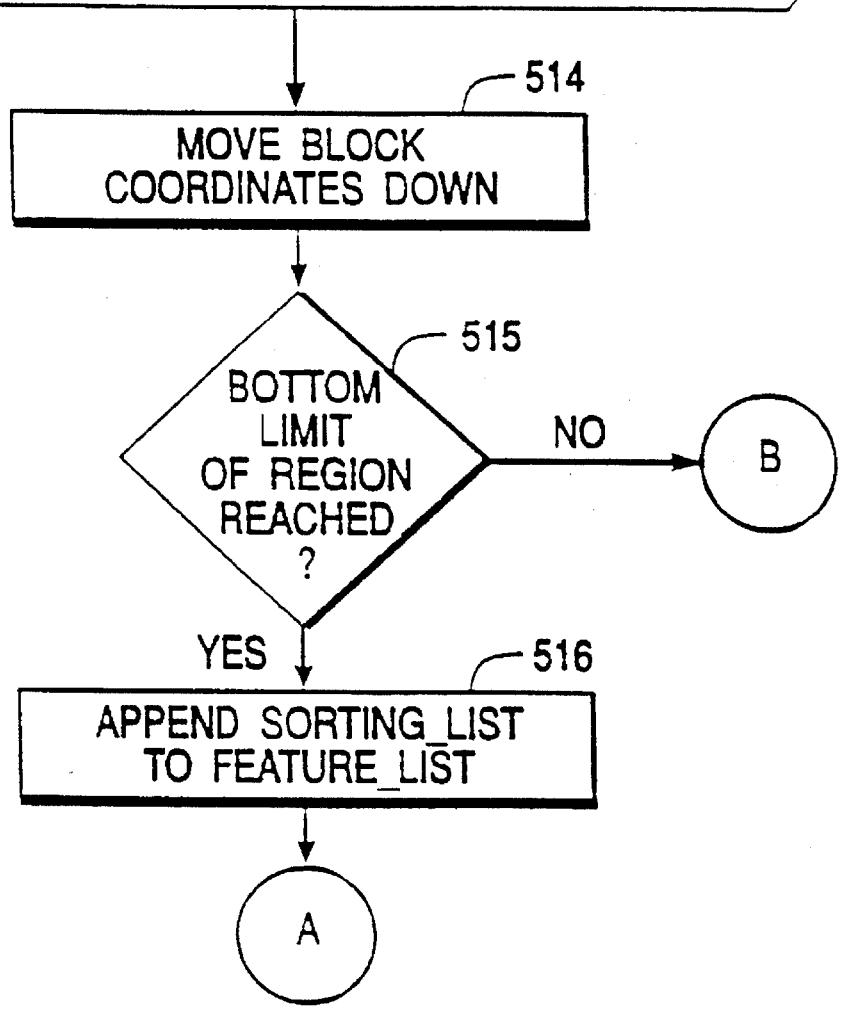
Figure 5D:
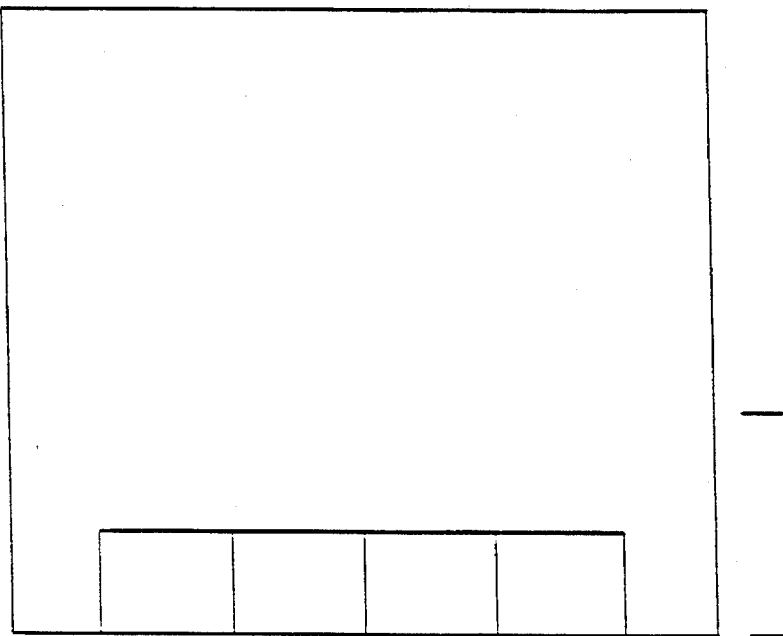
FIGS. 5C–D illustrate the process of sampling pixel blocks from a select region.
Figure 5C:
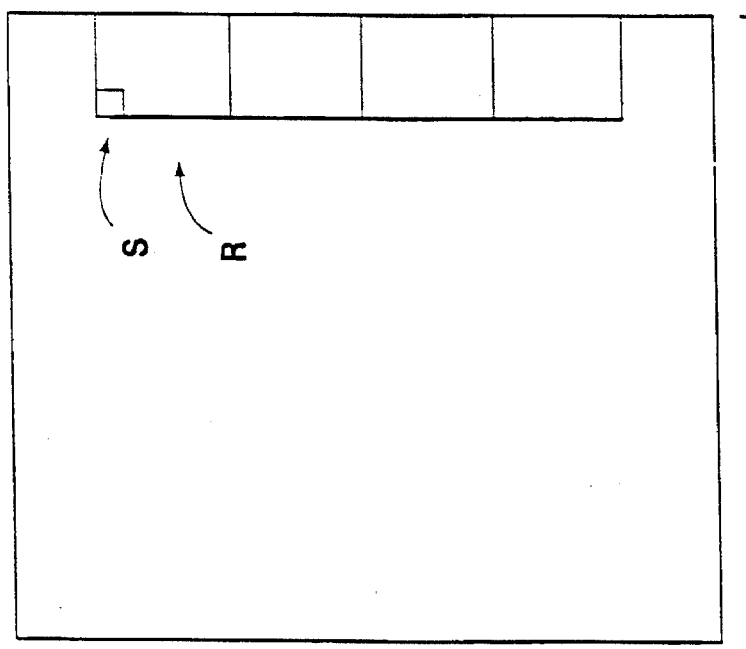

The individual steps of the method are as follows. In step 501, a loop is established to examine each region in the list for features. As shown in FIGS. 5C–D, a region R is an area, typically a rectangle, defined within the overlap area. If an additional region to be examined exists at step 501, then at step 503 a threshold, a sorting list, and a feature list are initialized. The threshold is a minimum score for a feature. If an area under examination has a score below the threshold, the area will not be retained for further examination. While the threshold is initially set to a preselected value, the threshold will typically be adjusted upward, during runtime, to be no less than the score of features already found. The sorting list is a local data structure, typically implemented as a linked list. As features are located, they are stored, according to rank, in the sorting list. In a preferred embodiment, the sorting list has a finite limit of, for example, four members. Thus, features having a low score are automatically excluded. After examining a given region, the sorting list will contain the best (i.e., highest scoring) features located. By appending the sorting list to the feature list, the best features within each region are identified. Once all regions have been examined (no at step 501), then the method concludes by returning the feature-list at step 502. Otherwise, the method continues on to step 504.

At step 504, the search for features in a region begins by setting the block coordinates to the top left position of the region. In step 505, a block of data is retrieved from the first strip based on the width and height of the feature (Feature_Width and Feature_Height). This determines the bounds of a region, which will typically define a square sample block S (of FIGS. 5C–D). In a preferred embodiment, the sample block S is a 16×16 array of pixels. However, any convenient array size may be employed. In addition, the region may be divided into smaller rectangular regions (the size of a feature) to determine if it is a good feature (i.e., a good match).

In step 506, the Autocorrelate routine (described in further detail hereinbelow) is invoked to determine a score or Autocorrelate index for a given sample block. The method determines the "uniqueness" of the feature in a sample block by a series of image move and difference operations. If in step 507, the Autocorrelate index is greater than the threshold, the method stores the block position and index in the sorting list at step 510. If the sorting list is full at step 511, then the method removes the block with a smaller index at step 512 and resets the threshold to the minimum index in the list at step 513. After step 513, the method continues on to step 508 to move the block coordinates to the right; the method also proceeds directly to step 508 when the autocorrelate index is less than the threshold (i.e., no at step 507). At step 508, the method moves the block coordinates to the right, i.e., gets the next sample block.

In step 509, if the right limit (i.e., the right edge) of the region has been reached, then the block coordinates for the image strip are moved downward at step 514. Otherwise (no at step 509), the method loops to step 505 and continues as before. At step 515, the image is tested to determine whether the bottom limit (i.e., bottom edge) of the region has been reached. If the bottom limit of the region has not been reached (no at step 515), then the method loops back to step 505 and continues. However, if the edge has been reached (yes at step 515), then at step 516 the sorting list is appended to the feature list and the method loops back to step 501 to begin examination of the next region.

Figure 6A:
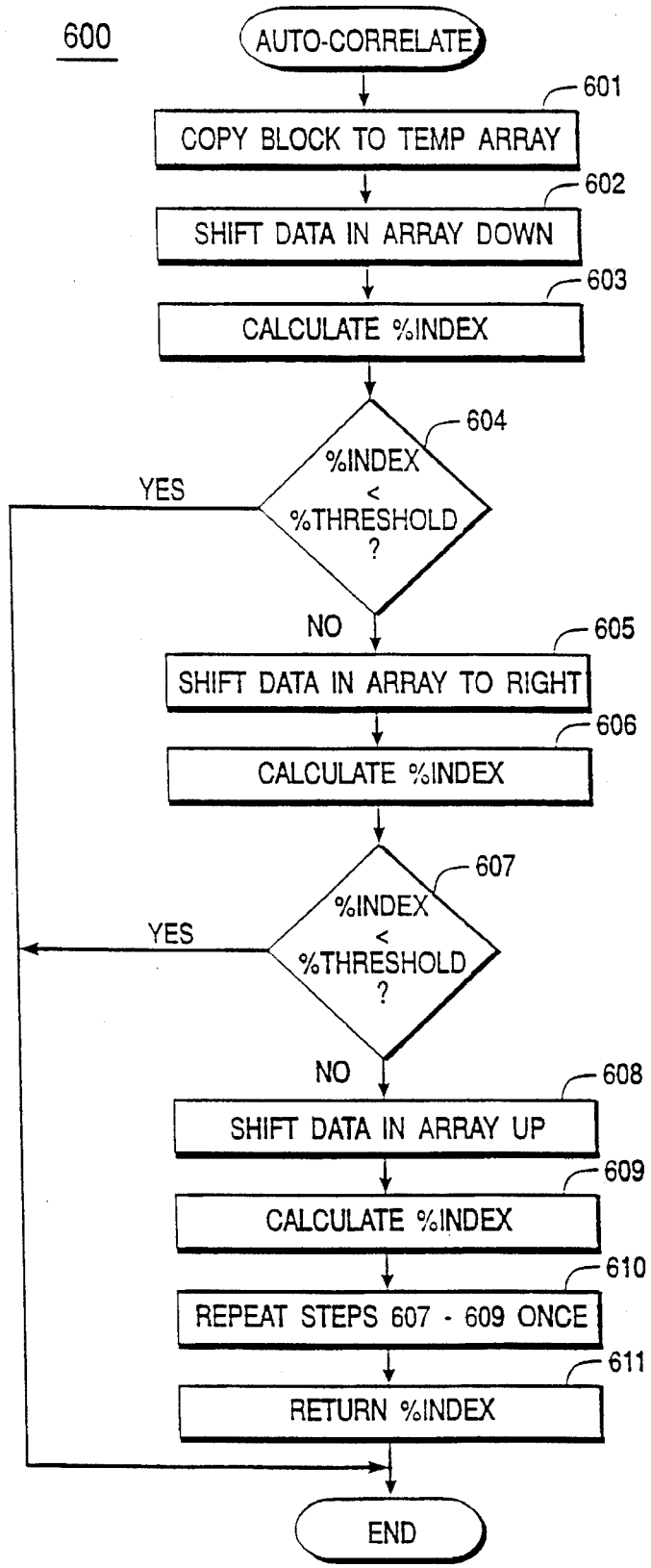
FIG. 6A is a flow chart of the Autocorrelate method of the present invention.
Figure 6B:
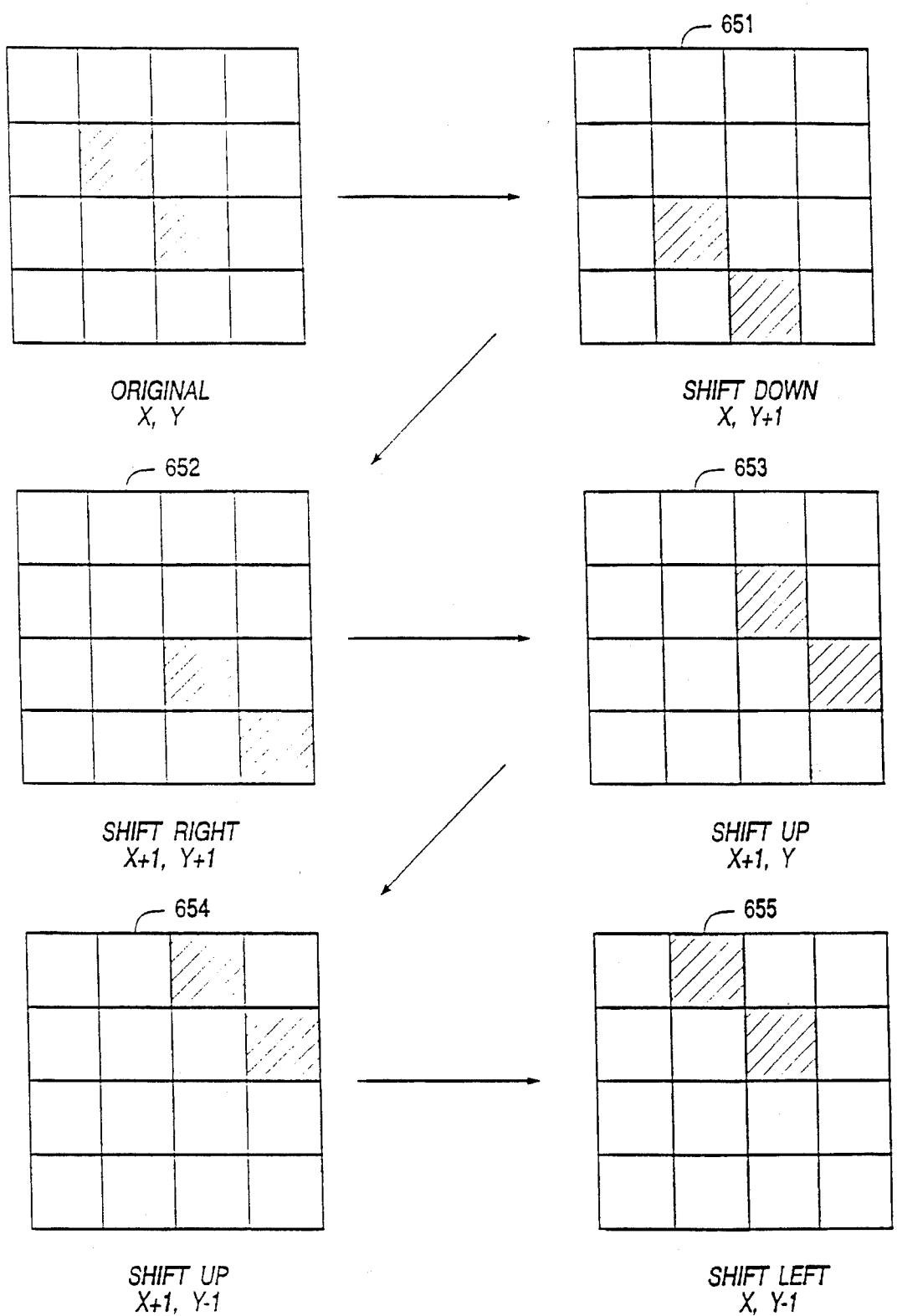
FIG. 6B illustrates the movement of pixels during the Autocorrelate method.

Referring now to FIGS. 6A–B, the Autocorrelate method, which is called in step 506 above, is illustrated. In the Autocorrelate method 600, a sample block of the image is examined to determine if it is a feature. This is determined by taking correlations of a sample block with a version of the block which has been moved. Each individual correlation must be larger than the current correlation threshold.

The individual steps of the method 600 will now be described in turn. In step 601, the current image block under examination is copied to a temporary data structure, such as a temporary array. In step 602, the data in the block array is shifted or moved downward, as illustrated by block 651 of FIG. 6B. In step 603, an index or score of correlation is determined from the absolute value of the subtraction of the shifted version from the original. The operation may be summarized by the following equation:

$$\% \text{ Index} = \sum_y \sum_x |\text{block}(x,y) - \text{block}(x,y+1)| \quad (1)$$

where x and y represent the horizontal and vertical coordinates, respectively, for a given point in the block.

In step 604, if the index is not less than the threshold, then in step 605 the data in the array is shifted to the right, as shown by block 652 of FIG. 6B. However, if the index is less than the threshold (yes at step 604), then the method concludes. After step 605, the index is calculated in step 606 by again determining the difference between the shifted version of an image block from the original block:

$$\% \text{ Index} = \quad (2)$$

$$\text{MIN}\left(\% \text{ Index}, \sum_y \sum_x |\text{block}(x,y) - \text{block}(x+1,y+1)|\right)$$

In step 607, again the index is tested to determine whether it is less than the threshold; if it is not, then in step 608 the data and the array is shifted upward, as shown by block 653 of FIG. 6B. Otherwise (yes at step 607), the method concludes. After step 608, the index is again calculated in step 609 as follows:

$$\% \text{ Index} = \quad (3)$$

$$\text{MIN}\left(\% \text{ Index}, \sum_y \sum_x |\text{block}(x,y) - \text{block}(x+1,y)|\right)$$

In step 610, the block is again shifted upward (block 654 of FIG. 6B) and the index calculated. In essence, step 610 repeats steps 607–609. Additional correlation operations (e.g., block 655), may be performed, as desired. In step 611, the index is returned.

Figure 7:
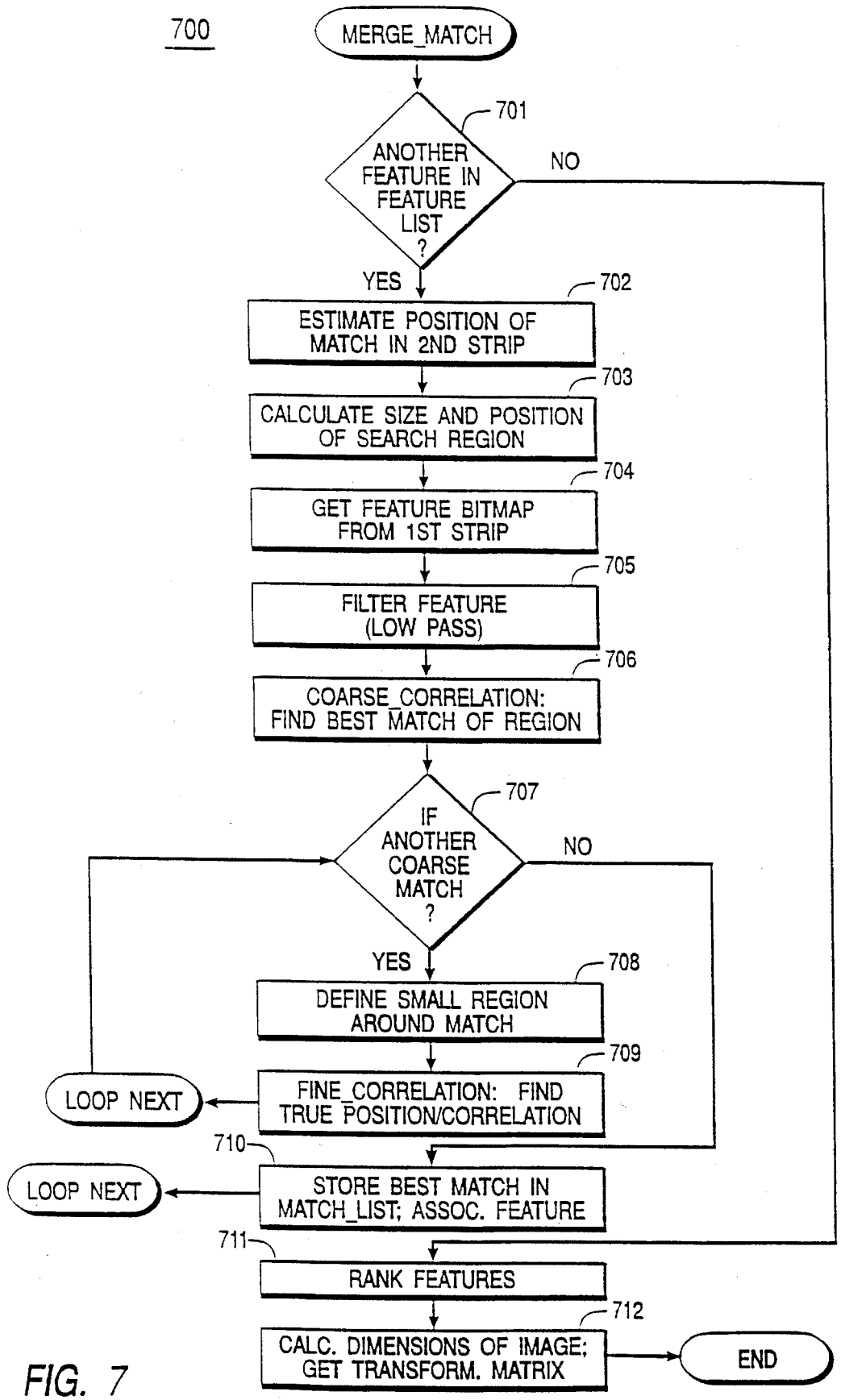
FIG. 7 is a flow chart of the M_MergeMatch method of the present invention.

Referring now to FIG. 7, the M_MergeMatch method or routine 700 is illustrated. In this method, for each feature found in the right strip, a corresponding feature is sought in the left strip. A list of matches in the second strip is then returned. Each step will now be described in further detail.

In step 701, a loop is established to examine all features in the Feature_List (i.e., the features returned from the first strip). If an additional feature exists, then in step 702 an estimate is made as to the position of a match in the second strip (based on the position of the feature in the first strip). In step 703, the size and position of the region to search is calculated based on the estimated position of the match.

In step 704, a bitmap of the feature of interest (from the first strip) is obtained. In step 705, the feature is filtered (e.g., by a low-pass filter) to smooth out its features. In step 706, a coarse correlation is made by invoking the Coarse Correlation method (set forth hereinbelow), which returns the best matches of the region using a subsample version of the feature under examination. Unlike a Fine Correlation method (described hereinbelow), the Coarse Correlation method only examines a select number of pixels (e.g., every other pixel).

In step 707, another loop is established to examine all coarse matches found (by the previous step). If another coarse match exists at step 707, then in step 708 a small region is defined around the match, and in step 709 the true position of the match is determined by calling the Fine Correlation method.

After fine correlation, the method loops back to step 707 for additional coarse matches. However, if another coarse match does not exist at step 707, then the method continues to step 710 where the best match (and associated features) is stored in a Match_List. The method then loops back to step 701 to process another feature. If an additional feature does not exist at step 701, however, then the method continues on to 711 where the features are ranked by the Rank_Features method (described hereinbelow). In step 712, the dimensions of the M_MergeImage are calculated and the method then concludes.

Figure 8A:
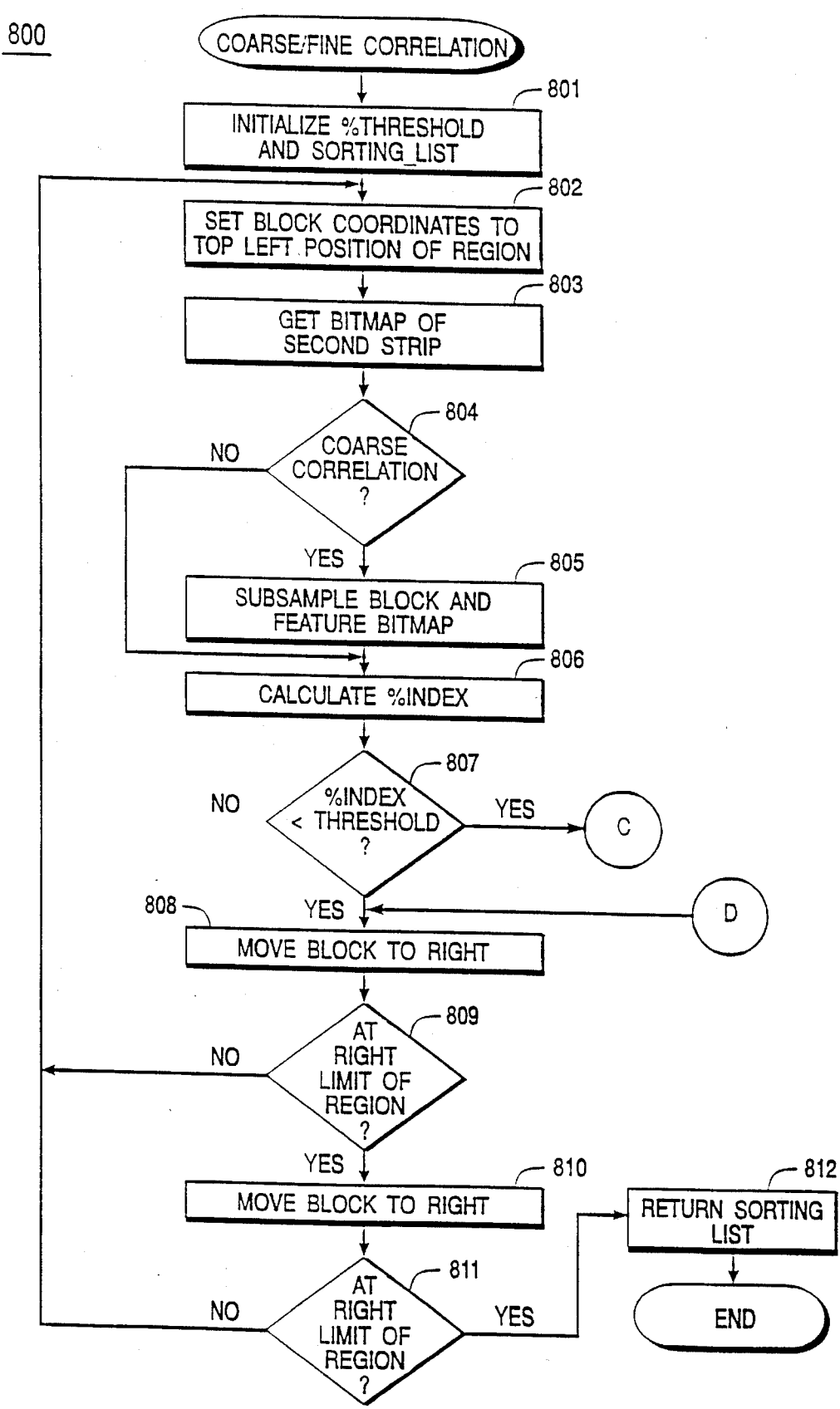
FIGS. 8A–B are a flow chart of the Coarse/Fine Correlation of the present invention.
Figure 8B:
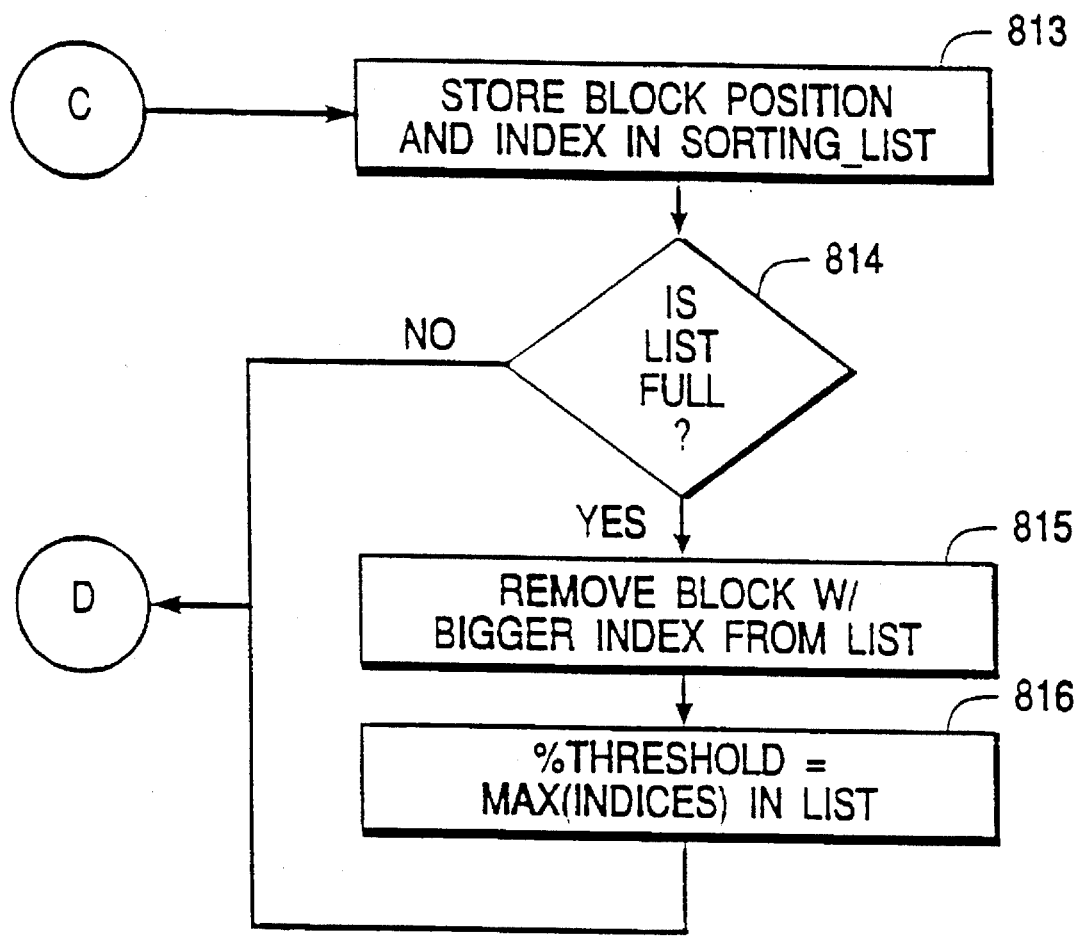

Referring now to FIGS. 8A–B, the Coarse/Fine correlation method 800 is illustrated by a flow chart. In the method 800, for a given feature and a given region of the second strip, a list of N best matches is returned, with the correlation performed at either coarse or fine resolution. As such, the operation of the method is very similar to that of the Auto-Correlation method. Instead of correlating an image block with a version of itself, however, method 800 seeks to correlate a feature from the first strip with an image block in the second strip. The steps of the method will now be described in detail.

In step 801, threshold and Sorting List data structures (previously described) are locally initialized. At step 802, the block coordinates for the strip are set to the top left position of the region. At step 803, the size of the second strip is determined. In step 804, if a coarse correlation is desired, then in step 805 a subsample block and feature bitmap are obtained. Otherwise (no at step 804), step 805 is skipped. At step 806, index is calculated from the equation:

$$\% \text{ Index} = \sum_y \sum_x |block(x,y) - \text{Feature}(x,y)| \quad (4)$$

At step 807, if the index is less than threshold, then in step 808 the block is moved to the right. Otherwise (no at step 807), the procedure jumps to step 813 (shown in FIG. 8B).

In step 813, the block position and index are stored in the Sorting_List. In step 814, if the list is full, then the method continues on to steps 815 and 816. If the list is not full however, then the procedure continues on to step 808. In step 815 the block with the biggest index is removed from the list. In step 816 the threshold is calculated from the maximum indices in the list. After step 816, the method jumps back to step 808.

In step 808, the block is moved to the right. At step 809, the block is tested to determine whether it is at the right limit of the region. If it is, then the block is moved to the right at step 810; otherwise (no), the method returns back to step 802. At step 811, if the right limit of the region has been reached, then the method returns the sorting list at step 812 and then concludes. If the right limit has not been reached (no at step 811), then the method loops back to step 802.

Figure 9A:
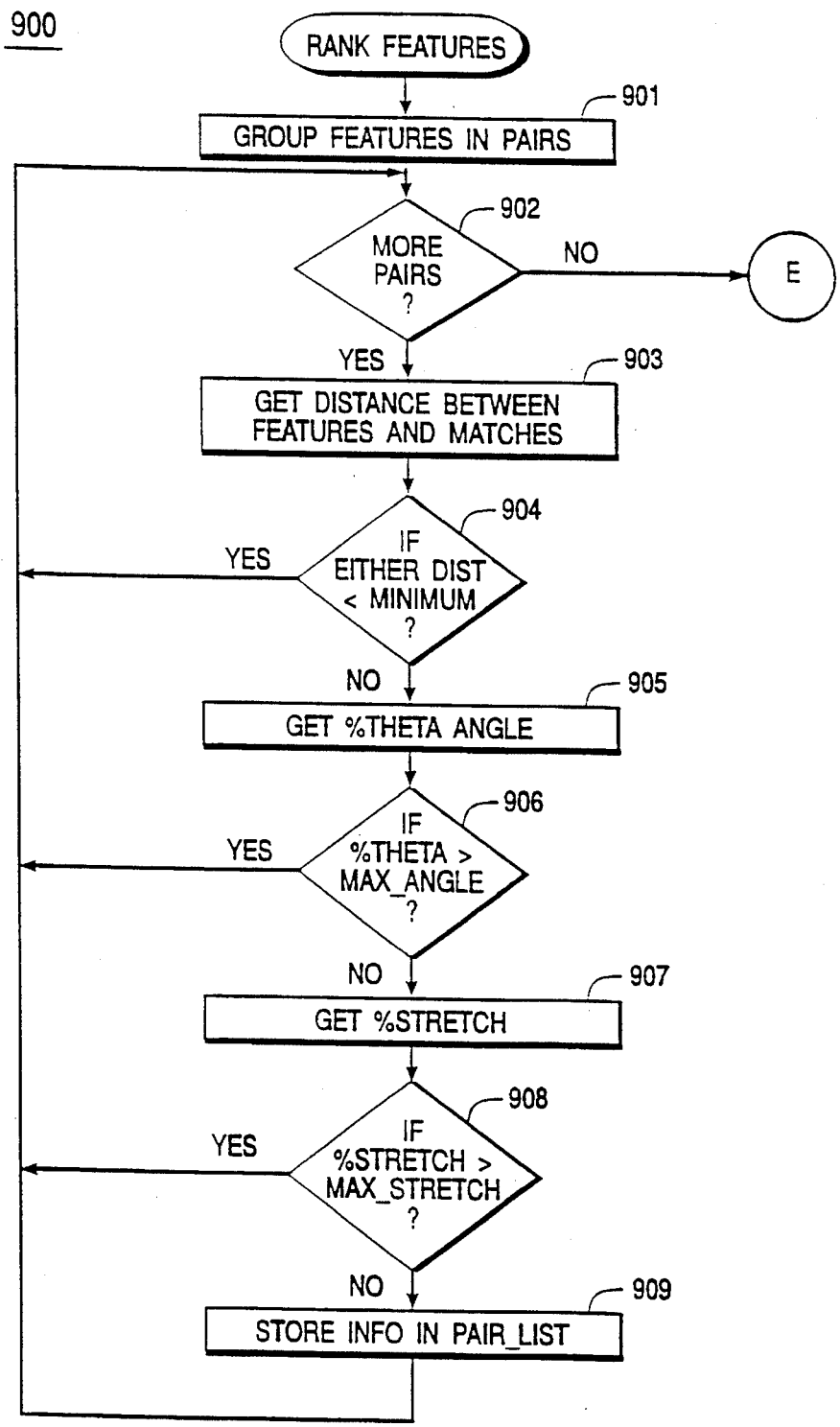
FIGS. 9A–B are a flow chart of the Rank_Features method of the present invention.
Figure 9B:
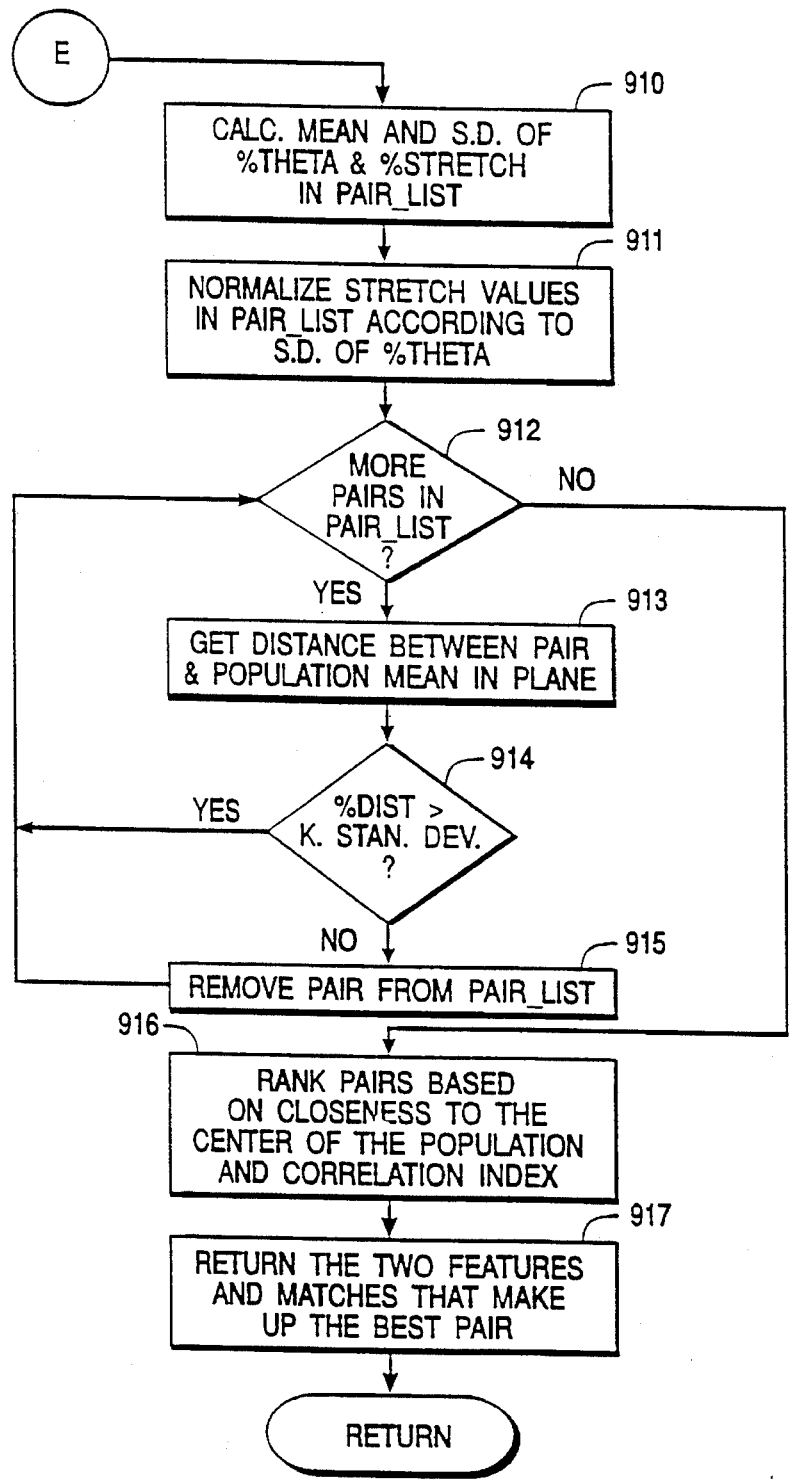

Referring now to FIGS. 9A–B, the Rank_Features method 900 is illustrated. In general, for a given list of features and a list of corresponding matches, the method returns the best pair of feature/match combination.

Figure 9E:
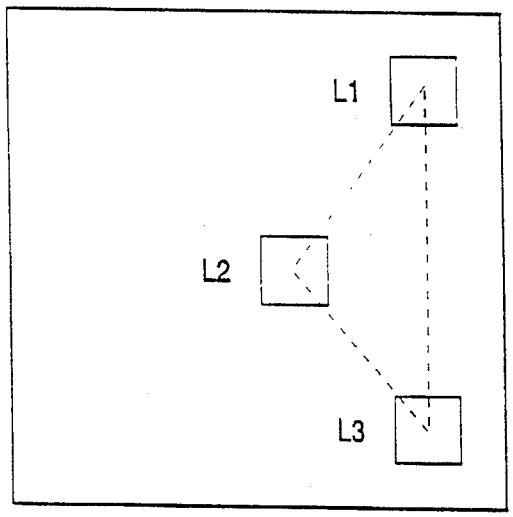
Figure 9E:
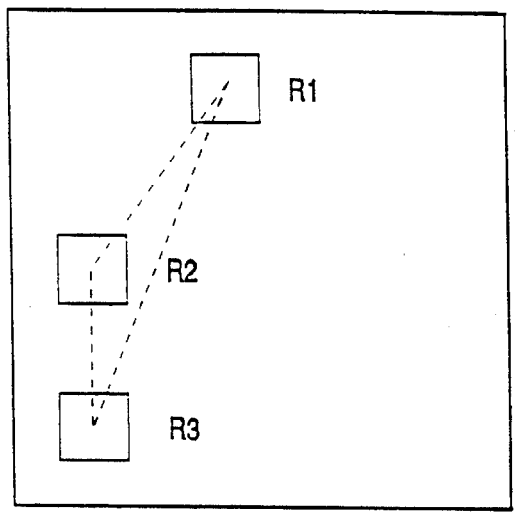

The steps of the method will now be described in further detail. In step 901, the features are grouped in pairs. As shown in FIGS. 9C–E, for example, possible pairs for the left strip include L1/L2, L1/L3, L2/L3, and so forth. In step 902, a loop is established for all pairs. If an additional pair exists in 902, then in step 903 the distance between members of the pair is determined. For example, for feature pair L1/L2 and match pair R1/R2, the distance may be determined:

$$\% F_{Dist} = |L1 - L2| \quad (5)$$

$$\% M_{Dist} = |R1 - R2|$$

In step 904, if either distance is less than a preselected minimum, then the method loops back to step 902. Otherwise, the method continues on to step 905 to determine theta—the angle between a line joining feature pairs and a line joining match pairs. In step 906, if theta is greater than a preselected maximum angle (i.e., the maximally allowed angle), then the method loops back to step 902 to examine another pair. If not, however, the method continues on to step 907 to get the stretch (i.e., compression and/or expansion transformation of one strip relative to another), which is determined from feature and corresponding match pairs as follows:

$$\% \text{Stretch} = \frac{\% F_{Dist}}{\% M_{Dist}} \quad (6)$$

Figure 9F:
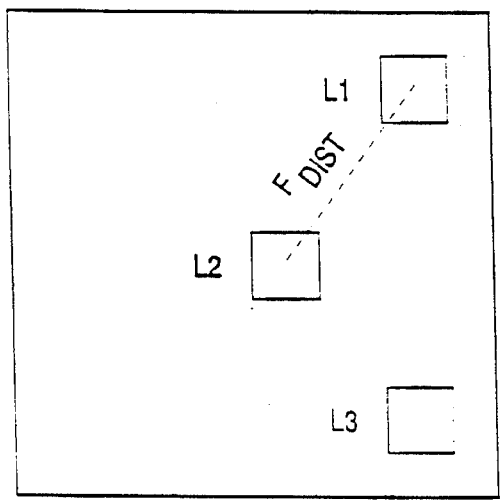
FIGS. 9F–G illustrate the calculation of stretching between image strips.
Figure 9G:
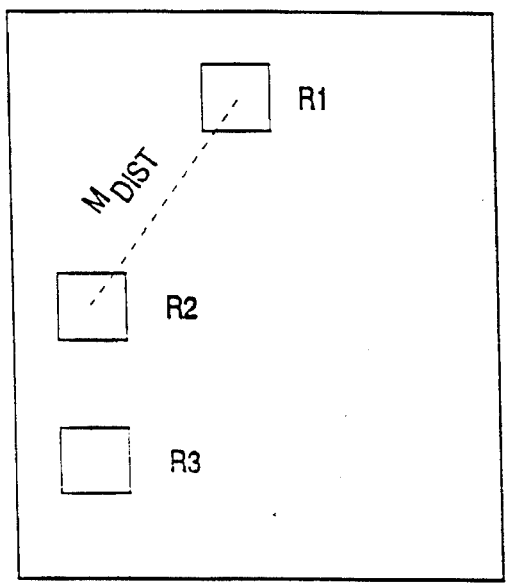
Figure 9H:
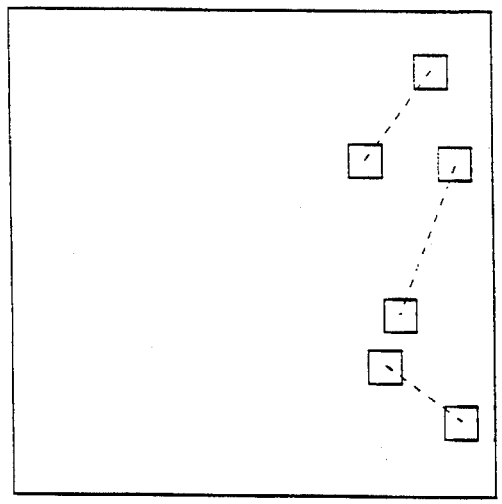
FIGS. 9H–I illustrate the calculation of multiple regions of compression and/or expansion between image strips.
Figure 9I:
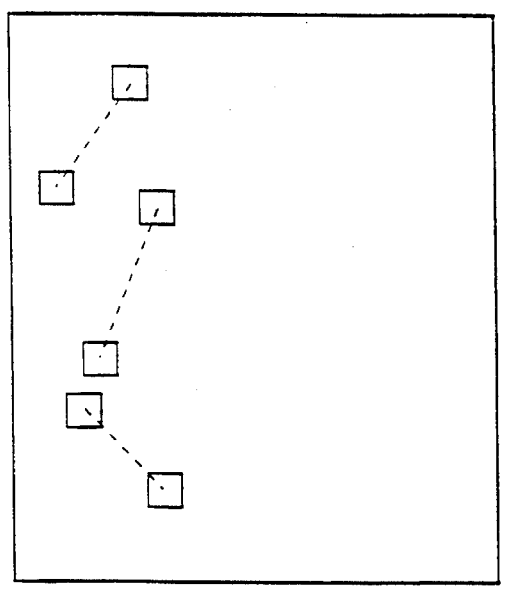

Referring to FIGS. 9D–E, the operation of determining stretch between strips is graphically shown. In FIG. 9F–G, the right strip is expanded or stretched relative to the left strip. The exact amount of stretch may be determined by the ratio of $F_{DIST}$ to $M_{DIST}$. The amount of stretching between images may not be constant, however. Therefore, as shown in FIGS. 9H–I, compression and/or expansion is measured at several locations of the image strips. From this information, areas may be selectively corrected for stretching.

In step 908, if stretch is greater than the maximum stretch, then the method loops back to step 902. Otherwise, the method continues on to step 909 to store the pair information in a Pair_List. After step 909, the method loops back to step 902 to process additional pairs.

After all pairs have been processed (i.e., no at step 902), the method continues on to step 910 to calculate the mean and standard deviation of theta and stretch in the Pair_List. In step 911, stretch values in the Pair_List are normalized according to the obtained standard deviation of theta. In step 912, a loop is established to examine all pairs of the Pair_List. If an additional pair remains at step 912, then the method continues on to step 913 to determine the distance between a pair and population mean in (theta, stretch) plane.

In step 914, if distance is greater than the computed standard deviation, then the method loops back to step 912 to examine another pair in the Pair_List. Otherwise (no at step 914), the pair is removed from the Pair_List at step 915, after which the method loops back to step 912.

If no more pairs remain to be examined in step 912, the method jumps to step 916 to rank the pairs in the Pair_List. This ranking is based on the closeness of a pair to the center of the population and correlation index. In step 917, the two features and matches which comprise the best Pair_List are returned, and the method concludes.

Figure 10A:
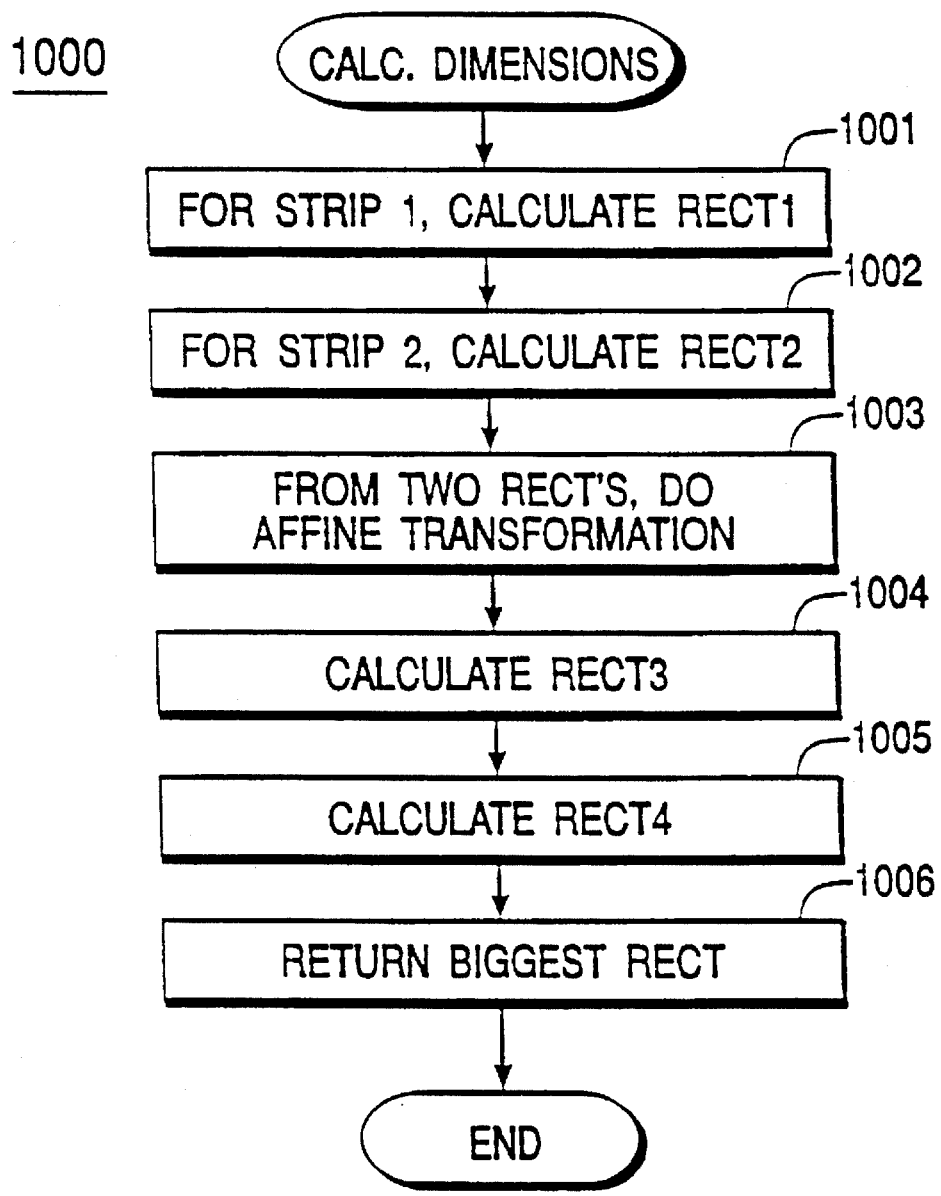
FIG. 10A is a flow chart of the Calculate Dimensions method of the present invention.
Figure 10B:
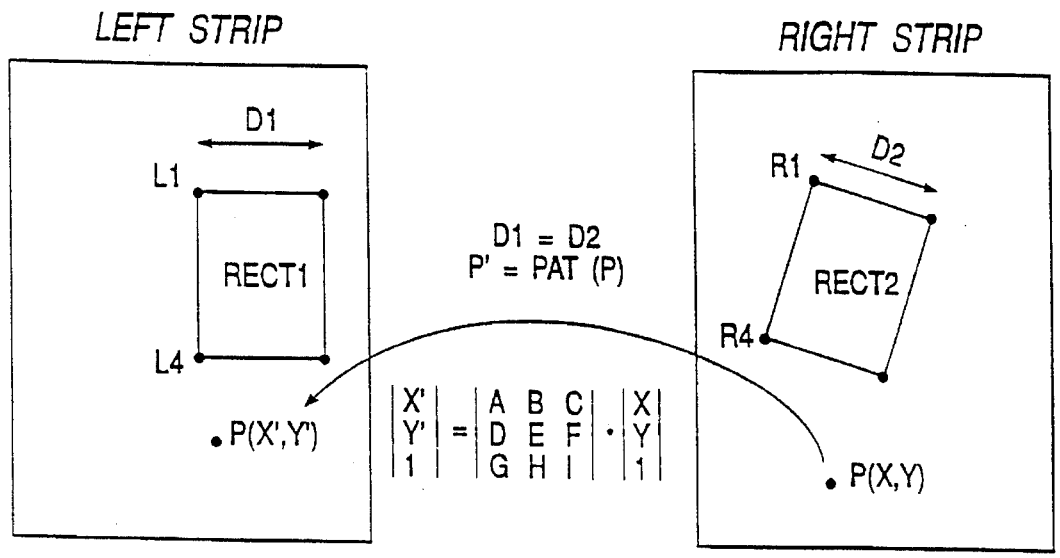
FIGS. 10B–C illustrate the calculation of rectangles and matrix operations for merging.
Figure 10C:
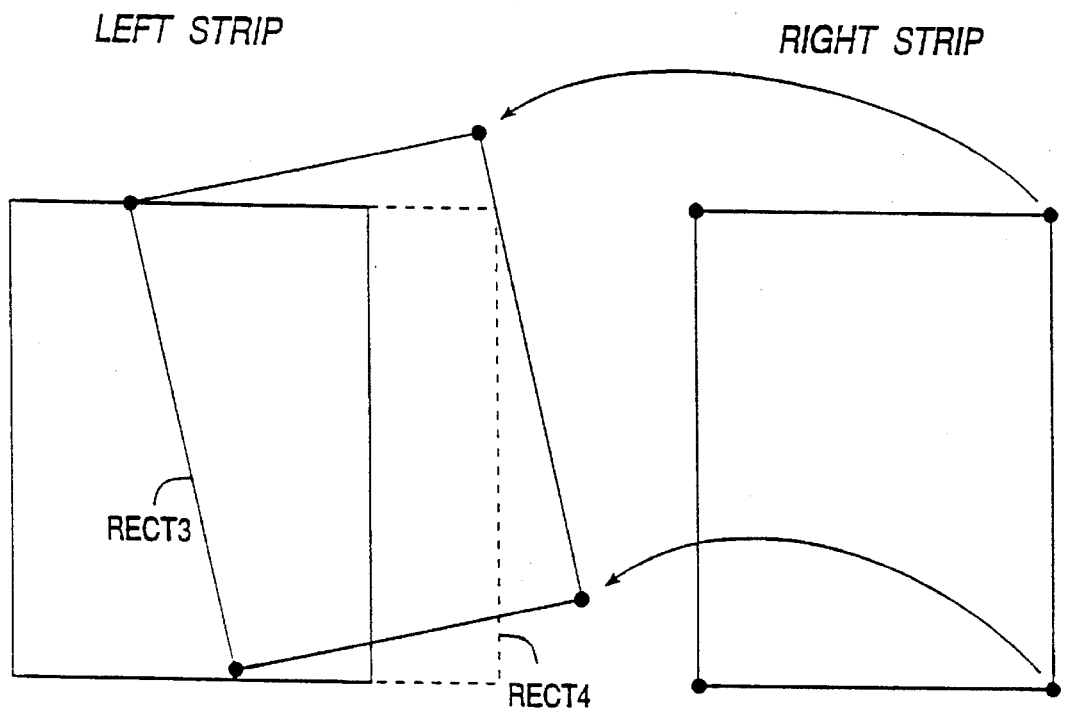

Referring now to FIGS. 10A–C, the Calculate Dimensions method 1000, which is invoked in step 712, is illustrated. For two features, their associated matches, and the bounding rectangles of two image strips (first strip and second strip), the method calculates the dimensions of the merged image. The method assumes that Automerge corrects only for rotation, stretching, and translation transformations. Those skilled in the art will appreciate that other transformations may be accommodated within the scope of the present invention. The steps of the method 1000 will now be described.

In step 1001, the coordinates of two points in strip one, which, together with the two features form a rectangle of arbitrary width (Rect1 of FIG. 10B) are calculated. In step 1002, a corresponding rectangle (Rect2 of FIG. 10B) is calculated for strip 2. In step 1003, for the two rectangles (Rect1 and Rect2) a projective affine transformation matrix is determined.

In step 1004, a third rectangle (Rect3 of FIG. 10C) is calculated from an outline of strip 2. In step 1005, a fourth rectangle (Rect4 of FIG. 10C) is calculated from a bounding rectangle of Rect3. In step 1006 the biggest rectangle, derived from Rect4 and the bounding rectangle of strip 1, is returned.

Figure 11:
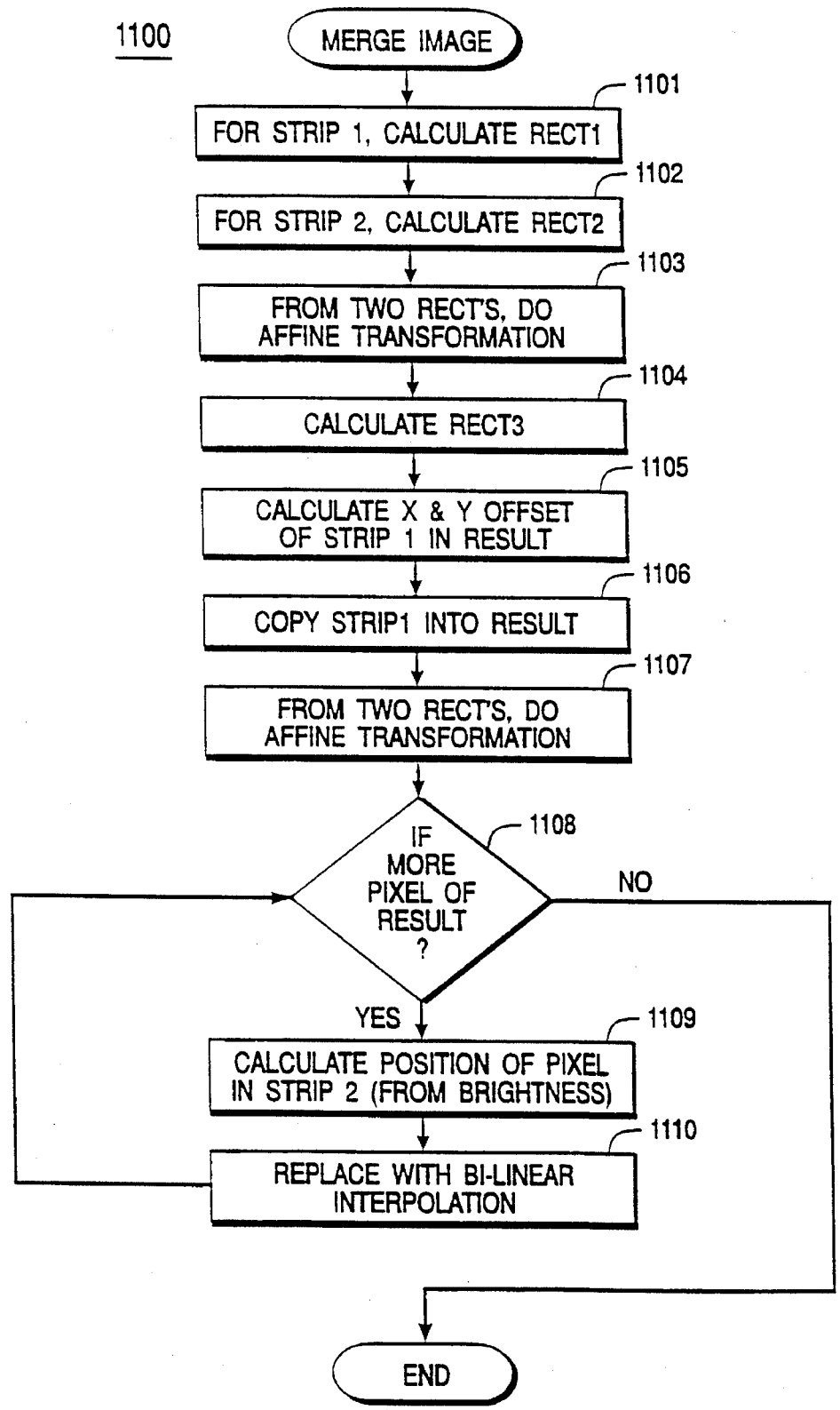
FIG. 11 is a flow chart of the M_MergeImage method of the present invention.

Referring now to FIG. 11, the M_MergeImage method 1100 is illustrated. For two image strips (strip 1 and strip 2), two features in strip 1, and two matches in strip 2, the method combines strip 1 and strip 2 into a resulting image (Result).

The individual steps of the method will now be described. In step 1101, a first rectangle (Rect1) is calculated for strip 1 (as described hereinabove). In step 102, a second rectangle (Rect2) is calculated for strip 2. In step 1103, from the two rectangles (Rect1 and Rect2) a projective affine transformation matrix (shown in FIG. 10B) is calculated. In step 1104, a third rectangle (Rect3) is calculated from an outline of strip 2 in Result. In step 1105, X and Y offsets of strip 1 (in Result) are calculated. In step 1106, the first strip is copied into Result. In step 1107, a projective affine transformation matrix is calculated from the two rectangles (Rect1 and Rect2).

In step 1108, a loop is established to examine each pixel of Result. If an additional pixel exists at step 1108, then in step 1109 the position of the pixel in the second strip is calculated (based on brightness). In step 1110, the Brightness (X, Y) is replaced with bi-linear interpolation, a known technique, after which the method loops back to step 1108 for another pixel of Result. If there are no more pixels (no at step 1108 no), then the method concludes. At the conclusion of the method, the two image strips have been merged.

Attached hereto as Appendix A are source code listings, implemented in the C programming language, providing a description of the invention suitable for use in a general purpose digital computer system, such as a plurality of IBM PC-compatible personal computers. Those skilled in the art will appreciate that the present invention may be implemented in other programming languages and/or other platforms.

While the invention is described in some detail with specific reference to a single preferred embodiment and certain alternatives, there is no intent to limit the invention to that particular embodiment or those specific alternatives. While specific examples have been shown using monochromatic bitmapped graphic images, for example, it will be apparent to those skilled in the art to apply the teachings of the present invention to other formats, including color bitmapped images, vector images, and the like. Therefore, the true scope of the invention is defined not by the foregoing description but by the following claims.

APPENDIX A

MERGE.H

```
typedef enum {
      MIC_BILEVEL,
      MIC_GRAYSCALE,
      MIC_TRUECOLOR,
} IMAGECLASS;

#ifndef WIN
typedef unsigned char BYTE;
typedef unsigned int BOOL;
#ifdef IMAGEPRO
typedef BYTE huge * LPBYTE;
#else
typedef BYTE far * LPBYTE;
#endif
endif typedef BYTE far * (far pascal * FPGETLINE)(short Line);

typedef struct {
      short Width, Height;
      IMAGECLASS Class;
      FPGETLINE GetLine;
} IMAGEINFO;

typedef struct {
      short xFind, yFind;
} FINDPOINT;

typedef struct {
      short xMatch, yMatch;
      short FindIndex;              /* index in list of FINDPOINT */
      long Confidence;   /* changed that */
} MATCHPOINT;

typedef enum {
      ME_SUCCESS = 0,
      ME_PARAMETER,                 /* programmer error - bad parameter */
      ME_USERABORT,                 /* abort callback function returned
FALSE */
      ME_IMAGEFUNCTION,     /* image get line function returned NULL */
      ME_SKEW,                          /* relative rotation > 12 degrees
*/
      ME_OVERLAP,                   /* insufficient overlap */
      ME_MEMORY,                    /* insufficient memory */
      ME_CORRELATION,    /* unable to find points (find function) */
      ME_MATCH,                         /* unable to match points */
      ME_MERGE,                         /* could not merge */
      ME_VER1,                          /* use > ME_VER1 for future
compatibility */
} MERGEERROR;

typedef enum {
      MC_RESET,
      MC_SETFEATUREINFO,
      MC_SETFINDREGIONS,
      MC_SETMATCHREGION,
      MC_SETFINDPOINTS,
      MC_SETMATCHPOINTS,
      MC_GETFEATUREINFO,
      MC_GETFINDREGIONS,
      MC_GETMATCHREGION,
      MC_GETFINDPOINTS,
```

```
        MC_GETMATCHPOINTS,
        MC_GETSTATISTICS,
        MC_GETVERSIONNUMBER,
} CONTROLCOMMAND;

typedef struct {
        short FindPoints;
        short FeatureWidth;
        short FeatureHeight;
        short Sampling;
        short Matches;
        BOOL Bilinear;
        BOOL Smoothing;
        short StretchPoints;
        short res1;
        short res2;
        short res3;
        short res4;
} FEATUREINFO;

typedef struct {
        short Width, Margin;    /* absolute values. Margin is the space to the
right of the region */
        short Top, Bottom;      /* values relative to the size of the image */
} FINDREGION;

typedef struct {
        short Width, Height;
        short Left, Top;
} MATCHREGION;

typedef struct {
        short Features;         /* number of features extracted by
M_MergeFind() */
        short TotalMatch; /* number of matches found by M_MergeMatch() */
        short ValidMatch; /* number of estimated valid matches */
        short TotalPair;  /* number of unique double feature combinations */
        short ValidPair;  /* number of estimated valid combinations */
        double MStretch;  /* mean value of relative stretch [.80 to 1.2] */
        double MRotate;        /* mean value of relative rotation (grad.) */
        double StStretch; /* standard dev. of relative stretch */
        double StRotate;  /* standard dev. of relative rotation */
} STATISTICS;

typedef IMAGEINFO far * LPIMAGE;

typedef BOOL (far pascal * FPABORT)(short Percent);   /* FALSE means abort
*/ typedef short MHANDLE;

MERGEERROR far pascal M_MergeFind(MHANDLE handle, LPIMAGE Left, FPABORT
Abort);
MERGEERROR far pascal M_MergeMatch(MHANDLE handle, LPIMAGE Left, LPIMAGE
Right, LPIMAGE Merge, FPABORT Abort);
MERGEERROR far pascal M_Merge(MHANDLE handle, LPIMAGE Left, LPIMAGE Right,
LPIMAGE Merge, FPABORT Abort);
MERGEERROR far pascal M_MergeControl(MHANDLE handle, CONTROLCOMMAND Command,
short SParam, void far *PParam);
MERGEERROR far pascal M_MergeOpen(MHANDLE far * handle);
/*****************************************************************/
/*      merge.h                                                  */
/*              Header file for AutoMerge. Should be included in the
application.      */
/*                                                              */
/*      Copyright (c) Logitech, Inc., 1991. JPM.                */
/*****************************************************************/
```

```
    MERGEERROR far pascal M_MergeClose(MHANDLE handle);

#ifndef FALSE
    #define FALSE 0
    #define TRUE !FALSE
    #endif define M_ABORTEND 100   /* indicates maximum value passed by abort function
    */
    typedef FEATUREINFO far * PFEATUREINFO;
    typedef MATCHREGION far * PMATCHREGION;
    typedef FINDPOINT far * PFINDPOINT;
    typedef MATCHPOINT far * PMATCHPOINT;
    typedef FINDREGION far * PFINDREGION;
    typedef STATISTICS far * PSTATISTICS;

typedef struct {
            int nMajor;
            int nMinor;
            char cRelLevel;
            int nRelNumber;
    } MVERSION;

    #define CLIPPING
```

```
MERGE.C
/*****************************************************************/
/*                                                               */
/* merge.c                                                       */
/*     Main module for automerge. All static variables are defined here, as */
/*                                                               */
/*     well as all the functions of the API.                     */
/*                                                               */
/*     Copyright (c) Logitech, Inc., 1991. JPM.                  */
/*                                                               */
/*     Help from JLB in definition of API and port to Windows.   */
/*****************************************************************/ include "mergelib.h"

/*****************************************************************/
/*                                                               */
/*                 Local structures definitions                  */
/*                                                               */
/*****************************************************************/

/*
        Struct MERGEINFO: contains the "environment" of an instance of
Auto-Merge.
        This way we avoid any confusion when several applications use the same
        DLL. The application does not have access to this structure, but to
its
        handle. The function M_MergeControl() can be used to get pieces of the
        environment. The field "Channel" is used to determine which channel of
        a color image is used during feature extranction and matching. It is
        also used to indicate that images are gray scale or binary. Possible
        values are:
*/ typedef enum {
        BT_8BIT,                // image is gray scale. use everything.
        BT_BILEVEL,     // 1 bit/pixel compacted.
        BT_RED,                 // use red channel of a color image.
        BT_GREEN,       // use green ...
        BT_BLUE,                // use blue ...
        BT_INTENS,      // use (red + green + blue) / 3.
} BITMAPTYPE;

typedef struct _mergeinfo{
        FEATUREINFO Feature;
        PFINDREGION FindReg;
        short RegionCount;              // number of find-regions.
        MATCHREGION MatchReg;
        PFINDPOINT FindPts;
        short FindCount;                // number of features found.
        PMATCHPOINT MatchPts;
        short MatchCount;               // number of matches found.
        STATISTICS Statistics;  // various statistics about the matching
phase.
        BITMAPTYPE Channel;             // channel used during the find/match
phases.
        MHANDLE Handle;
        struct _mergeinfo far *Next;
} MERGEINFO;

typedef MERGEINFO far * PMERGEINFO;
/*
        Struct CORELSORT: link list used internally for fast sorting.
*/ struct CORELSORT {short x; short y; long index; struct CORELSORT far *next;
};
typedef struct CORELSORT far * PCORELSORT;
```

```
/*********************************************************************/
/*                                                                   */
/*                        Globals variables                          */
/*                                                                   */
/*********************************************************************/ define NUMFINDREGIONS 4              /* Number of regions of the left
images                                                          where
M_MergeFind is investigating. */ define NUMFEATURES 3                 /* Number of features identified
in each
                                                                region. */ define NUMMATCHES 1                  /* Number of matches to analyse
per feature */
define MAXSTRETCHPOINTS 24 static FEATUREINFO Default_Feature = { NUMFEATURES,
                                       16,          /*
width of feature */
                                       16,          /*
height of feature */
                                       2,           /*
sampling */
                                       NUMMATCHES,  /* matches
per feature */
                                       TRUE,        /*
Bi-linear scaling */
                                       TRUE,        /*
smoothing of left image */
                                       12};         /*
number of stretching points */ static MATCHREGION Default_MatchRegion = {150,     /* width */
                                          110,  /*
height */
                                          0,    /*
x-offset */
                                          0};   /*
y-offset */

/*
      Relative left, top, right and bottom positions of each find-region.
 1000  means full width of height.
*/ static FINDREGION Default_FindRegions[NUMFINDREGIONS] =
       {{50, 0, 50, 275},      /* abs. width, abs. left margin, rel. top,
rel. bottom */
        { 50, 0, 275, 500},
        { 50, 0, 500, 725},
        { 50, 0, 725, 950}};

static PMERGEINFO Head = NULL;        /* head of the link list of
environments */
static MHANDLE HandleCount = 0;       /* counter of environment */ static MVERSION VersionNumber = {1, 0, 'B', 6};

/*********************************************************************/
/*                                                                   */
```

```
/*                    Local functions definitions                        */
/*                                                                       */
/*************************************************************************/

     static PMERGEINFO near GetMergeInfo(MHANDLE handle);
      static void near FreeMergeInfo(PMERGEINFO merge);

static MERGEERROR near AllocateMergeInfo(
            PMERGEINFO tmp,
            short numreg);

static MERGEERROR near GetImageArea(
            LPIMAGE Image,
            short x1,
15          short y1,
            short x2,
            short y2,
            BYTE far *buffer,
            BITMAPTYPE channel,
            short increment);

static MERGEERROR near RankFeatures(
            PFINDPOINT FPts,
            PMATCHPOINT MPts,
            short MatchCount,
            PSTATISTICS stats);

static MERGEERROR near CorrelateFeature(
            LPIMAGE Right,
            PMRECT bounds,
            BYTE far *sbuf,
            short swidth,
            short sheight,
            PCORELSORT far *sortlist,
            short far *numsort,
            short inc,
            BITMAPTYPE channel);

static short near FindFeatures(
            LPIMAGE Left,
            PFEATUREINFO Feature,
            PFINDREGION FindReg,
            PFINDPOINT Point,
            short Wanted,
            BITMAPTYPE channel);

static short near MatchFeature(
            LPIMAGE Left,
            LPIMAGE Right,
            PFEATUREINFO Feature,
            PMATCHREGION MatchReg,
            PFINDPOINT FPt,
            PMATCHPOINT MPts,
            BITMAPTYPE channel);
   static MRECT near GetRegionBounds(
            LPIMAGE Left,
            PFINDREGION FindReg);
      static void near OffsetPolygon(
            LPTWOINTS points,
            int far *offsety,
            int numPoints);
      static long near autocorrelate(
            BYTE far * far *lptr,
            short width,
            short height,
```

```
           short inc,
           long threshold);

static long near correlate(
           BYTE far * sourcearray,
           BYTE far * far *lptr,
           short width,
           short height,
           long threshold,
           short inc);

static MERGEERROR FilterFeature(
           BYTE far * sbuf,
           BYTE far * dbuf,
           short sizex,
           short sizey);

static void ClipPolygon(LPTWOINTS poly);
    static MERGEERROR StretchCorrect(
                                LPIMAGE Merge,
                                LPIMAGE Right,
                                PFEATUREINFO Feature,
                                short Seamx,
                                double far *Coef,
                                int far * offsets,
                                BITMAPTYPE Channel);

static long near Vautocorrelate(
           BYTE far * far *lptr,
           short width,
           short height,
           short inc);

static MERGEERROR VFindFeature(
           LPIMAGE Left,
           PMRECT bounds,
           short fwidth,
           short fheight,
           LPTWOINTS pt,
           short Channel);

static void interpolate(int x1, int y1, int x2, int y2, int far *list);
    static MERGEERROR CheckBounds(short far *value, short min, short max);
    static void BlendSeam(LPIMAGE Merge, int seamx);

/****************************************************************/
    /*                                                              */
    /*                            API                               */
    /*                                                              */
    /****************************************************************/

/*
           Find function: searches one image (left image) for features that are
           good candidate for future matching. The function outputs the results
           in a list of points (Points). The number of points to find, and areas
           to search have default values (12 points over 4 areas), that can be
           changed though the control function. In the case of color images the
           find function will first try to use the red channel only. If that
    fails,
           it will try to use green and then blue. The matching function will use
           the same channel.
    */ ifdef DEBUG
    static FILE *fp = NULL;
    #endif

MERGEERROR far pascal
```

```
     M_MergeFind(
             MHANDLE handle,
             LPIMAGE Left,
             FPABORT Abort)
     {
             PMERGEINFO tmp;
             MERGEERROR errval = ME_SUCCESS;
             int i;
             short abort_inc, wanted;
             BOOL doitagain = TRUE;

#ifdef DEBUG
             int j = 0;
             fp = fopen("debug", "w");
     #endif /* get the pointer to the environment */ if((tmp = GetMergeInfo(handle)) == NULL)
20                   return ME_PARAMETER;

if(Abort != NULL)
                     (*Abort)(0);

             /* identify channel or image type */ switch(Left->Class){
                     case MIC_BILEVEL:
                             tmp->Channel = BT_BILEVEL;
                             break;

case MIC_GRAYSCALE:
                             tmp->Channel = BT_8BIT;
                             break;
35
                     case MIC_TRUECOLOR:
                             tmp->Channel = BT_GREEN;
                             break;

                     default:
                             return ME_PARAMETER;
                             break;
             }

             tmp->Statistics.Features = tmp->FindCount = 0;

/* allocate feature list */
             if(tmp->FindPts != NULL)
                     MergeFarFree(tmp->FindPts);

if((tmp->FindPts = MergeFarMalloc(sizeof(FINDPOINT) * \
                                                     tmp->RegionCount * \
                                                     tmp->Feature.FindPoints)) ==
     NULL)
                     return ME_MEMORY;

/*
                     for each region in the left image, indentify features of
     interest.
                     The number of features to find in each region, is contained in
                     FEATUREINFO.
             */

             /* increment in percent */
             abort_inc = M_ABORTEND / (tmp->RegionCount * tmp->Feature.FindPoints);

while(doitagain){
```

```
            /* for each find-region... */
            for(i = 0; i < tmp->RegionCount && doitagain; i++){
                if(Abort != NULL)
                    doitagain = (*Abort)(abort_inc * tmp->FindCount);

/* number of features wanted in the current region */
                wanted = (i + 1) * tmp->Feature.FindPoints -
tmp->FindCount;

tmp->FindCount += FindFeatures(Left, &tmp->Feature,
    &tmp->FindReg[i],
    &tmp->FindPts[tmp->FindCount], wanted,
                                                    tmp->Channel);

#ifdef DEBUG
                for(; j < tmp->FindCount; j++)
                    fprintf(fp, "F#%2d [%4d, %4d]\n", j,
tmp->FindPts[j].xFind, tmp->FindPts[j].yFind);
#endif
            }
            /*
                At least 2 features are needed to define a transformation.
    If
                color image, look at next channel. If blue channel,
    terminate.
            */
            if(tmp->FindCount < 2 &&
                    Left->Class == MIC_TRUECOLOR &&
                    tmp->Channel != BT_BLUE){ if(tmp->Channel == BT_GREEN)
                    tmp->Channel = BT_RED;
                else
                    tmp->Channel = BT_BLUE;

tmp->FindCount = 0;
            }
            else
                break;
        }
        if(tmp->FindCount < 2)
            errval = ME_CORRELATION;
        else if(!doitagain)
            errval = ME_USERABORT;

tmp->Statistics.Features = tmp->FindCount;

if(Abort != NULL)
            (*Abort)(M_ABORTEND);

#ifdef DEBUG
        fclose(fp);
endif return errval;
    }

/*
```

```
        Match function: takes two images and a list of points (features), and
        generates a list of matches. Also determines size of future merged
        image, and assigns corresponding fields in LPIMAGE structure.
    */
    MERGEERROR far pascal
    M_MergeMatch(
            MHANDLE handle,
10          LPIMAGE Left,
            LPIMAGE Right,
            LPIMAGE Merge,
            FPABORT Abort)
    {
            PMERGEINFO tmp;
            MERGEERROR errval = ME_SUCCESS;
            int i;
            int polygon[6][2];
            MRECT Rect;
            int j = 0;
            short abort_inc;
            BOOL doitagain = TRUE;
            double Coef[8];

#ifdef DEBUG
            fp = fopen("debug", "a");
    #endif

/* get the pointer to the environment */

            if((tmp = GetMergeInfo(handle)) == NULL ||
                    tmp->FindCount <= 0 ||
                    tmp->FindPts == NULL)

return ME_PARAMETER;
            if(Abort != NULL)
                    (*Abort)(0);

/* if not done yet, determine channel of color image to use */
            if(tmp->Channel < 0)
                    switch(Left->Class){
                            case MIC_BILEVEL:
                                    tmp->Channel = BT_BILEVEL;
45                                  break;

case MIC_GRAYSCALE:
                                    tmp->Channel = BT_8BIT;
                                    break;
50
                            case MIC_TRUECOLOR:
                                    tmp->Channel = BT_RED;
                                    break;

                            default:
                                    return ME_PARAMETER;
                                    break;
                    }

            tmp->Statistics.TotalMatch = tmp->MatchCount = 0;

/* allocate match points list */ if(tmp->MatchPts != NULL)
                    MergeFarFree(tmp->MatchPts);

if((tmp->MatchPts = MergeFarMalloc(sizeof(MATCHPOINT) * \
                                                    tmp->FindCount * \
```

```
                                                        tmp->Feature.Matches)) ==
NULL)
                return ME_MEMORY;

abort_inc = M_ABORTEND / tmp->FindCount;   /* increment in percent */

/* For each feature, find the best match in the right image */ for(i = 0; i < tmp->FindCount && doitagain; i++){
                if(Abort != NULL)
                        doitagain = (*Abort)(abort_inc * i);

tmp->MatchCount += MatchFeature(Left, Right, &tmp->Feature,
                                        &tmp->MatchReg, &tmp->FindPts[i],
                                        &tmp->MatchPts[tmp->MatchCount],
                                        tmp->Channel);

for(; j < tmp->MatchCount; j++){
                        tmp->MatchPts[j].FindIndex = i;
#ifdef DEBUG
                        fprintf(fp, " > F#%2d [%4d, %4d] > M#%2d [%4d, %4d]", i,
                                tmp->FindPts[i].xFind, tmp->FindPts[i].yFind, j,
                                tmp->MatchPts[j].xMatch,tmp->MatchPts[j].yMatch);
#endif
                }
#ifdef DEBUG
                fprintf(fp, "\n");
#endif
        }

/*
                Find the two best feature/match. Store them in the first and
                second elements of Points.
        */ if(!doitagain)
                return ME_USERABORT;
        else if(tmp->MatchCount < 2)
                return ME_MATCH;

tmp->Statistics.TotalMatch = tmp->MatchCount;

if((errval = RankFeatures(tmp->FindPts, tmp->MatchPts,
tmp->MatchCount,
                &tmp->Statistics)) == ME_SUCCESS){

/*
                        Given the transformation defined by the two feature/match,
                        calculate size of merged image. First calculate the
position
                        (polygon) of the four corners of the right image after it
has
                        been merged.
                */
                polygon[0][0] = polygon[0][1] = polygon[1][0] = polygon[3][1] =
0;
                polygon[1][1] = polygon[2][1] = Right->Height -1;
                polygon[2][0] = polygon[3][0] = Right->Width -1;

if((errval = FindTransformMatrix(tmp->FindPts, tmp->MatchPts,
                                (double far *)Coef, MATRIX_INVERSE)) ==
ME_SUCCESS){
                        TransformPolygon((double far *)Coef, (LPTWOINTS)polygon,
4);
```

```
                /* add two opposite corners of left image to polygon */ polygon[4][0] = polygon[4][1] = 0;
                polygon[5][0] = Left->Width - 1;
                polygon[5][1] = Left->Height - 1;

/* size of merged image: */ ifdef CLIPPING
                ClipPolygon((LPTWOINTS)polygon);
        #endif

Rect = GetBoundingBox((LPTWOINTS)polygon, 6);

                Merge->Width = Rect.x2 - Rect.x1 + 1;
                Merge->Height = Rect.y2 - Rect.y1 + 1;
            }
        }

        if(Abort != NULL)
                (*Abort)(M_ABORTEND);

#ifdef DEBUG
                fclose(fp);
25      #endif return errval;
        }

        /*
                Merge function: generates a composite image (Merge), out of two
                images (Left and Right) and a list of feature/match pairs.
        */

MERGEERROR far pascal
        M_Merge(
                MHANDLE handle,
40              LPIMAGE Left,
                LPIMAGE Right,
                LPIMAGE Merge,
                FPABORT Abort)
        {
                PMERGEINFO tmp;
                MERGEERROR errval = ME_SUCCESS;
                int polygon[6][2];
                double Coef[8];
                int far *offsets = NULL;
                /* Get the pointer to the environment. */ if((tmp = GetMergeInfo(handle)) == NULL)
                        return ME_PARAMETER;
                if(Abort != NULL)
                        (*Abort)(0);

#ifdef DEBUG
                fp = fopen("debug", "a");
        #endif ifndef IMAGEPRO
                /* get the position of the transformed right image */
                polygon[0][0] = polygon[0][1] = polygon[1][0] = polygon[3][1] = 0;
                polygon[1][1] = polygon[2][1] = Right->Height -1;
                polygon[2][0] = polygon[3][0] = Right->Width -1;
```

```
            if((errval = FindTransformMatrix(tmp->FindPts, tmp->MatchPts,
                            (double far *)Coef, MATRIX_INVERSE)) ==
ME_SUCCESS){
                int i;
                short offsety;

TransformPolygon((double far *)Coef, (LPTWOINTS)polygon, 4);

#ifdef CLIPPING
                polygon[4][0] = polygon[4][1] = 0;
                polygon[5][0] = Left->Width - 1;
                polygon[5][1] = Left->Height - 1;
                ClipPolygon((LPTWOINTS)polygon);

#endif
                /* move position of transformed right image so it fits in merge
    image */
                OffsetPolygon((LPTWOINTS)polygon, (int far *)&offsety, 4);

/* move registration pts in left image accordingly */
                for(i = 0; i < 2; i++)
                    tmp->FindPts[tmp->MatchPts[i].FindIndex].yFind += offsety;

if((errval = FindTransformMatrix(tmp->FindPts, tmp->MatchPts,
                            (double far *)Coef, MATRIX_DIRECT)) ==
ME_SUCCESS){ ifdef CLIPPING
                /* copy left image into merge image */
                    CopyImage(Left, Merge, polygon[4][1], polygon[5][1],
    tmp->Feature.Smoothing, Abort);

/* Non-linear stretching correction */
                    if(tmp->Feature.StretchPoints > 0 &&
                        (offsets = MergeFarMalloc(Right->Height *
    sizeof(int))) != NULL){
                        if(Abort != NULL)
                            (*Abort)(M_ABORTCOPY);

if(StretchCorrect(Merge, Right, &tmp->Feature,
    polygon[0][0]-2,
                            Coef, (int far *) offsets, tmp->Channel)
    != ME_SUCCESS){ if(Abort != NULL)
                                (*Abort)(M_ABORTSTRETCH);

MergeFarFree(offsets);
                            offsets = NULL;
                        }
                    } else
                    CopyImage(Left, Merge, 0, offsety, tmp->Feature.Smoothing,
    Abort);
#endif
                    /* transform right image. put result in merge image. */
                    errval = TransformImage(Right, Merge, Coef,
    (LPTWOINTS)polygon,
                                        tmp->Feature.Bilinear,
    offsets, Abort);

if(offsets != NULL)
                        MergeFarFree(offsets);
```

```
#ifdef CLIPPING
                BlendSeam(Merge, polygon[0][0]);
#endif
            }
    } else
        C_FakeRegister(tmp->FindPts, tmp->MatchPts);
endif if(Abort != NULL)
            (*Abort)(M_ABORTEND);
#ifdef DEBUG
        if(fp != NULL)
            fclose(fp);
endif
        return errval;
}

/*
        Control function: change default values of various user-modifiable
        parameters (search areas, number of features, angle max, etc...)
*/

MERGEERROR far pascal
M_MergeControl(
        MHANDLE handle,
        CONTROLCOMMAND Command,
        short SParam,
        void far *PParam)
{
        PMERGEINFO tmp;
        MERGEERROR errval = ME_SUCCESS;
        PFINDREGION newreg;
        PFINDPOINT newfindpts;
        PMATCHPOINT newmatchpts;

if((tmp = GetMergeInfo(handle)) == NULL)
            return ME_PARAMETER;

switch(Command){ case MC_RESET:
                /*
                    Allocate the memory needed for default settings. The current
                    pointers will be freed automaticaly.
                */
                if((errval = AllocateMergeInfo(tmp, NUMFINDREGIONS)) == ME_SUCCESS){

/* copy default settings */
                    memcpy(&tmp->Feature, &Default_Feature, sizeof(FEATUREINFO));
                    memcpy(tmp->FindReg, Default_FindRegions, NUMFINDREGIONS * sizeof(FINDREGION));
                    memcpy(&tmp->MatchReg, &Default_MatchRegion, sizeof(MATCHREGION));
                }
                else{
                    /* if cannot reset, remove environment from list */
```

```
                        M_MergeClose(handle);
                        errval = ME_MEMORY;
                }
                break;
        case MC_SETFEATUREINFO:
                memcpy(&tmp->Feature, PParam, sizeof(FEATUREINFO));
                CheckBounds(&tmp->Feature.StretchPoints, 0,
MAXSTRETCHPOINTS);
                CheckBounds(&tmp->Feature.FeatureWidth, 8, 128);
                CheckBounds(&tmp->Feature.FeatureHeight, 8, 128);
                CheckBounds(&tmp->Feature.Sampling, 1, 8);
                break;

case MC_SETFINDREGIONS:
                if(SParam > tmp->RegionCount){
                        if((newreg = MergeFarMalloc(sizeof(FINDREGION) *
SParam)) != NULL){
                                MergeFarFree(tmp->FindReg);
                                tmp->FindReg = newreg;
                        }
                        else
                                errval = ME_MEMORY;
                }
                if(errval == ME_SUCCESS){
                        memcpy(tmp->FindReg, PParam, SParam *
sizeof(FINDREGION));
                        tmp->RegionCount = SParam;
                }
                break;

case MC_SETMATCHREGION:
                memcpy(&tmp->MatchReg, PParam, sizeof(MATCHREGION));
                break;

case MC_SETFINDPOINTS:
                if(SParam > tmp->RegionCount * tmp->Feature.FindPoints ||
                        tmp->FindPts == NULL){
                        if((newfindpts = MergeFarMalloc(sizeof(FINDPOINT) *
SParam)) != NULL){
                                if(tmp->FindPts == NULL)
                                        MergeFarFree(tmp->FindPts);

tmp->FindPts = newfindpts;
                        }
                        else
                                errval = ME_MEMORY;
                }
                if(errval == ME_SUCCESS){
                        memcpy(tmp->FindPts, PParam, SParam *
sizeof(FINDPOINT));
                        tmp->FindCount = SParam;
                }
                break;

case MC_SETMATCHPOINTS:
                if(SParam > tmp->RegionCount * tmp->Feature.FindPoints *
tmp->Feature.Matches ||
                        tmp->MatchPts == NULL){
                        if((newmatchpts = MergeFarMalloc(sizeof(MATCHPOINT)
* SParam)) != NULL){
                                if(tmp->MatchPts == NULL)
                                        MergeFarFree(tmp->MatchPts);
```

```
                              tmp->MatchPts = newmatchpts;
                    }
                    else
                              errval = ME_MEMORY;
          }
          if(errval == ME_SUCCESS){
                    memcpy(tmp->MatchPts, PParam, SParam *
sizeof(MATCHPOINT));
                    tmp->MatchCount = SParam;
          }
          break;

case MC_GETFEATUREINFO:
          memcpy(PParam, &tmp->Feature, sizeof(FEATUREINFO));
          break;

case MC_GETFINDREGIONS:
          if(SParam == 0)
                    *((short far *)PParam) = tmp->RegionCount;
          else if(SParam <= tmp->RegionCount)
                    memcpy(PParam, tmp->FindReg, SParam *
sizeof(FINDREGION));
          else
                    errval = ME_PARAMETER;
          break;

case MC_GETMATCHREGION:
          memcpy(PParam, &tmp->MatchReg, sizeof(MATCHREGION));
          break;

case MC_GETFINDPOINTS:
          if(SParam == 0)
                    *((short far *)PParam) = tmp->FindCount;
          else if(SParam <= tmp->FindCount && tmp->FindPts != NULL)
                    memcpy(PParam, tmp->FindPts, SParam *
sizeof(FINDPOINT));
          else
                    errval = ME_PARAMETER;
          break;

case MC_GETMATCHPOINTS:
          if(SParam == 0)
                    *((short far *)PParam) = tmp->MatchCount;
          else if(SParam <= tmp->MatchCount && tmp->MatchPts !=
NULL)
                    memcpy(PParam, tmp->MatchPts, SParam *
sizeof(MATCHPOINT));
          else
                    errval = ME_PARAMETER;
          break;

case MC_GETSTATISTICS:
          memcpy(PParam, &tmp->Statistics, sizeof(STATISTICS));
          break;

case MC_GETVERSIONNUMBER:
          memcpy(PParam, &VersionNumber, sizeof(MVERSION));
          break;

default:
          break;
     } return errval;
}

/*
     Initialization function: allocate a new environment on the link list.
```

```
                Set the new environment to the default values. Return an ID to the
                application (handle).
        */

        MERGEERROR far pascal
        M_MergeOpen(MHANDLE far * handle)
        {
                PMERGEINFO far *tmp, newhandle;
                /*
                        Allocate space for environment structure (not for the arrays it
                        contains).
                */
                if((newhandle = MergeFarMalloc(sizeof(MERGEINFO))) == NULL)
                        return ME_MEMORY;

/* Reset array pointers so that RESET will not try to free them */

                newhandle->FindPts = NULL;
                newhandle->MatchPts = NULL;
                newhandle->FindReg = NULL;

/* Search the environment list for the last entry */
                tmp = &Head;
                while(*tmp != NULL)
                        tmp = &((*tmp)->Next);

                /* Make the last entry point to the new environment */

*tmp = newhandle;

*handle = newhandle->Handle = ++HandleCount;
                newhandle->Next = NULL;

/* Allocate arrays in environment, and set default values */ return M_MergeControl(HandleCount, MC_RESET, 0, NULL);
        }

/*
                Close function: Free environment associated to handle.
        */

MERGEERROR far pascal
        M_MergeClose(MHANDLE handle)
        {
                PMERGEINFO tmp, prev;
                int errval = ME_SUCCESS;

if(Head == NULL)
                        errval = ME_PARAMETER;
                /* Is the environment to close, the first one on the list ? */ else if(Head->Handle == handle){
                        tmp = Head->Next;
                        FreeMergeInfo(Head);
                        Head = tmp;
                }

/* Invalid handle ? */
                else if(Head->Next == NULL)
                        errval = ME_PARAMETER;

/* Look for environment on the list. */
```

```
        else{
            prev = Head;
            tmp = Head->Next;

while(tmp->Next != NULL && tmp->Handle != handle){
                prev = tmp;
                tmp = tmp->Next;
            } if(tmp->Handle == handle){
                prev->Next = tmp->Next;
                FreeMergeInfo(tmp);
            }
            else
                errval = ME_PARAMETER;
        } return errval;
}

/************************************************************************/
/*                                                                      */
/*                      Private functions                               */
/*                                                                      */
/************************************************************************/

/*
        Returns a pointer to the environment associated to a given handle.
*/ static PMERGEINFO near
GetMergeInfo(MHANDLE handle)
{
        PMERGEINFO far *tmp;

tmp = &Head;
        while(*tmp != NULL && (*tmp)->Handle != handle)
                tmp = &((*tmp)->Next);

return *tmp;
}

/*
        Allocate arrays needed for the environment: location of find regions
        and
        registration points.
*/ static MERGEERROR near
AllocateMergeInfo(
        PMERGEINFO newhandle,
        short numregions)
{
        MERGEERROR errval = ME_SUCCESS;

if(newhandle == NULL)
                return ME_PARAMETER;

/* Free arrays if needed */ if(newhandle->FindPts != NULL)
                MergeFarFree(newhandle->FindPts);
        if(newhandle->MatchPts != NULL)
                MergeFarFree(newhandle->MatchPts);
        if(newhandle->FindReg != NULL)
```

```
            MergeFarFree(newhandle->FindReg);

newhandle->FindPts = NULL;
       newhandle->MatchPts = NULL;

if((newhandle->FindReg = MergeFarMalloc(sizeof(FINDREGION) *
   numregions)) == NULL)
              errval = ME_MEMORY;

else{
              newhandle->FindCount = newhandle->MatchCount = 0;
              newhandle->RegionCount = numregions;
              newhandle->Channel = -1;
       } return errval;
   }

/*
       Free memory allocated for environment, including the memory allocated
       for the environment structure.
   */ static void near
   FreeMergeInfo(PMERGEINFO merge)
   {
       if(merge != NULL){
              if(merge->MatchPts != NULL)
                     MergeFarFree(merge->MatchPts);
              if(merge->FindPts != NULL)
                     MergeFarFree(merge->FindPts);
              if(merge->FindReg != NULL)
                     MergeFarFree(merge->FindReg);
              MergeFarFree(merge);
       }
   }

/*
       Calculate a correlation index between two 2-dimensional arrays.
       The reference array is stored in "sourcearray". The array to correlate
       is accessed through an array of pointers to image lines (lptr).
       Both arrays have the same dimensions. The calculation will stop if the
       correlation index goes beyond the value of "threshold". "inc"
       represents a sub-sampling index.
   */ static long near
   correlate(
       BYTE far * sourcearray,
       BYTE far * far *lptr,
       short width,
       short height,
       long threshold,
       short inc)
   {
       int i, j, sourceinc = width * inc;
       register int diff;
       unsigned char far *dbuf;
       unsigned char far *sbuf;
       long result;

result = 0l;

for(i = 0; i < height; i++, sourcearray += sourceinc){
              dbuf = lptr[i];
              sbuf = sourcearray;
              for(j = 0; j < width; j+=inc, sbuf+=inc, dbuf+=inc){
                     if((diff = *sbuf - *dbuf) < 0)
```

```
                    diff = -diff;
            result += (long)diff;
            if(result > threshold)
                    return result;
        }
    }
    return result;
}

/*
    Calculate an auto-correlation index of a 2-dimensional array. The
array
    is accessed through an array of pointers to image lines. "inc"
represents
    the shift of the auto-correlation. The array is shifted in the four
main
    directions. The calculation stops when the auto-correlation index goes
    under a threshold.
*/
static long near
autocorrelate(
        BYTE far * far *lptr,
        short width,
        short height,
        short inc,
        long threshold)
{
    int i, j;
    register int diff;
    unsigned char far *dbuf;
    unsigned char far *sbuf;
    long xres, yres, d1res, d2res;
    long result;

xres = yres = d1res = d2res = 0l;

/* auto-correlation along the vertical axis */ for(i = 0; i < height; i++){
        dbuf = lptr[i];
        sbuf = lptr[i + 1];
        for(j = 0; j < width; j+=inc, sbuf+=inc, dbuf+=inc){
            if((diff = *sbuf - *dbuf) < 0)
                diff = -diff;

yres += (long)diff;
        }
    } result = yres;

if(yres < threshold)
            return result;

/* auto-correlation along the horizontal axis */ for(i = 0; i < height; i++){
        dbuf = lptr[i];
        sbuf = dbuf + inc;
        for(j = 0; j < width; j+=inc, sbuf+=inc, dbuf+=inc){
            if((diff = *sbuf - *dbuf) < 0)
                diff = -diff;

xres += (long)diff;
```

```
                }
        } if(xres < threshold) {
                result = xres;
                return result;
        }
        else if (xres < result)
                result = xres;

/* auto-correlation along the main diagonal */ for(i = 0; i < height; i++){
                dbuf = lptr[i];
                sbuf = lptr[i + 1] + inc;
                for(j = 0; j < width; j+=inc, sbuf+=inc, dbuf+=inc){
                        if((diff = *sbuf - *dbuf) < 0)
                                diff = -diff;

d1res += (long)diff;
                }
        } if(d1res < threshold){
                result = d1res;
                return result;
        }
        else if (d1res < result)
                result = d1res;

/* auto-correlation along the secondary diagonal */ for(i = 0; i < height; i++){
                dbuf = lptr[i] + inc;
                sbuf = lptr[i + 1];
                for(j = 0; j < width; j+=inc, sbuf+=inc, dbuf+=inc){
                        if((diff = *sbuf - *dbuf) < 0)
                                diff = -diff;

d2res += (long)diff;
                }
        } if (d2res < result)
                result = d2res;

return result;

}

/*
        Identify a number of features of interest in a region of the left
image.
        The position of the best features is stored in Points.
*/ define SKIP 5 static short near
FindFeatures(
        LPIMAGE Left,
        PFEATUREINFO Feature,
        PFINDREGION FindReg,
        PFINDPOINT Points,
        short wanted,
        BITMAPTYPE Channel)
{
```

47

```
        PCORELSORT Head, cur, new, sortlist;
        int sortcount = 1;
        MRECT bounds;
        BYTE far *dbuf, far *tmp;
        int x, y, dwidth, i, j;
        long result = 1;
        BYTE far * far *linebuf;
        BYTE far * far *lptr;
        int Htotal;
        int error = TRUE;
        short swidth = Feature->FeatureWidth;
        short sheight = Feature->FeatureHeight;
        short SmallInc = Feature->Sampling, BigInc = SKIP * Feature->Sampling;
        short increment = SmallInc;
        /* transform relative location of region into absolute image locations
   */ bounds = GetRegionBounds(Left, FindReg);
        dwidth = bounds.x2 - bounds.x1 + 1; /* width of region */
        Htotal = (sheight + 2 * SmallInc - 1) / SmallInc;    /* number of
   lines needed at any one time */

        /* allocate sorting list, lines buffer and array of pointer to these
   lines */ if((sortlist = MergeFarMalloc(wanted * sizeof(struct CORELSORT))) ==
   NULL)
                ;
        else if((dbuf = MergeFarMalloc(Htotal * dwidth)) == NULL)
                MergeFarFree(sortlist);
        else if((linebuf = MergeFarMalloc(Htotal * 2 * sizeof(char far *))) ==
   NULL){
                MergeFarFree(dbuf);
                MergeFarFree(sortlist);
        }
        else
                error = FALSE;
        if(error == TRUE)
                return 0;

lptr = linebuf + Htotal;
        /* initialize sorting link list */

Head = sortlist;
        Head->x = 0;                     /* position of feature */
        Head->y = 0;
        Head->next = NULL;
        sortcount = 0;

/* the following seems to be a good estimate of the initial threshold
     */
        Head->index = (long)swidth * (long)sheight * 161 / (long)(SmallInc *
   SmallInc);

/* get a bunch of lines from the left image */
        GetImageArea(Left, bounds.x1, bounds.y1, bounds.x2,
                                bounds.y1 + sheight + SmallInc -1, dbuf,
   Channel, SmallInc);

         /* initialise pointer array to point to those lines */ for(i = 0; i < Htotal; i++)
                linebuf[i] = dbuf + i * dwidth;
```

```
/*
    go from top to bottom of region. Impose at least a distance of
    BIG_INC between two features. A bigger increment will insure
    that no two features are the same. But it also increases the
    chance of missing a good feature by steping over it.
*/
bounds.y2 -= sheight + SmallInc;

for(y = bounds.y1; y <= bounds.y2; y += BigInc){

/* make a temporary copy of the pointer array */
        memcpy(lptr, linebuf, Htotal * sizeof(char far *));

for(x = bounds.x1; x <= bounds.x2 - swidth - SmallInc; x +=
increment){

/* calculate the auto-correlation index of a potential
feature */
                result = autocorrelate(lptr, swidth, Htotal-1, SmallInc,
Head->index);

/*
                   Rank the auto-correlation index. Only keep the
required number
                   of features in the sorting list (3 by default).
                */
                if(result > Head->index){

/* don't allow features to be too close */
                        increment = BigInc;

cur = Head;
                        while(cur->next != NULL){
                                if(result < cur->next->index)
                                        break;
                                else
                                        cur = cur->next;
                        } if(sortcount == 0){
                                new = Head;
                                sortcount++;
                        }
                        else if(sortcount < wanted){
                                new = &(sortlist[sortcount]);
                                new->next = cur->next;
                                cur->next = new;
                                sortcount++;
                        }
                        else if(cur == Head)
                                new = Head;
                        else{
                                new = Head;
                                Head = Head->next;
                                new->next = cur->next;
                                cur->next = new;
                        }
                        new->index = result;
                        new->x = x;
                        new->y = y;
                }
                else
                        increment = SmallInc;

/* increment pointers to point to the next feature */
                for(i = 0; i < Htotal; i++)
                        lptr[i] += increment;
        }
```

```
            /* rotate pointer array, and get a new bunch of lines */ for(j = 0; j < BigInc; j+=SmallInc){
                tmp = linebuf[0];
                for(i = 1; i < Htotal; i++)
                    linebuf[i-1] = linebuf[i];
                linebuf[Htotal -1] = tmp;

/* get a line */
                GetImageArea(Left, bounds.x1, y + sheight + SmallInc +j,
    bounds.x2,
                                                y + sheight + SmallInc +j,
    linebuf[Htotal -1], Channel,
                                                SmallInc);
            }
        }

MergeFarFree(linebuf);
        MergeFarFree(dbuf);

/*
            Determine number of features found. Store their positions and
    score
            in "Points".
        */ if(sortcount > 0){
            sortcount = 0;
            while(Head != NULL){
                Points[sortcount].xFind = Head->x;
                Points[sortcount].yFind = Head->y;
                sortcount++;
                Head = Head->next;
            }
        }

MergeFarFree(sortlist);

return sortcount;
    }

/*
        Store area of image in buffer.
    */ static MERGEERROR near
    GetImageArea(
        LPIMAGE Image,
        short x1,
        short y1,
        short x2,
        short y2,
        BYTE far *buffer,
        BITMAPTYPE channel,
        short inc)
    {
        short i, j;
        short width = x2 - x1 + 1;
        LPBYTE tmp;
        LPBYTE ptr;
        MERGEERROR errval = ME_SUCCESS;
        static char mask[] = {128, 64, 32, 16, 8, 4, 2, 1};

/* check area bounds against image size */
        if(x1 > x2 || y1 > y2 || x1 < 0 || x2 >= Image->Width || y1 < 0 || y2
    >= Image->Height)
            errval = ME_PARAMETER;
```

```
            /* get one line at a time */
            else if(channel == BT_8BIT){
                    for(i = yl, ptr = buffer; i <= y2; i+=inc, ptr += width)
                            if((tmp = (*Image->GetLine)(i)) != NULL)
                                    memcpy(ptr, tmp + x1, width);
                            else{
                                    errval = ME_IMAGEFUNCTION;
                                    break;
                            }
            }
            else if(channel == BT_BILEVEL){
                    short bytestart = x1 >> 3;
                    short bitstart = x1 % 8;
                    short bitnum;

for(i = yl, ptr = buffer; i <= y2; i+=inc){
                            bitnum = bitstart;

if((tmp = (*Image->GetLine)(i)) != NULL){
                                    tmp += bytestart;
                                    for(j = 0; j < width; j++){
                                            if(*tmp & mask[bitnum])
                                                    *ptr++ = 200;
                                            else
                                                    *ptr++ = 0;

if(++bitnum == 8){
                                                    bitnum = 0;
                                                    tmp++;
                                            }
                                    }
                            }
                            else{
                                    errval = ME_IMAGEFUNCTION;
                                    break;
                            }
                    }
            }
            else{
                    short offset;

switch(channel){
                            case BT_RED:
                                    offset = 0;
                                    break;

case BT_GREEN:
                                    offset = 1;
                                    break;

case BT_BLUE:
                                    offset = 2;
                                    break;

default:
                                    errval = ME_PARAMETER;
                                    break;
                    } for(i = yl, ptr = buffer; i <= y2; i+=inc)
                            if((tmp = (*Image->GetLine)(i)) != NULL)
                                    for(j = 0, tmp += x1 * 3 + offset; j < width; j++, tmp += 3)
                                            *ptr++ = *tmp;
                            else{
```

```
                        errval = ME_IMAGEFUNCTION;
                        break;
                }
        }
        return errval;
} define MAXMATCH 12     /* number of possible matches per feature */
/*
        Try to match a given feature in the right image. The position of the
        matching region, in the right image, is determined by the position of
        the feature in the left image. A coarse matching procedure is first
        used to extract 12 possible matches. A finer matching phase then picks
        the best match.
*/ static short near
MatchFeature(
        LPIMAGE Left,
        LPIMAGE Right,
        PFEATUREINFO Feature,
        PMATCHREGION MatchReg,
        PFINDPOINT FindPt,
        PMATCHPOINT MatchPt,
        BITMAPTYPE Channel)
{
        MRECT bounds, pattern, local;
        short xSearch, ySearch;
        BYTE far *sbuf;
        BYTE far *tmpbuf;
        int i;
        PCORELSORT sortlist, Head;
        struct CORELSORT swap;
        short sortcount, one = 1;
        short sampling = Feature->Sampling;
        short width = Feature->FeatureWidth, height = Feature->FeatureHeight;
        int change = TRUE;
        long nomatch;

/* position of feature in left image */
        pattern.x1 = FindPt->xFind;
        pattern.y1 = FindPt->yFind;
        pattern.x2 = pattern.x1 + width -1;
        pattern.y2 = pattern.y1 + height -1;

/* worst possible score */
        nomatch = (long)width * (long)height * 255L;

/* absolute size and position of matching region in right image */ xSearch = MatchReg->Width;
        ySearch = MatchReg->Height;

if(MatchReg->Left){
                if((bounds.x1 = MatchReg->Left - Left->Width + (pattern.x1 +
pattern.x2 - xSearch)/2) < 0)
                        bounds.x1 = 0;
        }
        else
                bounds.x1 = 0;

if((bounds.x2 = bounds.x1 + xSearch) >= Right->Width)
                bounds.x2 = Right->Width - 1;

if((bounds.y1 = (pattern.y1 + pattern.y2 - ySearch) / 2) < 0)
                bounds.y1 = 0;
```

```
            bounds.y1 += MatchReg->Top;
            if((bounds.y2 = bounds.y1 + ySearch) >= Right->Height)
                bounds.y2 = Right->Height - 1;

#ifdef DEBUG
        fprintf(fp, "R [%4d, %4d]", bounds.x1, bounds.y1);
#endif

/* allocate sorting link list, and storage for feature bitmap */ if((sortlist = MergeFarMalloc(MAXMATCH * sizeof(struct CORELSORT))) ==
NULL)
            return 0;
        else if((sbuf = MergeFarMalloc(2 * width * height)) == NULL){
            MergeFarFree(sortlist);
            return 0;
        }

Head = sortlist;
        sortcount = MAXMATCH;

/* get feature bitmap from left image */

GetImageArea(Left, pattern.x1, pattern.y1, pattern.x2, pattern.y2,
sbuf, Channel,1);

/* Lopass the feature */

//      if(Channel == BT_BILEVEL){
            tmpbuf = sbuf + width * height;
            FilterFeature(sbuf, tmpbuf, width, height);
//      }
//      else
            tmpbuf = sbuf;

/* Find the best 12 (MAXMATCH) matches in a coarse search */ if(CorrelateFeature(Right, &bounds, tmpbuf, width,
            height, &Head, &sortcount, sampling,
            Channel) == ME_SUCCESS && sortcount > 0){

/*
                Refine the matching: Get a better correlation index for
each coarse
                match. Find a more precise position.
            */ for(i = 0; i < sortcount; i++){

/* define a small region around the coarse match. */ if((local.x1 = sortlist[i].x - sampling/2) < 0)
                    local.x1 = 0;

if((local.y1 = sortlist[i].y - sampling/2) < 0)
                    local.y1 = 0;

if((local.x2 = local.x1 + width -1 + sampling/2) >=
Right->Width)
                    local.x2 = Right->Width.-1;

if((local.y2 = local.y1 + height -1 + sampling/2) >=
Right->Height)
                    local.y2 = Right->Height -1;

Head = &sortlist[i];

/* perform a fine correlation in the small region. */
```

-53-

```
                one = 1;
                if(CorrelateFeature(Right, &local, tmpbuf, width,
                        height, &Head, &one, 1, Channel) != ME_SUCCESS
||
                    one != 1)
                    Head->index = nomatch;
        }

/* rank matches */ while(change){
                change = FALSE;
                for(i = 0; i < sortcount - 1; i++)
                        if(sortlist[i].index > sortlist[i+1].index){
                                change = TRUE;
                                swap = sortlist[i];
                                sortlist[i] = sortlist[i+1];
                                sortlist[i+1] = swap;
                        }
        }

/* count number of successful matches */
        i = sortcount -1;
        sortcount = 0;
        while(i >= 0)
                if(sortlist[i--].index < nomatch)
                        sortcount++;

/*
                Store the best matches. Keep multiple matches only if they are so
                close (10 %) that it is not really possible to choose. Weigh scores
                by the ratio: min_score / second_min_score. This way, advantage is
                given to matches that have a low recurence.
        */
        nomatch = sortlist[0].index;
        nomatch += nomatch / 10L;

for(i = 0; i < Feature->Matches && i < sortcount &&
            sortlist[i].index < nomatch; i++){
                MatchPt[i].xMatch = sortlist[i].x;
                MatchPt[i].yMatch = sortlist[i].y;

if(sortcount > 1)
                        MatchPt[i].Confidence = (sortlist[i].index *
            sortlist[0].index) / sortlist[1].index;
                else
                        MatchPt[i].Confidence = sortlist[i].index;
        }
    }
    else
        i = 0;

MergeFarFree(sbuf);
    MergeFarFree(sortlist);

return i;
}

/*
    Given a feature bitmap and a region, find the best "numsort" matches in
    the region. The process is adaptive, so that the function learns from
    past matches not to correlate any further when a certain score has been
    reached.
```

```
*/ static MERGEERROR near
CorrelateFeature(
        LPIMAGE Right,
        PMRECT bounds,
        BYTE far *sbuf,
        short swidth,
        short sheight,
        PCORELSORT far *sortlist,
        short far *numsort,
        short inc,
        BITMAPTYPE Channel)
{
        MERGEERROR errval = ME_SUCCESS;
        BYTE far *dbuf;
        BYTE far *tmp;
        BYTE far * far *linebuf;
        BYTE far * far *lptr;
        short x, y, i;
        long result = 1;
        PCORELSORT Head, cur, new;
        int sortcount;
        short dwidth = bounds->x2 - bounds->x1 + 1;
        int Htotal;

/* initialize sorting list */

Head = *sortlist;
        Head->x = Head->y = 0;
        Head->next = NULL;
        sortcount = 0;

/*
                The following is a good estimate of a terrible match. Matches
        that
                have a bigger score are definitely rejected.
        */
        Head->index = (long)sheight * (long)swidth * 451 / (long)(inc * inc);

/* allocate lines buffer and array of pointer to these lines */

Htotal = (sheight + inc -1) / inc;

if((dbuf = MergeFarMalloc(Htotal * dwidth)) == NULL)
                return ME_MEMORY;

if((linebuf = MergeFarMalloc(Htotal * 2 * sizeof(char far *))) ==
        NULL){
                MergeFarFree(dbuf);
                return ME_MEMORY;
        } lptr = linebuf + Htotal;

/* get a bunch of lines from right image */

GetImageArea(Right, bounds->x1, bounds->y1, bounds->x2,
                                bounds->y1 + sheight -1, dbuf, Channel,inc);

/* set pointers to lines */
        for(i = 0; i < Htotal; i++)
                linebuf[i] = dbuf + i * dwidth;

for(y = bounds->y1; y <= bounds->y2 - sheight + 1; y+=inc){ memcpy(lptr, linebuf, Htotal * sizeof(char far *));

for(x = bounds->x1; x <= bounds->x2 - swidth + 1; x += inc){
```

```
                /* correlate feature and match area */ result = correlate(sbuf, lptr, swidth, Htotal,
    Head->index, inc);

/* rank the match */ if(result < Head->index){
                        cur = Head;
                        while(cur->next != NULL){
                                if(result > cur->next->index)
                                        break;
                                else
                                        cur = cur->next;
                        } if(sortcount == 0){
                                new = Head;
                                sortcount++;
                        }
                        else if(sortcount < *numsort){
                                new = &((*sortlist)[sortcount]);
                                new->next = cur->next;
                                cur->next = new;
                                sortcount++;
                        }
                        else if(cur == Head)
                                new = Head;
                        else{
                                new = Head;
                                Head = Head->next;
                                new->next = cur->next;
                                cur->next = new;
                        }
                        new->index = result;
                        new->x = x;
                        new->y = y;
                }

/* advance line pointers to next match area */ for(i = 0; i < Htotal; i++)
                        lptr[i] += inc;
        }

/* rotate pointer array, and get a new line */ tmp = linebuf[0];
        for(i = 1; i < Htotal; i++)
                linebuf[i-1] = linebuf[i];

linebuf[Htotal -1] = tmp;

/* get a line */
        GetImageArea(Right, bounds->x1, y + sheight, bounds->x2,
                                y + sheight, linebuf[Htotal -1],
    Channel,1);

}
    /* returns number of matches */

*sortlist = Head;
    *numsort = sortcount;

MergeFarFree(linebuf);
    MergeFarFree(dbuf);

return errval;
```

}
/*
        Given a set of feature/match pairs, find the best 2. Try to maximize
        the distance between two pairs, and minimize their combined score.
More
        sophisticated heuristics will be tried later.
*/ define MINDISTANCE 20.0      /* mininum useful distance between two points */
define MAXANGLE 0.105        /* maximum allowed angle  between two scans (12 deg). */
define MAXSTRETCH 0.05       /* maximum stretch allowed between scans: 15% */
define REJECTED -1.0         /* especial score to indicate reject */ static MERGEERROR near
RankFeatures(
        PFINDPOINT FPts,
        PMATCHPOINT MPts,
        short MatchCount,
        PSTATISTICS stats)
{
        int errval = ME_SUCCESS;
        int i, j, imax = 0, jmax = 1, count;
        double Ldeltax, Ldeltay, Rdeltax, Rdeltay;
        long sum;
        MATCHPOINT swap1, swap2;
        double     far *theta,      /* angle between the line joining 2 features, and the
                                        line joining their corresponding matches */
                far *dist1,      /* distance between 2 features */
                far *dist2,      /* distance between corresponding matches */
                far *rdist, /* dist1 / dist2 */
                far *score; /* heuristic based on confidence, angle, distance, etc... */
        int numpairs, valid;
        double dSum, dSumsquare, dMean, dStddev;
        double aSum, aSumsquare, aMean, aStddev;
        double norm, tmp, max;
        int ii, jj, far *histo;

/* number of unique combinations of two points among "MatchCount" points */ stats->TotalPair = numpairs = MatchCount * (MatchCount - 1) / 2;

if((theta = MergeFarMalloc(numpairs * 5 * sizeof(double))) == NULL)
                return ME_MEMORY;

dist1 = theta + numpairs;
        dist2 = dist1 + numpairs;
        rdist = dist2 + numpairs;
        score = rdist + numpairs;

/*
        Calculate distances, angles, and preliminary scores. Eliminate pairs
                with distances below a given threshold, or rotations above 12 degrees.
                Calculate average and standard deviation of distances and angles, for
                the population of valid pairs.
        */ ifdef DEBUG

```
            fprintf(fp, "number of pairs: %d\n", numpairs);
    #endif
            dSum = dSumsquare = 0.0;
            aSum = aSumsquare = 0.0;
            valid = 0;

for(i = 1, count = 0; i < MatchCount; i++){
                    for(j = 0; j < i; j++, count++){
                            /* check if i and j are matches of the same feature */
                            if((ii = MPts[i].FindIndex) != (jj = MPts[j].FindIndex)){

Ldeltax = (double)(FPts[ii].xFind -
    FPts[jj].xFind);
                                    if((Ldeltay = (double)(FPts[ii].yFind -
    FPts[jj].yFind)) < 0.0)
                                            Ldeltay = -Ldeltay;
                                    Rdeltax = (double)(MPts[i].xMatch - MPts[j].xMatch);
                                    if((Rdeltay = (double)(MPts[i].yMatch -
    MPts[j].yMatch)) < 0.0)
                                            Rdeltay = -Rdeltay;

dist1[count] = sqrt(Ldeltax * Ldeltax + Ldeltay *
    Ldeltay);
                                    dist2[count] = sqrt(Rdeltax * Rdeltax + Rdeltay *
    Rdeltay);

#ifdef DEBUG
        fprintf(fp, "Pair #%2d > M%d M%d -> F%d F%d > D %d %d",
            count, i,j,ii,jj, (int)dist1[count], (int)dist2[count]);
    #endif /* check distance between points in left and right
    scan */ if(Ldeltay > MINDISTANCE && Rdeltay > MINDISTANCE &&
                                            dist1[count] > MINDISTANCE && dist2[count] >
    MINDISTANCE){
                                            theta[count] = atan2(Ldeltax, Ldeltay) -
    atan2(Rdeltax, Rdeltay);

#ifdef DEBUG
        fprintf(fp, " > R %5.3lf", theta[count] * 180 / 3.1415926);
    #endif /* check underlying rotation */

                                            if(theta[count] >= -MAXANGLE && theta[count]
    <= MAXANGLE){ rdist[count] = dist1[count] /
    dist2[count];
    #ifdef DEBUG
            fprintf(fp, " > S %5.3lf", rdist[count]);
    #endif
                                                    /* check underlying stretch */ if(rdist[count] > 1.0 - MAXSTRETCH &&
    rdist[count] < 1.0 + MAXSTRETCH){

/* calculate score based on
    distance and confidence */
                                                            if((sum = MPts[i].Confidence +
    MPts[j].Confidence) == (long)0)
                                                                    sum = (long)1;
```

```c
#ifdef DEBUG
        fprintf(fp, " > C %ld", sum);
#endif
                                        score[count] = dist1[count] /
    (double)sum;

/* calculate statistics */ dSum += rdist[count];
                                        dSumsquare += rdist[count] *
    rdist[count];

aSum += theta[count];
                                        aSumsquare += theta[count] *
    theta[count];
                                        valid++;
                                    }
                                    else
                                        score[count] = REJECTED;
                                }
                                else
                                    score[count] = REJECTED;
                            }
                            else
                                score[count] = REJECTED;
#ifdef DEBUG
                            fprintf(fp, "\n");
#endif
                        }
                        else
                            score[count] = REJECTED;
                    }
                }
        if(valid > 0){

/* finish calculations of statistics */ if(valid > 1){ /* sqrt() does not work too well if valid == 1 */ dMean = dSum / (double)valid;       /* average of distance
    ratios */
                    aMean = aSum / (double)valid;       /* average of
    rotations */

/* standard deviations */
                    dStddev = sqrt(dSumsquare / (double)valid - dMean *
    dMean);
                    aStddev = sqrt(aSumsquare / (double)valid - aMean *
    aMean);
                }
                else{
                    dMean = dSum;
                    aMean = aSum;
                    dStddev = aStddev = 0.0;
                }
#ifdef DEBUG
            fprintf(fp, "STATS: R %8.5lf %8.5lf > S %8.5lf %8.5lf\n", aMean,
    aStddev, dMean, dStddev);
#endif
                stats->MRotate = aMean;
                stats->MStretch = dMean;
                stats->StRotate = aStddev;
                stats->StStretch = dStddev;

/*
```

```
                    Normalize distance ratios with regard to angles, so that
they have
                    the same weights in the subsequent classification.
            */
            if(dStddev > 0.0 && aStddev > 0.0){
                    norm = aStddev / dStddev;

for(i = 0; i < numpairs; i++)
                            if(score[i] != REJECTED)
                                    rdist[i] *= norm;

/* normalize distance ratio statistics */ dMean *= norm;
                    dStddev = aStddev;
            }

/*
                    Eliminate pairs that lie outside the circle of radius
    (aStddev/2),
                    and center (aMean, dMean), in the (theta, rdist) plane.
Use
                    Ldeltax and Ldeltay as temporary variables. Refine the
position
                    of the center of the population.
            */ max = 0.75 * aStddev;
            if(max < 0.03)
                    max = 0.03;

max *= max;             /* compare squares to save a call to
    sqrt() */ for(i = 0, aSum = 0.0, dSum = 0.0, valid = 0; i < numpairs; i++)
                    if(score[i] != REJECTED){
                            Ldeltax = rdist[i] - dMean;
                            Ldeltay = theta[i] - aMean;

/* square of euclidien distance to center of
population */
                            tmp = Ldeltax * Ldeltax + Ldeltay * Ldeltay;

if(tmp > max)
                                    score[i] = REJECTED;
                            else{
                                    aSum += theta[i]; /* compound new statistiscs
    */
                                    dSum += rdist[i];
                                    valid++;
                            }
#ifdef DEBUG
            fprintf(fp, "Pair #%2d > %8.3lf",i, tmp);
            if(score[i] == REJECTED)
                    fprintf(fp," REJECTED");
            fprintf(fp, "\n");
#endif
                    } stats->ValidPair = valid;

if(valid > 0){
                    aMean /= (double)valid;
                    dMean /= (double)valid;
            }
            else{
                    MergeFarFree(theta);
```

```
                            return ME_SKEW;
                }

/*      Update score with distance of pair to center of
population. */ for(i = 0; i < numpairs; i++)
                    if(score[i] != REJECTED){
                            Ldeltax = rdist[i] - dMean;
                            Ldeltay = theta[i] - aMean;
                            tmp = Ldeltax * Ldeltax + Ldeltay * Ldeltay;

if(tmp == 0.0)
                                    score[i] = 10000000.0;  /* arbitrarily high score */
                            else{
                                    score[i] /= tmp;   /* the smaller the distance,
the higher the
                                                                                    score */
                            }
                    }

/* find which 2 features constitute the best pair */ max = 0.0;

if((histo = MergeFarMalloc(MatchCount * sizeof(int))) != NULL)
                        memset(histo, 0, MatchCount * sizeof(int));

for(i = 1, count = 0, valid = -1; i < MatchCount; i++)
                    for(j = 0; j < i; j++, count++)
                            if(score[count] != REJECTED){
                                    if(score[count] > max){
                                            max = score[count];
                                            imax = i;
                                            jmax = j;
                                            valid = count;
                                            stats->MRotate = theta[count];
                                    } if(histo != NULL){
                                            histo[i]++;
                                            histo[j]++;
                                    }
                            }

/* put the 2 best features at the begining of the list of points
*/ if(valid >= 0){ ifdef DEBUG
        fprintf(fp, "HISTO:");
        for(i = 0; i < MatchCount; i++)
                fprintf(fp," %d", histo[i]);
        fprintf(fp, "\n\n");

fprintf(fp, "SELECT PAIR %d > MATCHES %d  %d", valid, imax, jmax);
        fprintf(fp, " > R %9.5lf > S %9.5lf\n\n", theta[valid], rdist[valid] /
norm);
#endif
                            swap1 = MPts[imax];
                            swap2 = MPts[jmax];

MPts[0] = swap1;
                            MPts[1] = swap2;
```

```
                    stats->ValidMatch = 2;
            }
            else{
                errval = ME_MERGE;
                stats->ValidMatch = 0;
            }
        }
        else
            errval = ME_SKEW;

if(histo != NULL)
            MergeFarFree(histo);

MergeFarFree(theta);

return errval;
    }

/*
        Transform relative into absolute locations.
*/ static MRECT near
GetRegionBounds(
        LPIMAGE Left,
        PFINDREGION FindReg)
{
        MRECT bounds;

/* Width and Margin are absolute. */ if((bounds.x2 = Left->Width - FindReg->Margin -1) <= 0)
                bounds.x2 = Left->Width -1;

if((bounds.x1 = bounds.x2 - FindReg->Width + 1) < 0)
                bounds.x1 = 0;

/* Top and Bottom are relative */ bounds.y1 = (short)(((long)FindReg->Top * (long)(Left->Height - 1)) /
1000L);
        bounds.y2 = (short)(((long)FindReg->Bottom * (long)(Left->Height -1))
/ 1000L);

return bounds;
}

/*
        Offset the vortices of a polygon so that no coordinate is negative.
*/ static void near
OffsetPolygon(points, offsety, numPoints)
LPTWOINTS points;
int far *offsety;
int numPoints;
{
        int i;
        MRECT Rect;

Rect = GetBoundingBox(points, numPoints);

*offsety = 0;

#ifdef CLIPPING
        if(Rect.y1 > 0){
```

```
#else
        if(Rect.y1 < 0){
#endif
            *offsety = -Rect.y1;

for(i = 0; i<numPoints; i++)
                points[i][1] += *offsety;
        }
    } ifdef WIN
void far * far
MergeFarMalloc(unsigned Bytes)
{
    HANDLE hMem;
    hMem = GlobalAlloc(GMEM_MOVEABLE, Bytes);
    return GlobalLock(hMem);
} void far
MergeFarFree(void far * Memory)
{
    HANDLE hMem;

if (Memory != NULL) {
        hMem = (HANDLE)GlobalHandle((HANDLE) ( ((long)Memory) >>16) );
        GlobalUnlock(hMem);
        GlobalFree(hMem);
    }
} else
void far * far
MergeFarMalloc(unsigned Bytes)
{
        return halloc(Bytes, 1);
} void far
MergeFarFree(void far * Memory)
{
    if (Memory != NULL)
        hfree(Memory);
}
endif ifdef WIN int FAR PASCAL
LibMain(hModule, wDataSeg, cbHeapSize, lpszCmdLine)
HANDLE      hModule;
WORD    wDataSeg;
WORD    cbHeapSize;
LPSTR   lpszCmdLine;
{
//      hInstance = hModule;
    return 1;
} int FAR PASCAL WEP (bSystemExit)
int   bSystemExit;
{
    return(1);
} endif
```

```
       static MERGEERROR
       FilterFeature(BYTE far * buf,
                                  BYTE far *tmpbuf,
                                  short sizex,
                                  short sizey)
       {
              short x, y, k, l;
              unsigned short sum;
              unsigned short count;
              for(y = 0; y < sizey; y++)
                     for(x = 0; x < sizex; x++){ for(k = y, sum = 0, count = 0; k <= y+1; k++)
                                   for(l = x; l <= x+1; l++)
                                          if(k >= 0 && k < sizey && l >= 0 && l <
       sizex){
                                                 sum += (unsigned short)buf[k * sizex +
       l];
                                                 count++;
                                          } if(count > 0)
                                   tmpbuf[y * sizex + x] = (BYTE)(sum / count);
                      } return ME_SUCCESS;
       }

       #ifdef CLIPPING static void
       YIntersept(int far *pt1, int far *pt2, int x, int far *intsept)
       {
              long denom, numer, halfdenom;

intsept[0] = x;

if((denom = pt2[0] - pt1[0]) == 0l)
                     intsept[1] = pt1[1];

else{
                     if((halfdenom = denom >> 1) < 0)
                            halfdenom = -halfdenom;
                     if((numer = (long)(x - pt1[0]) * (long)(pt2[1] - pt1[1])) > 0)
                            numer += halfdenom;
                     else
                            numer -= halfdenom;
                     intsept[1] = (int)(numer / denom) + pt1[1];
              }
       }

       static void
       XIntersept(int far *pt1, int far *pt2, int y, int far *intsept)
       {
              long denom, numer, halfdenom;

              intsept[1] = y;

if((denom = pt2[1] - pt1[1]) == 0l)
                     intsept[0] = pt1[0];

              else{
                     if((halfdenom = denom >> 1) < 0)
                            halfdenom = -halfdenom;

if((numer = (long)(y - pt1[1]) * (long)(pt2[0] - pt1[0])) > 0)
```

```
                    numer += halfdenom;
            else
                    numer -= halfdenom;

intsept[0] = (int)(numer / denom) + pt1[0];
        }
    } static void
    ClipPolygon(LPTWOINTS poly)
    {
        int intsept1[2], intsept2[2];

if(poly[0][1] > poly[3][1]){

YIntersept(poly[0], poly[3], poly[5][0], intsept1);

if(intsept1[1] < poly[4][1])
                        intsept1[1] = poly[4][1];

XIntersept(poly[3], poly[2], intsept1[1], intsept2);

intsept1[0] = intsept2[0];
                intsept1[1] = intsept2[1];

YIntersept(poly[2], poly[1], intsept1[0], intsept2);

if(intsept2[1] > poly[5][1])
                        intsept2[1] = poly[5][1];
        }
        else{
                YIntersept(poly[1], poly[2], poly[5][0], intsept1);

if(intsept1[1] > poly[5][1])
                        intsept1[1] = poly[5][1];

XIntersept(poly[3], poly[2], intsept1[1], intsept2);
                YIntersept(poly[0], poly[3], intsept2[0], intsept1);

if(intsept1[1] < poly[4][1])
                        intsept1[1] = poly[4][1];
        } poly[0][0] = poly[1][0] = poly[5][0];
        poly[3][0] = poly[2][0] = intsept1[0];
        poly[0][1] = poly[3][1] = poly[4][1] = intsept1[1];
        poly[1][1] = poly[2][1] = poly[5][1] = intsept2[1];

} define MAXOFFSET 8 static MERGEERROR
    StretchCorrect(LPIMAGE Merge,
                                LPIMAGE Right,
                                PFEATUREINFO Feature,
                                short Seamx,
                                double far *Coef,
                                int far * offsets,
                                BITMAPTYPE Channel)
    {
            int count1 = 0, count2 = 0;
            int flist[MAXSTRETCHPOINTS][2];
            int ylist[MAXSTRETCHPOINTS][2];
            int i;
            MRECT bounds;
            short fwidth = Feature->FeatureWidth;
```

-65-

```
            short fheight = Feature->FeatureHeight;
            int inc = 1, one = 1;
            BYTE far *sbuf;
            BYTE far *tmpbuf;
            struct CORELSORT sort;
            PCORELSORT Head = &sort;
            int bheight, lasty;

if(Feature->StretchPoints <= 0)
                    return ME_PARAMETER;

/* calculate bounds of region along the seam in which to find a
    feature */
            if((bheight = Right->Height / Feature->StretchPoints) < 2 * fheight)
                    bheight = 2 * fheight;

bounds.x1 = Seamx - fwidth + 1;
            bounds.y1 = MAXOFFSET/2;
            bounds.x2 = Seamx;
            bounds.y2 = bheight + MAXOFFSET/2;

/* look for a number of features along the seam */ lasty = Merge->Height - MAXOFFSET/2;
            while(bounds.y2 <= lasty && count1 < MAXSTRETCHPOINTS){ if(VFindFeature(Merge, &bounds, fwidth, fheight, &flist[count1],
    Channel)){
                            bounds.y1 = flist[count1][1] + (bheight + fheight)/2;
                            bounds.y2 = bounds.y1 + bheight;
                            count1++;
                    }
                    else{
                            bounds.y1 = bounds.y2;
                            bounds.y2 += bheight;
                    } if(bounds.y2 >= lasty){
                            if(bounds.y1 + 2 * fheight <= lasty)
                                    bounds.y2 = lasty;
                    }
                    else if(bounds.y2 + 2 * fheight > lasty)
                            bounds.y2 = lasty;
            }

/* return if not enough features have been found */ if(count1 < 3)
                    return ME_CORRELATION;

if((sbuf = MergeFarMalloc(2 * fwidth * fheight)) == NULL)
                    return ME_MEMORY;

if(Channel == BT_BILEVEL)
                    tmpbuf = sbuf + fwidth * fheight;
            else
                    tmpbuf = sbuf;

            /* match those features */ for(i = 0; i < count1; i++){
                    GetImageArea(Merge, flist[i][0], flist[i][1], flist[i][0] +
    fwidth -1,
                                          flist[i][1] + fheight -1, sbuf, Channel,1);

/* make a mask out of the feature */
                    if(Channel == BT_BILEVEL)
                            FilterFeature(sbuf, tmpbuf, fwidth, fheight);
```

```
#ifdef DEBUG
            fprintf(fp, "> L: [%4d, %4d] > ", flist[i][0], flist[i][1]);
endif /* calculate theoretical position of feature in right image */
            TransformPolygon((double far *)Coef, &flist[i], 1);

#ifdef DEBUG
            fprintf(fp, "> R: [%4d, %4d] > ", flist[i][0], flist[i][1]);
endif /* calculate bounds of region of the right image to be searched
*/
            if((bounds.x1 = flist[i][0] - MAXOFFSET/2) < 0)
                bounds.x1 = 0;
            if((bounds.y1 = flist[i][1] - MAXOFFSET) < 0)
                bounds.y1 = 0;
            if((bounds.x2 = bounds.x1 + fwidth + MAXOFFSET) >= Right->Width)
                bounds.x2 = Right->Width -1;
            if((bounds.y2 = bounds.y1 + fheight + MAXOFFSET * 2 - 1) >=
Right->Height)
                bounds.y2 = Right->Height -1;

/* try to match feature */ one = 1;
            if(CorrelateFeature(Right, &bounds, tmpbuf, fwidth,
                    fheight, &Head, &one, inc, Channel) == ME_SUCCESS && one
== 1){ if(abs(flist[i][1] - sort.y) <= MAXOFFSET){
                    ylist[count2][0] = flist[i][1];
                    ylist[count2][1] = sort.y;
                    count2++;
                }
#ifdef DEBUG
                fprintf(fp, "> C: [%4d, %4d] > D: %2d\n", sort.x, sort.y,
flist[i][1] - sort.y);
#endif
            }
#ifdef DEBUG
            else
                fprintf(fp, "******\n");
#endif
        }

MergeFarFree(sbuf);

if(count2 < 3)
            return ME_MATCH;

/* calculate differences between calculated and matched positions,
            for each feature */ for(i = 0; i < count2; i++)
            ylist[i][1] -= ylist[i][0];

/* interpolate the differences between features */ for(i = 0; i < ylist[0][0]; i++)
            offsets[i] = ylist[0][1];

for(i = 0; i < count2-1; i++)
            interpolate(ylist[i][0], ylist[i][1], ylist[i+1][0],
ylist[i+1][1], offsets);

for(i = ylist[count2-1][0]; i < Right->Height; i++)
            offsets[i] = ylist[count2-1][1];
```

```
        return ME_SUCCESS;
} static void
interpolate(int x1, int y1, int x2, int y2, int far *list)
{
        double slope;
        int i;
        double inc;

if(x2 == x1)
                list[x1] = y1;
        else{
                slope = (double)(y2 - y1) / (double)(x2 - x1);
                for(i = x1; i < x2; i++){
                        if((inc = (double)(i - x1) * slope) < 0.0)
                                inc -= 0.5;
                        else
                                inc += 0.5;

list[i] = y1 + (int)inc;
                }
        }
}

/* auto-correlation along the vertical axis */ static long near
Vautocorrelate(
        BYTE far * far *lptr,
        short width,
        short height,
        short inc)
{
        int i, j;
        register int diff;
        unsigned char far *dbuf;
        unsigned char far *sbuf;
        long yres;

yres = 0l;

for(i = 0; i < height; i++){
                dbuf = lptr[i];
                sbuf = lptr[i + 1];
                for(j = 0; j < width; j+=inc, sbuf+=inc, dbuf+=inc){
                        if((diff = *sbuf - *dbuf) < 0)
                                diff = -diff;

yres += (long)diff;
                }
        } return yres;
} static MERGEERROR
VFindFeature(LPIMAGE Left, PMRECT bounds, short fwidth, short fheight,
                        LPTWOINTS pt, short Channel)
{
        BYTE far *dbuf, far *tmp;
        int y, dwidth, i;
        long result = 1;
        BYTE far * far *linebuf;
        int Htotal;
        int error = TRUE, found = 0;
        long threshold;
        int inc = 2;
```

```
        dwidth = bounds->x2 - bounds->x1 + 1;      /* width of region */
        Htotal = (fheight + 2 * inc - 1) / inc;    /* number of lines needed at
any one time */ if((dbuf = MergeFarMalloc(Htotal * dwidth)) == NULL)
                ;
        else if((linebuf = MergeFarMalloc(Htotal * sizeof(char far *))) ==
NULL)
                MergeFarFree(dbuf);
        else
                error = FALSE;

if(error == TRUE)
                return 0;

pt[0][0] = bounds->x1;

/* the following seems to be a good estimate of the initial threshold
*/
        threshold = (long)fwidth * (long)fheight * 81 / (long)(inc * inc);

/* get a bunch of lines from the left image */

GetImageArea(Left, bounds->x1, bounds->y1, bounds->x2,
                                bounds->y1 + fheight + inc -1, dbuf, Channel,
inc);

/* initialise pointer array to point to those lines */ for(i = 0; i < Htotal; i++)
                linebuf[i] = dbuf + i * dwidth;

bounds->y2 -= fheight + inc;

for(y = bounds->y1; y <= bounds->y2; y += inc){

/* calculate the auto-correlation index of a potential feature
*/
                result = Vautocorrelate(linebuf, fwidth, Htotal-1, inc);

if(result > threshold){
                        pt[0][1] = y;
                        threshold = result;
                        found = 1;
                }

/* rotate pointer array, and get a new bunch of lines */ tmp = linebuf[0];
                for(i = 1; i < Htotal; i++)
                        linebuf[i-1] = linebuf[i];
                linebuf[Htotal -1] = tmp;

/* get a line */
                GetImageArea(Left, bounds->x1, y + fheight + inc, bounds->x2,
                                y + fheight + inc, linebuf[Htotal -1],
Channel,
                                inc);
        }
        MergeFarFree(linebuf);
        MergeFarFree(dbuf);

return found;
} endif
```

```
static MERGEERROR
CheckBounds(short far *value, short min, short max)
{
        int error = ME_PARAMETER;

if(*value < min)
                *value = min;
        else if(*value > max)
                *value = max;
        else
                error = ME_SUCCESS;

return error;
} static void
BlendSeam(LPIMAGE Merge, int seamx)
{
        int y;
        LPBYTE ptr;
        unsigned int a, b, c, d;
        int j;

if(Merge->Class == MIC_BILEVEL)
                return;
        else if(Merge->Class == MIC_TRUECOLOR)
                seamx *= 3;

for(y = 0; y < Merge->Height; y++)
                if((ptr = Merge->GetLine(y)) != NULL){
                        ptr += seamx;
                        if(Merge->Class == MIC_TRUECOLOR){
                                for(j = 0; j < 3; j++, ptr--){
                                        a = *(ptr - 6);
                                        b = *(ptr - 3);
                                        c = *ptr;
                                        d = *(ptr + 3);

*(ptr-3) = (BYTE)(((a << 1) + (b << 1) + (c << 2)) >> 3);
                                        *ptr = (BYTE)(((b << 2) + (c << 1) + (d << 1)) >> 3);
                                }
                        }
                        else{
                                a = *(ptr - 2);
                                b = *(ptr - 1);
                                c = *ptr;
                                d = *(ptr + 1);

*(ptr-1) = (BYTE)(((a << 1) + (b << 1) + (c << 2)) >> 3);
                                *ptr = (BYTE)(((b << 2) + (c << 1) + (d << 1)) >> 3);
                        }
                }
}
```

```
/**********************************************************************/
/* merge2.c                                                           */
/*          Private functions, called in the merging phase.           */
/*                                                                    */
/*    Copyright (c) Logitech, Inc., 1991. JPM.                        */
/*                                                                    */
/**********************************************************************/ include "mergelib.h"

typedef double far * VECTOR;

typedef VECTOR far * PVECTOR;

typedef struct mts {
        PVECTOR vec;      /* far pointer to array of far pointers */
        int    m, n;
        } MATRIX;

typedef MATRIX far * PMATRIX;

typedef struct {
        double far *Coef;
        short MaxX;
        short MaxY;
        FPGETLINE GetSourceLine;
        FPGETLINE GetDestLine;
        BYTE far *LineData;
        short AStart;
        short AEnd;
        FPABORT Abort;
        BOOL Bilinear;
        int far *Offsets;
        long incdenom, incx, incy;
} TRANSENV;

/*-------------------------------------------------------------------
| local function prototypes
|----------------------------------------------Wed Jul 10 14:58:48 1991--*/
static MERGEERROR near FindTransform(LPTWOINTS spts, LPTWOINTS dpts, double
far *Coef, int numpoints);
static MERGEERROR near PolygonSolver(int numPoints, LPTWOINTS Points,
MERGEERROR (near * LineFunction)(), void far *env);
static MERGEERROR near My_Transform(int x1, int x2, int y, TRANSENV far
*env);
static MERGEERROR near My_Transform3(int x1, int x2, int y, TRANSENV far
*env);
static MERGEERROR near My_TransformB(int x1, int x2, int y, TRANSENV far
*env);

static void near make4points(LPTWOINTS pt1, LPTWOINTS pt2);
static void near findmatrix(PMATRIX matrix, LPTWOINTS sPoints, LPTWOINTS
dPoints, int numpoints);
static int  near gauss_elim (PMATRIX mat);
static void near mat_free(PMATRIX mat);
static void near mat_transpose(PMATRIX mat1, PMATRIX mat2);
static int  near mat_multiply(PMATRIX mat1, PMATRIX mat2, PMATRIX mat3);
static int  near mat_juxtapose(PMATRIX mat1, PMATRIX mat2, PMATRIX mat3);
static PMATRIX  near mat_create(int ,int);

#define MASK 0xf       /* 7 lowest bits . mask depends on BILINEAR_SHIFT */
#define BILINEAR_SHIFT 4
#define NUMER_SHIFT 0x80000
#define DENOM_SHIFT 0x8000 /* BILINEAR_SHIFT = NUMER_SHIFT - DENOM_SHIFT */
```

```
/*
    Apply a projective affine transformation to Image1 and put result in
    Image2. The transformation is defined by at least four points in
    each image. Polygon defines the outline of the transformed Image1 in
    Image2.
*/

MERGEERROR
TransformImage(   LPIMAGE Image1,
                  LPIMAGE Image2,
                  double far *Coef,
                  LPTWOINTS polygon,
                  BOOL Bilinear,
                  int far *offsets,
                  FPABORT Abort)
{
    MERGEERROR errval = ME_SUCCESS;
    int y;
    TRANSENV env;
    MRECT Rect;
    short width = Image2->Width;
    MERGEERROR (near *funptr)(int x1, int x2, int y, TRANSENV far *env);
    double foo;

if((env.GetSourceLine = Image1->GetLine) == NULL ||
            (env.GetDestLine = Image2->GetLine) == NULL)
        return ME_PARAMETER;

/* store dimensions of Image1 for My_Transform() */ env.MaxX = Image1->Width -1;
    env.MaxY = Image1->Height -1;

/* offsets correcting for non-linear stretching */
    env.Offsets = offsets;

if(Image2->Class == MIC_TRUECOLOR){
            width *= 3;
            funptr = My_Transform3;
            env.MaxX *= 3;
    }
    else if(Image2->Class == MIC_BILEVEL)
            funptr = My_TransformB;
    else
            funptr = My_Transform;

/* allocate space for line buffer */ if((env.LineData = MergeFarMalloc(width)) == NULL)
            return ME_MEMORY;

env.Coef = Coef;

/* bi-linear scaling flag */
    env.Bilinear = Bilinear;

/* abort function */
    env.Abort = Abort;

/* stuff that is needed by my_transform(), and that never change. */ if((foo = Coef[3] * (double)DENOM_SHIFT) < 0.0)
            env.incdenom = (long)(foo - 0.5);
    else
            env.incdenom = (long)(foo + 0.5);
```

-72-

```
        if((foo = Coef[1] * (double)NUMER_SHIFT) < 0.0)
                env.incx = (long)(foo - 0.5);
        else
                env.incx = (long)(foo + 0.5);

if((foo = Coef[6] * (double)NUMER_SHIFT) < 0.0)
                env.incy = (long)(foo - 0.5);
        else
                env.incy = (long)(foo + 0.5);

/* For each line in the polygon, call function My_Transform() */

/*
                Note (9/2/91): Since we now clip the merged image so as not to
show
                any empty area, the image of the right strip in the merged image
is
                always a vertical rectangle, instead of a rotated parallelogram.
                The Polygon Scanning code is consequently commented out.
        */ ifdef CLIPPING
        /* store min and max line numbers for abort function */ env.AStart = polygon[0][1];
        env.AEnd = polygon[1][1];

for(y = polygon[0][1]; y <= polygon[1][1] && errval == ME_SUCCESS;
y++)
                errval = (*funptr)(polygon[0][0], polygon[2][0], y, (void far
*)&env);

#else
        /* store min and max line numbers for abort function */

Rect = GetBoundingBox((LPTWOINTS)polygon, 4);
        env.AStart = Rect.y1;
        env.AEnd = Rect.y2;

errval = PolygonSolver(4, polygon, funptr, (void far *)&env);

#endif

MergeFarFree(env.LineData);

return errval;
}

/*
        Is called for each horizontal line inside a polygon, by
PolygonSolver().
*/ static MERGEERROR near
My_Transform(x1, x2, y, env)
int x1, x2, y;
TRANSENV far *env;
{
        MERGEERROR errval = ME_SUCCESS;
        int i;
        int xp, yp, xx;
        long tmpx, tmpy;
        long numx, numy, halfdenom, denom;
        BYTE far *line = env->LineData;
        double far *coef = env->Coef;
        short maxX = env->MaxX, maxY = env->MaxY;
```

```
        FPGETLINE getsource = env->GetSourceLine;
        int r00, r01, r10, r11;
        int deltax, deltay, deltaxy;
        LPBYTE ptr, destptr;
        double foo;
        int far *offsets = env->Offsets;
        long incdenom = env->incdenom, incx = env->incx, incy = env->incy;

10      if(env->Abort != NULL && !(y % 20))
                if((*env->Abort)(M_ABORTSTRETCH + (short)((long)(y -
        env->AStart) * (long)M_ABORTMERGE /
                                        (long)(env->AEnd - env->AStart))) ==
        FALSE)
15                      errval = ME_USERABORT;

/*
                multiply pixel coordinates with transformation matrix using
                homomorphic coordinates, and switch to real coordinates.
20      */ if((foo = (1.0 + (double)x1 * coef[3] + (double)y * coef[4]) *
        (double)DENOM_SHIFT)   < 0.0)
                denom = (long)(foo - 0.5);
25      else
                denom = (long)(foo + 0.5);

if(denom == 0l)
                return 0;
30
        if((halfdenom = denom >> 1) < 0)
                halfdenom = -halfdenom;

if((foo = (coef[0] + (double)x1 * coef[1] + (double)y * coef[2]) *
35      (double)NUMER_SHIFT) < 0.0)
                tmpx = ((numx = (long)(foo - 0.5)) - halfdenom)  / denom ;
        else
                tmpx = ((numx = (long)(foo + 0.5)) + halfdenom)  / denom ;

40      if((foo = (coef[5] + (double)x1 * coef[6] + (double)y * coef[7]) *
        (double)NUMER_SHIFT) < 0.0)
                tmpy = ((numy = (long)(foo - 0.5)) - halfdenom)  / denom ;
        else
                tmpy = ((numy = (long)(foo + 0.5)) + halfdenom)  / denom ;
45 for(i=0, xx=x1;xx<=x2;i++, xx++){

/* integral location of pixel in source image */
50
                xp = (int)(tmpx >> BILINEAR_SHIFT);
                yp = (int)(tmpy >> BILINEAR_SHIFT);

/* check position */
                if(xp < 0)
                        xp = 0;
                else if(xp > maxX)
                        xp = maxX;
                if(yp < 0)
                        yp = 0;
                else if(yp > maxY)
                        yp = maxY;
                if(offsets != NULL){
                        yp += offsets[yp];

if(yp < 0)
```

```
                    yp = 0;
            else if(yp > maxY)
                    yp = maxY;
    } r00 = *(ptr = (LPBYTE)(*getsource)(yp) + xp);

if(env->Bilinear){
            /* decimal part of position of pixel in source image */ deltax = (int)tmpx & MASK;
            deltay = (int)tmpy & MASK;

deltaxy = ((deltax * deltay) >> BILINEAR_SHIFT);

/*
                    find color values of the four pixels surrounding position
                    (tmpx, tmpy):

r00 | r10
                    ----|----
                    r01 | r11
            */ if(xp < maxX)
                    r10 = *(ptr + 1);
            else
                    r10 = r00;

if(yp < maxY)
                    r01 = *(ptr = (LPBYTE)(*getsource)(yp + 1) + xp);
            else
                    r01 = r00;

if(xp < maxX)
                    r11 = *(ptr + 1);
            else
                    r11 = r01;

/*     do bi-linear interpolation. */ r00 = ( ( (r10 - r00) * deltax + \
                      (r01 - r00) * deltay + \
                      (r11 + r00 - r01 -r10) * deltaxy ) >> BILINEAR_SHIFT) + r00 ;
    }

*line++ = (BYTE)r00;

if((denom += incdenom) != 0l){
            if((halfdenom = denom >> 1) < 0)
                    halfdenom = -halfdenom;

if((numx += incx) < 0)
                    tmpx = (numx - halfdenom) / denom;
            else
                    tmpx = (numx + halfdenom) / denom;

if((numy += incy) < 0)
                    tmpy = (numy - halfdenom) / denom;
            else
                    tmpy = (numy + halfdenom) / denom;
    }
} if((destptr = (LPBYTE)(*env->GetDestLine)(y)) != NULL)
        memcpy(destptr + x1, env->LineData, x2 - x1 + 1);
```

75

```
            return errval;
    }

    static MERGEERROR near
    My_Transform3(x1, x2, y, env)
    int x1, x2, y;
    TRANSENV far *env;
    {
            MERGEERROR errval = ME_SUCCESS;
            int i;
            int xp, yp, xx;
            long tmpx, tmpy;
            long numx, numy, halfdenom, denom;
15          BYTE far *line = env->LineData;
            double far *coef = env->Coef;
            short maxX = env->MaxX, maxY = env->MaxY;
            FPGETLINE getsource = env->GetSourceLine;
            int r00, r01, r10, r11;
            int g00, g01, g10, g11;
            int b00, b01, b10, b11;
            int deltax, deltay, deltaxy;
            LPBYTE ptr, destptr;
            double foo;
            int far *offsets = env->Offsets;
            long incdenom = env->incdenom, incx = env->incx, incy = env->incy;

if(env->Abort != NULL && !(y % 20))
30                  if((*env->Abort)(M_ABORTSTRETCH + (short)((long)(y -
    env->AStart) * (long)M_ABORTMERGE /
                                              (long)(env->AEnd - env->AStart))) ==
    FALSE)
                            errval = ME_USERABORT;
35

/*
                multiply pixel coordinates with transformation matrix using
                homomorphic coordinates, and switch to real coordinates.
40          */ if((foo = (1.0 + (double)x1 * coef[3] + (double)y * coef[4]) *
    (double)DENOM_SHIFT)  < 0.0)
                    denom = (long)(foo - 0.5);
45          else
                    denom = (long)(foo + 0.5);

if(denom == 0l)
                    return 0;
50
            if((halfdenom = denom >> 1) < 0)
                    halfdenom = -halfdenom;

if((foo = (coef[0] + (double)x1 * coef[1] + (double)y * coef[2]) *
55  (double)NUMER_SHIFT) < 0.0)
                    tmpx = ((numx = (long)(foo - 0.5)) - halfdenom)  / denom ;
            else
                    tmpx = ((numx = (long)(foo + 0.5)) + halfdenom)  / denom ;

60          if((foo = (coef[5] + (double)x1 * coef[6] + (double)y * coef[7]) *
    (double)NUMER_SHIFT) < 0.0)
                    tmpy = ((numy = (long)(foo - 0.5)) - halfdenom)  / denom ;
            else
                    tmpy = ((numy = (long)(foo + 0.5)) + halfdenom)  / denom ;
            for(i=0, xx=x1;xx<=x2;i++, xx++){

/* integral location of pixel in source image */
```

```
        xp = (int)(tmpx >> BILINEAR_SHIFT) * 3;
        yp = (int)(tmpy >> BILINEAR_SHIFT);

/* check position */
        if(xp < 0)
            xp = 0;
        if(xp > maxX)
            xp = maxX;
        if(yp < 0)
            yp = 0;
        if(yp > maxY)
            yp = maxY;

if(offsets != NULL){
            yp += offsets[yp];

if(yp < 0)
                yp = 0;
            else if(yp > maxY)
                yp = maxY;
        } r00 = *(ptr = (LPBYTE)(*getsource)(yp) + xp);
        g00 = *++ptr;
        b00 = *++ptr;

if(env->Bilinear){

/* decimal part of position of pixel in source image */ deltax = (int)tmpx & MASK;
            deltay = (int)tmpy & MASK;

deltaxy = ((deltax * deltay) >> BILINEAR_SHIFT);
            /*
position          find color values of the four pixels surrounding (tmpx, tmpy):

r00 | r10
                  ----|----
                  r01 | r11
            */ if(xp < maxX){
                r10 = *++ptr;
                g10 = *++ptr;
                b10 = *++ptr;
            }
            else{
                r10 = r00;
                g10 = g00;
                b10 = b00;
            } if(yp < maxY){
                r01 = *(ptr = (LPBYTE)(*getsource)(yp + 1) + xp);
                g01 = *++ptr;
                b01 = *++ptr;
            }
            else{
                r01 = r00;
                g01 = g00;
                b01 = b00;
            }
```

```
                    if(xp < maxX){
                            r11 = *++ptr;
                            g11 = *++ptr;
                            b11 = *++ptr;
                    }
                    else{
                            r11 = r01;
                            g11 = g01;
                            b11 = b01;
                    }

/*   do bi-linear interpolation. */ r00 = ( ( (r10 - r00) * deltax + \
                              (r01 - r00) * deltay + \
    BILINEAR_SHIFT)   + r00 ;     (r11 + r00 - r01 -r10) * deltaxy ) >> g00 = ( ( (g10 - g00) * deltax + \
                              (g01 - g00) * deltay + \
    BILINEAR_SHIFT)   + g00 ;     (g11 + g00 - g01 -g10) * deltaxy ) >> b00 = ( ( (b10 - b00) * deltax + \
                              (b01 - b00) * deltay + \
    BILINEAR_SHIFT)   + b00 ;     (b11 + b00 - b01 -b10) * deltaxy ) >>
            }

*line++ = (BYTE)r00;
            *line++ = (BYTE)g00;
            *line++ = (BYTE)b00;

if((denom += incdenom) != 0l){
                    if((halfdenom = denom >> 1) < 0)
                            halfdenom = -halfdenom;

if((numx += incx) < 0)
                            tmpx = (numx - halfdenom) / denom;
                    else
                            tmpx = (numx + halfdenom) / denom;

if((numy += incy) < 0)
                            tmpy = (numy - halfdenom) / denom;
                    else
                            tmpy = (numy + halfdenom) / denom;
            }
    }
    if((destptr = (LPBYTE)(*env->GetDestLine)(y)) != NULL)
            memcpy(destptr + 3 * x1, env->LineData, (x2 - x1 + 1) * 3);

return errval;
} static MERGEERROR near
My_TransformB(x1, x2, y, env)
int x1, x2, y;
TRANSENV far *env;
{
    MERGEERROR errval = ME_SUCCESS;
    int i;
    int xp, yp, xx;
    long tmpx, tmpy;
    long numx, numy, halfdenom, denom;
    BYTE far *line = env->LineData;
    double far *coef = env->Coef;
    short maxX = env->MaxX, maxY = env->MaxY;
    FPGETLINE getsource = env->GetSourceLine;
```

```
        LPBYTE ptr, destptr;
        static char mask[] = {128, 64, 32, 16, 8, 4, 2, 1};
        int bitnum;
        double foo;
        int far *offsets = env->Offsets;
        long incdenom = env->incdenom, incx = env->incx, incy = env->incy;

if(env->Abort != NULL && !(y % 20))
                if((*env->Abort)(M_ABORTSTRETCH + (short)((long)(y -
    env->AStart) * (long)M_ABORTMERGE /
    FALSE)                              (long)(env->AEnd - env->AStart))) ==
                        errval = ME_USERABORT;

/* get first and last 8 pixels (8 bits) */ if((destptr = (LPBYTE)(*env->GetDestLine)(y)) == NULL)
                return 0;

*line = destptr[x1 >> 3];
        *(line + ((x2 - x1) >> 3)) = 0;
        bitnum = x1 % 8;
//      *(line + (x2 >> 3) - (x1 >> 3)) = destptr[x2 >> 3];

/*
                multiply pixel coordinates with transformation matrix using
                homomorphic coordinates, and switch to real coordinates.
        */ if((foo = (1.0 + (double)x1 * coef[3] + (double)y * coef[4]) *
    (double)DENOM_SHIFT) < 0.0)
                denom = (long)(foo - 0.5);
        else
                denom = (long)(foo + 0.5);

if(denom == 0l)
                return 0;

if((halfdenom = denom >> 1) < 0)
                halfdenom = -halfdenom;

if((foo = (coef[0] + (double)x1 * coef[1] + (double)y * coef[2]) *
    (double)NUMER_SHIFT) < 0.0)
                tmpx = ((numx = (long)(foo - 0.5)) - halfdenom)  / denom ;
        else
                tmpx = ((numx = (long)(foo + 0.5)) + halfdenom)  / denom ;

if((foo = (coef[5] + (double)x1 * coef[6] + (double)y * coef[7]) *
    (double)NUMER_SHIFT) < 0.0)
                tmpy = ((numy = (long)(foo - 0.5)) - halfdenom)  / denom ;
        else
                tmpy = ((numy = (long)(foo + 0.5)) + halfdenom)  / denom ;

for(i=0, xx=x1;xx<=x2;i++, xx++){

/* integral location of pixel in source image */ xp = (int)(tmpx >> BILINEAR_SHIFT);
                yp = (int)(tmpy >> BILINEAR_SHIFT);

/* check position */ if(xp < 0)
                        xp = 0;
                if(xp > maxX)
                        xp = maxX;
                if(yp < 0)
```

```
                yp = 0;
        if(yp > maxY)
                yp = maxY;

if(offsets != NULL){
                yp += offsets[yp];

if(yp < 0)
                        yp = 0;
                else if(yp > maxY)
                        yp = maxY;
        } ptr = (LPBYTE)(*getsource)(yp) + (xp >> 3);

if(*ptr & mask[xp % 8])
                *line |= mask[bitnum];
        else
                *line &= ~mask[bitnum];

if(++bitnum == 8){
                line++;
                bitnum = 0;
        } if((denom += incdenom) != 01){
                if((halfdenom = denom >> 1) < 0)
                        halfdenom = -halfdenom;

if((numx += incx) < 0)
                        tmpx = (numx - halfdenom) / denom;
                else
                        tmpx = (numx + halfdenom) / denom;

if((numy += incy) < 0)
                        tmpy = (numy - halfdenom) / denom;
                else
                        tmpy = (numy + halfdenom) / denom;
        }
    } memcpy(destptr + (x1 >> 3), env->LineData, ((x2 - x1) >> 3) + 1);

return errval;
}

/*
        Copy Image1 into Image2 starting at (offsetx, offsety) location.
        Assume Image2 dimensions are larger or equal to Image1->Width +
        offsetx and Image1->Height + offsety.
*/

MERGEERROR
CopyImage(  LPIMAGE Image1,
            LPIMAGE Image2,
            short starty,
            short endy,
            BOOL Smoothing,
            FPABORT Abort)
{
    MERGEERROR errval = ME_SUCCESS;
    short y1, y2, i;
    BYTE far *source;
    BYTE far *dest;
    short width = Image1->Width;
```

```
#ifdef CLIPPING
        if(width > Image2->Width || endy - starty + 1 > Image2->Height)
               return ME_PARAMETER;

if(Image1->Class == MIC_TRUECOLOR)
               width *= 3;

else if(Image1->Class == MIC_BILEVEL)
               width = (width + 7) / 8;

for(y1 = starty, y2 = 0; y1 <= endy; y1++, y2++){
               if(Abort != NULL && !(y1 % 100))
                     if((*Abort)((short)((long)(y1 - starty) * M_ABORTCOPY /
                                       (long)(endy - starty))) == FALSE){
                            break;
                            errval = ME_USERABORT;
                     } if((source = (*Image1->GetLine)(y1)) != NULL &&
                      (dest = (*Image2->GetLine)(y2)) != NULL){ if(!Smoothing || Image1->Class != MIC_GRAYSCALE)
                            memcpy(dest, source, width);
                     else{
                            dest[width-1] = source[width-1];
                            *dest++ = *source;

for(i = 0; i < width-1; i++, source++)
                                   *dest++ = (BYTE)(((unsigned int)*source +
(unsigned int)*(source+1)) >> 1);
                     }
               }
        }
else
        if(width + starty > Image2->Width ||
              Image1->Height + endy > Image2->Height)
               return ME_PARAMETER;

if(Image1->Class == MIC_TRUECOLOR){
               starty *= 3;
               width *= 3;
        }
        else if(Image1->Class == MIC_BILEVEL){
               starty /= 8;
               width /= 8;
        } for(y1 = 0; y1 < Image1->Height; y1++){ if((source = (*Image1->GetLine)(y1)) != NULL &&
                      (dest = (*Image2->GetLine)(y1 + endy)) != NULL)

memcpy(dest + starty, source, width);
        }
endif
        return errval;
}

/*
        Transform polygon coordinates through a projective affine matrix.
*/
MERGEERROR
```

```
        TransformPolygon(double far *Coef,  LPTWOINTS poly, int numpoints)
        {
                MERGEERROR errval = ME_SUCCESS;
                int i;
                double denom;
                double sx, sy;
                double foo;

                /* pass poly through the projective affine matrix */ for(i = 0; i < numpoints; i++){
                        sx = (double)poly[i][0];
                        sy = (double)poly[i][1];
                        if((denom = (double)1.0 + sx * Coef[3] + sy * Coef[4]) != 0.0){
                                if((foo = (Coef[0] + sx * Coef[1] + sy * Coef[2]) / denom)
           < 0.0)
                                        poly[i][0] = (int)(foo - 0.5);
                                else
                                        poly[i][0] = (int)(foo + 0.5);

if((foo = (Coef[5] + sx * Coef[6] + sy * Coef[7]) / denom)
           < 0.0)
                                        poly[i][1] = (int)(foo - 0.5);
                                else
                                        poly[i][1] = (int)(foo + 0.5);
                        }
                        else
                                errval = ME_MERGE;
                } return errval;
        }

/*
                Given two features and their matches, calculate projective affine
        matrix
                transformation.
        */

MERGEERROR
        FindTransformMatrix(PFINDPOINT FPts, PMATCHPOINT MPts, double far *Coef, int
        direction)
        {
                int index;
                int pt1[4][2], pt2[4][2];
                MERGEERROR errval = ME_PARAMETER;
                index = MPts[0].FindIndex;

pt1[0][0] = FPts[index].xFind;
                pt1[0][1] = FPts[index].yFind;
                pt2[0][0] = MPts[0].xMatch;
                pt2[0][1] = MPts[0].yMatch;

index = MPts[1].FindIndex;

                pt1[1][0] = FPts[index].xFind;
                pt1[1][1] = FPts[index].yFind;
                pt2[1][0] = MPts[1].xMatch;
                pt2[1][1] = MPts[1].yMatch;

                make4points(pt1, pt2);

if(direction == MATRIX_DIRECT)

/* calculate projective affine matrix (find -> match) */
```

```
                errval = FindTransform(pt1 , pt2, (double far *)Coef, 4);
        else if(direction == MATRIX_INVERSE)
                /* calculate projective affine matrix (match -> find) */
                errval = FindTransform(pt2 , pt1, (double far *)Coef, 4);
        return errval;
}

/*
 *      make a square out of 2 points.
 */
static void near
make4points(LPTWOINTS pt1, LPTWOINTS pt2)
{
        int deltax, deltay;
        double hipo, foo;

deltax = pt1[1][0] - pt1[0][0];
        deltay = pt1[1][1] - pt1[0][1];

pt1[3][1] = pt1[0][1] - deltax;
        pt1[3][0] = pt1[0][0] + deltay;
        pt1[2][1] = pt1[1][1] - deltax;
        pt1[2][0] = pt1[1][0] + deltay;

hipo = sqrt((double)deltax * (double)deltax + (double)deltay * (double)deltay);

deltax = pt2[1][0] - pt2[0][0];
        deltay = pt2[1][1] - pt2[0][1];

hipo /= sqrt((double)deltax * (double)deltax + (double)deltay * (double)deltay);

if((foo = hipo * (double)deltax) < 0.0)
                deltax = (int)(foo - 0.5);
        else
                deltax = (int)(foo + 0.5);

if((foo = hipo * (double)deltay) < 0.0)
                deltay = (int)(foo - 0.5);
        else
                deltay = (int)(foo + 0.5);

pt2[3][1] = pt2[0][1] - deltax;
        pt2[3][0] = pt2[0][0] + deltay;
        pt2[2][1] = pt2[1][1] - deltax;
        pt2[2][0] = pt2[1][0] + deltay;
}

MRECT far
GetBoundingBox(pt, numPoints)
LPTWOINTS pt;
int numPoints;
{
        int i;
        MRECT Rect;

Rect.x1 = Rect.x2 = pt[0][0];
        Rect.y1 = Rect.y2 = pt[0][1];

for(i=1;i<numPoints;i++){
                if(Rect.x1 > pt[i][0])
```

```
                    Rect.x1 = pt[i][0];
            if(Rect.y1 > pt[i][1])
                    Rect.y1 = pt[i][1];
            if(Rect.x2 < pt[i][0])
                    Rect.x2 = pt[i][0];
            if(Rect.y2 < pt[i][1])
                    Rect.y2 = pt[i][1];
    }
    return Rect;
} static MERGEERROR near
FindTransform(spts, dpts, Coef,numpoints)
LPTWOINTS spts;
LPTWOINTS dpts;
double far *Coef;
int numpoints;
{
    PMATRIX matrix;
    double sum, foo;
    int i,j, errval = ME_SUCCESS;

if((matrix = mat_create(8, 9)) == NULL)
            return ME_MEMORY;

findmatrix( matrix, spts, dpts, numpoints);

/* do gaussian elimination on mat */
    gauss_elim(matrix);

/* find solutions to reduced linear system (8 solutions) */ for(i=matrix->m-1; i>=0; i--){
            sum = 0.0;
            for(j=i+1;j<matrix->n;j++)
                    sum += matrix->vec[i][j];

if((foo = matrix->vec[i][i]) != 0.0)
                    sum /= foo;
            else{
                    errval = ME_MERGE;
                    break;
            }

Coef[i] = (double)sum;   /* Coef[] contains the 8 components of
    the transformation
                                        matrix ( 1 Coef is equal to 1) */
            for(j=0;j<i;j++)
                    matrix->vec[j][i] *= -sum ;
    } mat_free( matrix );

return errval;
} static void near
findmatrix(matrix, sPoints, dPoints, numpoints)
PMATRIX matrix;
LPTWOINTS sPoints;
LPTWOINTS dPoints;
int numpoints;
{
    int i;
    PVECTOR vect ;
    PMATRIX  M, beta, trans, col8, square8;
```

```
            M = mat_create(numpoints*2, 8);
            vect = M->vec;

for(i=0;i<M->m/2;i++){
                    vect[2*i][0] = 1.0;
                    vect[2*i][1] = (double)sPoints[i][0];
                    vect[2*i][2] = (double)sPoints[i][1];
                    vect[2*i][3] = - (double)sPoints[i][0] * (double)dPoints[i][0];
                    vect[2*i][4] = - (double)sPoints[i][1] * (double)dPoints[i][0];
                    vect[2*i][5] = 0.0;
                    vect[2*i][6] = 0.0;
                    vect[2*i][7] = 0.0;

vect[2*i+1][0] = 0.0;
                    vect[2*i+1][1] = 0.0;
                    vect[2*i+1][2] = 0.0;
                    vect[2*i+1][3] = - (double)sPoints[i][0] *
       (double)dPoints[i][1];
                    vect[2*i+1][4] = - (double)sPoints[i][1] *
       (double)dPoints[i][1];
                    vect[2*i+1][5] = 1.0;
                    vect[2*i+1][6] = (double)sPoints[i][0];
                    vect[2*i+1][7] = (double)sPoints[i][1];
            } beta = mat_create(M->m, 1);

for(i=0;i<beta->m/2;i++){
                    beta->vec[2*i][0] = (double)dPoints[i][0];
                    beta->vec[2*i+1][0] = (double)dPoints[i][1];
            } if(numpoints > 4){
                    trans = mat_create(M->n, M->m);
                    mat_transpose(M, trans);
                    square8 = mat_create(trans->m, M->n);
                    mat_multiply(trans, M, square8);
                    col8 = mat_create(trans->m, beta->n);
                    mat_multiply(trans, beta, col8);
                    mat_free( trans );
                    mat_juxtapose(square8, col8, matrix);
                    mat_free( square8 );
                    mat_free( col8 );
            }
            else
                    mat_juxtapose(M, beta, matrix);

mat_free( beta );
            mat_free( M );
       } static int near
       gauss_elim (mat)
       PMATRIX mat;

{
               PVECTOR    vec;      /* holds mat->vec for quick access */
               VECTOR     tmp;      /* for row exchanges */
               int    m,            /* holds mat->m for quick access */
                      n,            /* ditto for mat->n */
                      pvtrow,       /* pivot row index */
                      pvtcol,       /* pivot column index */
                      row,          /* g.p. row index */
                      col,          /* g.p. column index */
                      det;          /* tracks determinant info */
               double     pivot,    /* pivot value */
                          mplr;     /* multiplier for row elimination */
```

```
        vec = mat->vec;     /* init hold variables */
        m = mat->m;
        n = mat->n;

pvtrow = 0;
        for (pvtcol = 0; pvtcol < n && pvtrow < m; pvtcol++)
            {
                    /* do partial pivoting */
            for (row = pvtrow + 1; row < m; row++)
                if (fabs (vec [pvtrow][pvtcol]) < fabs (vec [row][pvtcol]))
                    {tmp = vec [pvtrow];
                    vec [pvtrow] = vec [row];
                    vec [row] = tmp;
                    det = -det;
                    }

/* skip pivot if it is 0 */
            if ((pivot = vec [pvtrow][pvtcol]) == 0.0)
                continue;

/* eliminate rows < pvtrow */
            for (row = pvtrow + 1; row < m; row++)
                {mplr = -vec [row][pvtcol] / pivot;
                vec [row][pvtcol] = 0.0;
                for (col = pvtcol + 1; col < n; col++)
                    vec [row][col] += mplr * vec [pvtrow][col];
                }
            pvtrow++;
            }
        return (det);
}

/*
 * mat_multiply(mat1, mat2, mat3) <=> mat3 = mat1 * mat2
 */ static int near
mat_multiply(mat1, mat2, mat3)
PMATRIX mat1, mat2, mat3;
{
        PVECTOR vec1, vec2, vec3;
        int i, j, k;                    /* holds mat->vec for quick access */
        double sum;

if( mat1->n != mat2->m)
                return -1;

mat3->m = mat1->m;
        mat3->n = mat2->n;

vec1 = mat1->vec;
        vec2 = mat2->vec;
        vec3 = mat3->vec;

for( i= 0; i< mat3->m; i++){
            for( j=0; j<mat3->n; j++){
                sum = 0.0;
                for(k= 0; k< mat1->n; k++)
                    sum += vec1[i][k] * vec2[k][j];

vec3[i][j] = sum;
                }
            } return (0);
} static void near
```

```
mat_transpose(mat1, mat2)
PMATRIX mat1, mat2;
{
        int i, j;

mat2->n = mat1->m;
        mat2->m = mat1->n;

for(i = 0; i<mat2->m; i++)
                for(j = 0; j<mat2->n; j++)
                        mat2->vec[i][j] = mat1->vec[j][i];

return;
} static int near
mat_juxtapose(mat1, mat2, mat3)
PMATRIX mat1, mat2, mat3;
{
        int i,j;

if(mat1->m != mat2->m)
                return(-1);

mat3->m = mat1->m;
        mat3->n = mat1->n + mat2->n;

for(i = 0; i<mat1->m; i++)
                for(j = 0; j<mat1->n; j++)
                        mat3->vec[i][j] = mat1->vec[i][j];

for(i = 0; i<mat2->m; i++)
                for(j = mat1->n; j<mat3->n; j++)
                        mat3->vec[i][j] = mat2->vec[i][j - mat1->n];

return (0);
} static PMATRIX near
mat_create(m,n)
int m, n;
{
        PMATRIX mat = NULL;
        PVECTOR vec;
        int i, j;

if( (mat = (PMATRIX)MergeFarMalloc(sizeof(MATRIX))) != NULL){ mat->m = m;
                mat->n = n;

if( (vec = (PVECTOR)MergeFarMalloc( mat->m * sizeof(VECTOR))) !=
NULL){
                        mat->vec = vec;

for(i = 0; i < mat->m && mat!=NULL; i++){
                                if( (vec[i] = (VECTOR)MergeFarMalloc( mat->n *
sizeof(double))) == NULL){
                                        for( j=0; j<i; j++)
                                                MergeFarFree(vec[j]);

MergeFarFree(vec);
                                        MergeFarFree(mat);
                                        mat = NULL;
                                }
                        }
```

```
                else {
                    MergeFarFree(mat);
                    mat = NULL;
                }
            }
            else
                mat = NULL;

return mat;
    } static void near
    mat_free(mat)
    PMATRIX mat;
    {
            int i;

if(mat != NULL)
                    if(mat->vec != NULL)
                            for(i=0; i < mat->m; i++)
                                    MergeFarFree(mat->vec[i]);

return;
    } ifndef CLIPPING
    /****************************************************************/
    /*                                                              */
    /* The following function, and associated subroutines, call a user */
    /* defined function for each horizontal line inside a polygon. The */
    /* polygon is defined by the list of the coordinates of its vortices. */
    /* The user-defined function has the following format:          */
    /*                                                              */
    /*          function(int x1, int x2, int y)                     */
    /*                                                              */
    /****************************************************************/

/*
     *      These are used to access Points[][2] arrays nicely
     */
    #define X_COORD         0
    #define Y_COORD         1
    #define CLIPPED         (ME_VER1 + 100)

/*
     *      A description of a side
     */
    typedef struct _sl {
            int YTop;           /* larger Y coordinate for line */
            int DeltaY;         /* difference in Y coordinates */
            double XInter;          /* X that goes with larger Y */
            double XChangePerScan;  /* X change per unit change in Y */
    } SIDE_LIST;

typedef SIDE_LIST far * PSIDELIST;

/*
     *      Local function templates
     */ static void near SortOnBiggerY(int, LPTWOINTS, PSIDELIST, int far *, int far *);
    static int  near NextY(int, LPTWOINTS, int);
```

```
static void near PutInSideList(PSIDELIST, int, int, int, int, int, int);
static void near UpdateFirstAndLast(int, int, PSIDELIST, int far *, int far
*);
static void near ProcessXIntersections(PSIDELIST, int, int, int far *);
static void near SortOnX(PSIDELIST, int, int);
static void near UpdateSideList(PSIDELIST, int, int);
static MERGEERROR near DrawLines(int, PSIDELIST, int, int, MERGEERROR (near
*)(int, int, int, void far *), void far *);

/*
 *    The polygon solver proper: it will call the function
 *    for each horizontal scan line in the polygon.
 *
 *    NOTE: if ANY CLIPPED error is received, CLIPPED is returned
 *    instead of ME_SUCCESS
 */ static MERGEERROR near
PolygonSolver(numPoints,Points,LineFunction, env)
int numPoints;
LPTWOINTS Points;
MERGEERROR (near *LineFunction)();
void far *env;
{
    MERGEERROR Error = ME_SUCCESS;
    PSIDELIST SideList;
    long ListSize;
    int WasClipped = FALSE;
    ListSize = (long)sizeof(SIDE_LIST);
    ListSize *= (long)(numPoints + 1);  /* one extra for terminator */ if ( (SideList = (PSIDELIST)MergeFarMalloc((unsigned)ListSize)) ==
NULL ) {
        Error = ME_MEMORY;
    }
    else {
        int FirstS, LastS, ScanLine, XIntCount;
        int SideCount, BottomScanLine;

SortOnBiggerY(numPoints,Points,SideList,&SideCount,&BottomScanLine);
        FirstS = LastS = 0;

for (ScanLine = SideList[0].YTop; ScanLine >= BottomScanLine;
ScanLine--) {

UpdateFirstAndLast(ScanLine,SideCount,SideList,&FirstS,&LastS);
            ProcessXIntersections(SideList,FirstS,LastS,&XIntCount);
            Error =
DrawLines(ScanLine,SideList,XIntCount,FirstS,LineFunction, env);
            if (Error == CLIPPED)
                WasClipped = TRUE;
            else if (Error != ME_SUCCESS)
                break;
            UpdateSideList(SideList,FirstS,LastS);
        }

MergeFarFree(SideList);
    } if (WasClipped && Error == ME_SUCCESS)
        return CLIPPED;
    else
        return Error;
}

/*
 *    Now we actually get to call the function!
```

```
 *
 *    NOTE: if ANY CLIPPED error is received, CLIPPED is returned
 *          instead of ME_SUCCESS
 */
static MERGEERROR near
DrawLines(ScanLine,SideList,XIntCount,Index,LineFunction, env)
int ScanLine;
PSIDELIST SideList;
int XIntCount;
int Index;
MERGEERROR (near *LineFunction)(int,int,int, void far *);
void far *env;
{
        int k;
        MERGEERROR Error = ME_SUCCESS;
        int X1, X2;
        int kLimit = XIntCount / 2 + (XIntCount % 2);
        int WasClipped = FALSE;

for (k = 1; k <= kLimit; k++) {
                while (SideList[Index].DeltaY == 0)
                        Index++;
                X1 = (int)(SideList[Index].XInter + (double)0.5);
                Index++;
                while (SideList[Index].DeltaY == 0)
                        Index++;
                X2 = (int)(SideList[Index].XInter + (double)0.5);

/* line function is guaranteed X1 <= X2 */
                if (X1 > X2) {
                        int Tmp = X1;
                        X1 = X2;
                        X2 = Tmp;
                }

Error = (*LineFunction)(X1, X2, ScanLine, env);
                if (Error == CLIPPED)
                        WasClipped = TRUE;
                else if (Error != ME_SUCCESS)
                        break;

Index++;
        } if (WasClipped && Error == ME_SUCCESS)
                return CLIPPED;
        else
                return Error;
} static void near
SortOnBiggerY(numPoints,Points,SideList,ReturnSideCount,ReturnBottomScanLine
)
int numPoints;
LPTWOINTS Points;
PSIDELIST SideList;      /* The Side List */
int far * ReturnSideCount;
int far * ReturnBottomScanLine;
{
        int X1, Y1, TempY, k;
        int BottomScanLine;
        int SideCount;

SideCount = 0;
        BottomScanLine = Y1 = Points[numPoints - 1][Y_COORD];
        X1 = Points[numPoints - 1][X_COORD];

for (k = 0; k < numPoints; k++) {
```

```
            /* put non-horizontal edges in table */
            if (Y1 != Points[k][Y_COORD]) {
                    TempY = NextY(numPoints,Points,k);
                    PutInSideList(SideList,SideCount, /* start from 0 */
                            X1,Y1,Points[k][X_COORD],Points[k][Y_COORD],TempY);
                    SideCount++;
            } if (Points[k][Y_COORD] < BottomScanLine) {
                    BottomScanLine = Points[k][Y_COORD];
            }
            X1 = Points[k][X_COORD];
            Y1 = Points[k][Y_COORD];
    }

/* add a dummy terminating node */
    SideList[SideCount].YTop = 0;

*ReturnSideCount = SideCount;
    *ReturnBottomScanLine = BottomScanLine;
} static int near
NextY(numPoints,Points,k)
int numPoints;
LPTWOINTS Points;
int k;
{
    int Pos = k;

/*  Look for first Y that is not equal to current  */
    while (Points[Pos][Y_COORD] == Points[k][Y_COORD]) {
            if ( ++Pos == numPoints )
                    Pos = 0;
    } return(Points[Pos][Y_COORD]);
}

/*
 *      Adds a side to the SideList
 */
static void near
PutInSideList(SideList,Entry,X1,Y1,X2,Y2,NextY)
PSIDELIST SideList;
int Entry;
int X1;
int Y1;
int X2;
int Y2;
int NextY;
{
    int MaxY;
    double X2Tmp, dxTmp;

/* dxTmp, the inverse slope, is used to find boundary edge on x */
    dxTmp = (double)(X2 - X1) / (double)(Y2 - Y1);
    X2Tmp = (double)X2;

/* offset special vertexes */
    if (Y2 > Y1 && Y2 < NextY) {
            Y2--;
            X2Tmp -= dxTmp;
    }
    else if (Y2 < Y1 && Y2 > NextY) {
            Y2++;
            X2Tmp += dxTmp;
```

```
                        }
                if (Y1 > Y2)
                        MaxY = Y1;
                else
                        MaxY = Y2;

/* insert edge into sides list */
                while (Entry > 0 && MaxY > SideList[Entry-1].YTop) {
                        SideList[Entry] = SideList[Entry-1];
                        Entry--;
                }

SideList[Entry].YTop = MaxY;
                SideList[Entry].DeltaY = abs(Y2 - Y1) + 1;
                if (Y1 > Y2)
                        SideList[Entry].XInter = (double)X1;
                else
                        SideList[Entry].XInter = X2Tmp;
                SideList[Entry].XChangePerScan = dxTmp;
        }

/*
         */
        static void near
        UpdateFirstAndLast(ScanLine,Count,SideList,FirstS,LastS)
        int ScanLine;
        int Count;
        PSIDELIST SideList;
        int far *FirstS;
        int far *LastS;
        {
        int i,j;

/* THE BUG IS HERE ! */
                for (;;) {
                        i = *LastS;
                        j = SideList[i+1].YTop;
                        if (j >= ScanLine && i < (Count - 1)) {
                                (*LastS)++;
                        }
                        else
                                break;
                } while (SideList[*FirstS].DeltaY == 0)
                        (*FirstS)++;
        }

/*
         */
        static void near
        ProcessXIntersections(SideList,FirstS,LastS,XIntCount)
        PSIDELIST SideList;
        int FirstS;
        int LastS;
        int far * XIntCount;
        {
                int k;

*XIntCount = 0;
                for (k = FirstS; k <= LastS; k++) {
                        if (SideList[k].DeltaY > 0) {
                                (*XIntCount)++;
                                SortOnX(SideList,k,FirstS);
                        }
                }
```

```
        }

/*
         */
        static void near
        SortOnX(SideList,Entry,FirstS)
        PSIDELIST  SideList;
        int Entry;
        int FirstS;
        {
                SIDE_LIST Tmp;

while (Entry > FirstS && SideList[Entry].XInter <
        SideList[Entry-1].XInter) {
                        Tmp = SideList[Entry-1];
                        SideList[Entry-1] = SideList[Entry];
                        SideList[Entry] = Tmp;
                        Entry--;
                }
        }

/*
         */
        static void near
        UpdateSideList(SideList,FirstS,LastS)
        PSIDELIST SideList;
        int FirstS;
        int LastS;
        {
                int k;

for (k = FirstS; k <= LastS; k++) {
                        if (SideList[k].DeltaY > 0) {
                                SideList[k].DeltaY--;
                                SideList[k].XInter -= SideList[k].XChangePerScan;
                        }
                }
        } endif
```

What is claimed is:

1. A method for automatically merging first and second images stored on a computer system, said first and second images each having an overlap portion overlapping the other image, the method comprising:
   (a) comparing pixel values of a plurality of regions to pixel values of adjacent regions;
   (b) determining an amount of uncorrelation of each region compared to said adjacent regions;
   (c) identifying as a first feature at least one of said regions having a higher amount of uncorrelation than at least one other region;
   (d) matching a corresponding feature in the second image to said first feature in the first image;
   (e) determining a difference in alignment of the two features; and
   (f) merging the two images into a single image by aligning the two images in accordance with the difference in alignment of the two features such that a single one of said two features remains in said single image.

2. The method of claim 1, wherein before step (d) further comprises:
   determining a geometry of the first image;
   determining a geometry of the second image; and
   transforming the geometry of the second image to that of the geometry of the first image.

3. The method of claim 2, wherein said transforming step includes translation, rotation, compression, and expansion transformations.

4. The method of claim 1, wherein said images are bitmap images.

5. The method of claim 1, wherein said images are vector-format images.

6. In a system for providing images to a digital computer, the improvement comprising:
   means for acquiring a source image as at least first and second image portions, said first and second image portions each having an overlap portion overlapping the other image portion;
   means for comparing pixel values of a plurality of regions to pixel values of adjacent regions;
   means for determining an amount of uncorrelation of each region compared to said adjacent regions;
   means for identifying as a first feature at least one of said regions having a higher amount of uncorrelation than at least one other region;
   means for matching said first feature to a corresponding feature in said overlap portion of said second image portion;
   means for determining a difference in alignment of said two features; and
   means for merging said at least two image portions into a single image by aligning the image portions in accordance with the difference in alignment of the two features.

7. The system of claim 6, wherein said acquiring means is a handheld scanner.

8. The system of claim 6, further comprising:
   means for transforming a geometry of the second image portion to that of the first image portion.

9. A system for entering images into a computer, the system comprising:
   a computer having a memory and a processor;
   scanner means for acquiring a source image as a plurality of image portions, at least two of said image portions partially overlapping each other;
   means for comparing pixel values of a plurality of regions to pixel values of adjacent regions;
   means for determining an amount of uncorrelation of each region compared to said adjacent regions;
   means for identifying as a first feature at least one of said regions having a higher amount of uncorrelation than at least one other region;
   means for determining a difference in alignment of said first feature and a corresponding feature in said overlap portion of said second image portion; and
   means for merging said at least two image portions by aligning the images in accordance with the difference in alignment of said features such that a single one of said features remains in said single image.

10. A method for automatically merging first and second image strips from a hand-held scanner, said first and second image strips each having an overlap portion overlapping the other image strip, comprising the steps of:
    a) determining said overlap portion of said first image strip which overlaps with said second image strip;
    (b) comparing pixel values of a plurality of regions to pixel values of adjacent regions;
    (c) determining an amount of uncorrelation of each region compared to said adjacent regions;
    (d) identifying as a first feature at least one of said regions having a higher amount of uncorrelation than at least one other region;
    (e) matching said first feature to a corresponding feature in an overlap portion of said second image strip;
    (f) determining a transformation required for a geometry of said first feature to match a geometry of said corresponding feature;
    (g) applying said transformation to one of said first and second image strips;
    (h) eliminating one of said overlap portions; and
    (f) combining said first and second image strips.

11. The method of claim 10 wherein a second feature is located in said overlap portion of said first image and matched to a second corresponding feature in said overlap portion of said second image.

12. The method of claim 11 further comprising the step of selecting said first and second features from first and second distinct regions of said overlap portion of said first image.

13. The method of claim 11 further comprising the steps of:
    determining a first distance between said first and second features;
    determining a second distance between said corresponding features;
    comparing said first and second distances; and
    applying one of a compression or expansion transformation to one of said first and second images to match said first and second distances.

14. The method of claim 10 wherein said transformation includes rotation and one of compression and expansion.

15. The method of claim 10 wherein said first and second images are stored as a bitmap.

16. The method of claim 10 wherein said step of locating at least a first feature includes the steps of:
    determining at least one attribute of features to be examined;
    determining a minimum score for said attribute;
    determining scores for said attribute of features in said overlap portion of said first image; and updating said minimum score to the score of any feature located.

17. The method of claim 10 further comprising the steps of:

predicting a region in said overlap portion of said second image containing said corresponding feature from a location of said first feature in said first image; and searching said region for said corresponding feature.

18. A method for automatically merging first and second image strips from a hand-held scanner, said first and second image strips each having an overlap portion overlapping the other image strip, comprising the steps of:

(a) determining said overlap portion of said first image strip which overlaps with said second image strip;

(b) comparing pixel values of a plurality of regions to pixel values of adjacent regions;

(c) determining an amount of uncorrelation of each region compared to said adjacent regions;

(d) identifying as a first feature at least one of said regions having a higher amount of uncorrelation than at least one other region;

(e) matching said first and second features to corresponding features in an overlap portion of said second image strip;

(f) determining a transformation required for a geometry of said first and second features to match a geometry of said corresponding features, said transformation including rotation and one of compression and expansion;

(g) applying said transformation to one of said first and second image strips;

(h) eliminating one of said overlap portions; and (i) combining said first and second image strips.

19. The method of claim 18 further comprising the steps of:

determining a first distance between said first and second features;

determining a second distance between said corresponding features;

comparing said first and second distances; and applying one of a compression or expansion transformation to one of said first and second images to match said first and second distances.

20. A method for automatically merging first and second image strips from a hand-held scanner, said first and second image strips each having an overlap portion overlapping the other image strip, comprising the steps of:

a) determining said overlap portion of said first image strip which overlaps with said second image strip;

b) locating first and second features having a high amount of uncorrelation in first and second distinct regions of said overlap portion;

c) matching said first and second features to corresponding features in an overlap portion of said second image strip;

d) determining a first distance between said first and second features;

e) determining a second distance between said corresponding features;

f) comparing said first and second distances;

g) applying one of a compression or expansion transformation to one of said first and second images to match said first and second distances;

h) determining a transformation required for a geometry of said first and second features to match a geometry of said corresponding features, said transformation including rotation;

i) applying said transformation to one of said first and second image strips;

j) eliminating one of said overlap portions; and k) combining said first and second image strips.

21. A method for automatically merging first and second images stored on a computer system, said first and second image strips each having an overlap portion overlapping the other image strip, the method comprising:

(a) comparing pixel values of a plurality of regions to pixel values of adjacent regions;

(b) determining an amount of uncorrelation of each region compared to said adjacent regions;

(c) identifying as a first feature at least one of said regions having a higher amount of uncorrelation than at least one other region;

(d) matching a corresponding second feature in the second image to said first feature in the first image;

(e) determining a geometry of the first feature;

(f) determining a geometry of the second feature;

(g) transforming the geometry of the second image to that of the geometry of the first feature;

(h) determining a difference in alignment of the two features; and (i) merging the first and second images into a single image by aligning the first and second images in accordance with the difference in alignment of the two features.

22. The method of claim 21, wherein said transforming step includes translation, rotation, compression, and expansion transformations.

* * * * *